US009692851B2

(12) United States Patent
Dunn et al.

(10) Patent No.: US 9,692,851 B2
(45) Date of Patent: Jun. 27, 2017

(54) SYSTEMS AND METHODS FOR GHOSTING AND PROVIDING PROXIES IN A NETWORK FEED

(71) Applicant: salesforce.com, inc., San Francisco, CA (US)

(72) Inventors: Zachary J. Dunn, San Francisco, CA (US); Joseph M. Olsen, Mountain House, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 14/974,670

(22) Filed: Dec. 18, 2015

(65) Prior Publication Data

US 2016/0105527 A1 Apr. 14, 2016

Related U.S. Application Data

(62) Division of application No. 14/024,468, filed on Sep. 11, 2013, now Pat. No. 9,253,283.

(Continued)

(51) Int. Cl.

| | |
|---|---|
| ***G06F 15/16*** | (2006.01) |
| ***H04L 29/08*** | (2006.01) |
| ***H04L 29/06*** | (2006.01) |

(52) U.S. Cl.

CPC ........ *H04L 67/306* (2013.01); *H04L 63/0407* (2013.01)

(58) Field of Classification Search

CPC .......................... H04L 67/306; H04L 63/0407

See application file for complete search history.

(56) References Cited

U.S. PATENT DOCUMENTS 5,577,188 A 11/1996 Zhu
5,608,872 A 3/1997 Schwartz et al.

(Continued)

OTHER PUBLICATIONS

Kim Woodbridge, "How to Make a Facebook Page for Your Small Business" (http://www.pcworld.com/article/240258/how_to_make_a_facebook_page_for_your_small_business.html), Sep. 19, 2011, PCWorld.*

(Continued)

*Primary Examiner* — Jonathan Bui

(74) *Attorney, Agent, or Firm* — Weaver Austin Villeneuve & Sampson LLP

(57) ABSTRACT

Disclosed are methods, apparatus, systems, and computer readable storage media for maintaining anonymity in an online social network. In some implementations, a user can be designated a ghost user with respect to an entity in the online social network. One or more invisibility levels can be determined for the ghost user. Data indicating content to display in accordance with one or more invisibility levels can be generated and provided to a display device configured to display a presentation of the social network feed associated with the entity in a user interface associated with a second user. Also disclosed are methods, apparatus, systems, and computer readable storage media for designating a proxy in an online social network. In some implementations, a first user can be designated as a proxy user of a second user in an online social network with respect to one or more entities within the online social network.

20 Claims, 27 Drawing Sheets

Related U.S. Application Data

(60) Provisional application No. 61/701,485, filed on Sep. 14, 2012.

(56) References Cited

U.S. PATENT DOCUMENTS

| | | | | |
|---|---|---|---|---|
| 5,649,104 | A | 7/1997 | Carleton et al. | |
| 5,715,450 | A | 2/1998 | Ambrose et al. | |
| 5,761,419 | A | 6/1998 | Schwartz et al. | |
| 5,819,038 | A | 10/1998 | Carleton et al. | |
| 5,821,937 | A | 10/1998 | Tonelli et al. | |
| 5,831,610 | A | 11/1998 | Tonelli et al. | |
| 5,873,096 | A | 2/1999 | Lim et al. | |
| 5,881,225 | A * | 3/1999 | Worth | G06F 21/62 713/164 |
| 5,918,159 | A | 6/1999 | Fomukong et al. | |
| 5,963,953 | A | 10/1999 | Cram et al. | |
| 5,983,227 | A | 11/1999 | Nazem et al. | |
| 6,092,083 | A | 7/2000 | Brodersen et al. | |
| 6,161,149 | A | 12/2000 | Achacoso et al. | |
| 6,169,534 | B1 | 1/2001 | Raffel et al. | |
| 6,178,425 | B1 | 1/2001 | Brodersen et al. | |
| 6,189,011 | B1 | 2/2001 | Lim et al. | |
| 6,216,133 | B1 | 4/2001 | Masthoff | |
| 6,216,135 | B1 | 4/2001 | Brodersen et al. | |
| 6,233,617 | B1 | 5/2001 | Rothwein et al. | |
| 6,236,978 | B1 | 5/2001 | Tuzhilin | |
| 6,266,669 | B1 | 7/2001 | Brodersen et al. | |
| 6,288,717 | B1 | 9/2001 | Dunkle | |
| 6,295,530 | B1 | 9/2001 | Ritchie et al. | |
| 6,324,568 | B1 | 11/2001 | Diec et al. | |
| 6,324,693 | B1 | 11/2001 | Brodersen et al. | |
| 6,336,137 | B1 | 1/2002 | Lee et al. | |
| D454,139 | S | 3/2002 | Feldcamp et al. | |
| 6,367,077 | B1 | 4/2002 | Brodersen et al. | |
| 6,393,605 | B1 | 5/2002 | Loomans | |
| 6,405,220 | B1 | 6/2002 | Brodersen et al. | |
| 6,411,949 | B1 | 6/2002 | Schaffer | |
| 6,434,550 | B1 | 8/2002 | Warner et al. | |
| 6,446,089 | B1 | 9/2002 | Brodersen et al. | |
| 6,535,909 | B1 | 3/2003 | Rust | |
| 6,549,908 | B1 | 4/2003 | Loomans | |
| 6,553,563 | B2 | 4/2003 | Ambrose et al. | |
| 6,560,461 | B1 | 5/2003 | Fomukong et al. | |
| 6,574,635 | B2 | 6/2003 | Stauber et al. | |
| 6,577,726 | B1 | 6/2003 | Huang et al. | |
| 6,601,087 | B1 | 7/2003 | Zhu et al. | |
| 6,604,117 | B2 | 8/2003 | Lim et al. | |
| 6,604,128 | B2 | 8/2003 | Diec et al. | |
| 6,609,150 | B2 | 8/2003 | Lee et al. | |
| 6,621,834 | B1 | 9/2003 | Scherpbier et al. | |
| 6,654,032 | B1 | 11/2003 | Zhu et al. | |
| 6,665,648 | B2 | 12/2003 | Brodersen et al. | |
| 6,665,655 | B1 | 12/2003 | Warner et al. | |
| 6,684,438 | B2 | 2/2004 | Brodersen et al. | |
| 6,711,565 | B1 | 3/2004 | Subramaniam et al. | |
| 6,724,399 | B1 | 4/2004 | Katchour et al. | |
| 6,728,702 | B1 | 4/2004 | Subramaniam et al. | |
| 6,728,960 | B1 | 4/2004 | Loomans et al. | |
| 6,732,095 | B1 | 5/2004 | Warshavsky et al. | |
| 6,732,100 | B1 | 5/2004 | Brodersen et al. | |
| 6,732,111 | B2 | 5/2004 | Brodersen et al. | |
| 6,754,681 | B2 | 6/2004 | Brodersen et al. | |
| 6,763,351 | B1 | 7/2004 | Subramaniam et al. | |
| 6,763,501 | B1 | 7/2004 | Zhu et al. | |
| 6,768,904 | B2 | 7/2004 | Kim | |
| 6,772,229 | B1 | 8/2004 | Achacoso et al. | |
| 6,782,383 | B2 | 8/2004 | Subramaniam et al. | |
| 6,804,330 | B1 | 10/2004 | Jones et al. | |
| 6,826,565 | B2 | 11/2004 | Ritchie et al. | |
| 6,826,582 | B1 | 11/2004 | Chatterjee et al. | |
| 6,826,745 | B2 | 11/2004 | Coker | |
| 6,829,655 | B1 | 12/2004 | Huang et al. | |
| 6,842,748 | B1 | 1/2005 | Warner et al. | |
| 6,850,895 | B2 | 2/2005 | Brodersen et al. | |
| 6,850,949 | B2 | 2/2005 | Warner et al. | |
| 6,907,566 | B1 | 6/2005 | McElfresh et al. | |
| 7,062,502 | B1 | 6/2006 | Kesler | |
| 7,069,231 | B1 | 6/2006 | Cinarkaya et al. | |
| 7,069,497 | B1 | 6/2006 | Desai | |
| 7,100,111 | B2 | 8/2006 | McElfresh et al. | |
| 7,181,758 | B1 | 2/2007 | Chan | |
| 7,269,590 | B2 | 9/2007 | Hull et al. | |
| 7,289,976 | B2 | 10/2007 | Kihneman et al. | |
| 7,340,411 | B2 | 3/2008 | Cook | |
| 7,356,482 | B2 | 4/2008 | Frankland et al. | |
| 7,373,599 | B2 | 5/2008 | McElfresh et al. | |
| 7,401,094 | B1 | 7/2008 | Kesler | |
| 7,406,501 | B2 | 7/2008 | Szeto et al. | |
| 7,412,455 | B2 | 8/2008 | Dillon | |
| 7,454,509 | B2 | 11/2008 | Boulter et al. | |
| 7,508,789 | B2 | 3/2009 | Chan | |
| 7,599,935 | B2 | 10/2009 | La Rotonda et al. | |
| 7,603,331 | B2 | 10/2009 | Tuzhilin et al. | |
| 7,603,483 | B2 | 10/2009 | Psounis et al. | |
| 7,620,655 | B2 | 11/2009 | Larsson et al. | |
| 7,644,122 | B2 | 1/2010 | Weyer et al. | |
| 7,668,861 | B2 | 2/2010 | Steven | |
| 7,698,160 | B2 | 4/2010 | Beaven et al. | |
| 7,730,478 | B2 | 6/2010 | Weissman | |
| 7,747,648 | B1 | 6/2010 | Kraft et al. | |
| 7,779,039 | B2 | 8/2010 | Weissman et al. | |
| 7,779,475 | B2 | 8/2010 | Jakobson et al. | |
| 7,827,208 | B2 | 11/2010 | Bosworth et al. | |
| 7,853,881 | B1 | 12/2010 | Aly Assal et al. | |
| 7,945,653 | B2 | 5/2011 | Zukerberg et al. | |
| 8,005,896 | B2 | 8/2011 | Cheah | |
| 8,014,943 | B2 | 9/2011 | Jakobson | |
| 8,015,495 | B2 | 9/2011 | Achacoso et al. | |
| 8,032,297 | B2 | 10/2011 | Jakobson | |
| 8,073,850 | B1 | 12/2011 | Hubbard et al. | |
| 8,082,301 | B2 | 12/2011 | Ahlgren et al. | |
| 8,095,413 | B1 | 1/2012 | Beaven | |
| 8,095,531 | B2 | 1/2012 | Weissman et al. | |
| 8,095,594 | B2 | 1/2012 | Beaven et al. | |
| 8,103,611 | B2 | 1/2012 | Tuzhilin et al. | |
| 8,150,913 | B2 | 4/2012 | Cheah | |
| 8,209,308 | B2 | 6/2012 | Rueben et al. | |
| 8,209,333 | B2 | 6/2012 | Hubbard et al. | |
| 8,275,836 | B2 | 9/2012 | Beaven et al. | |
| 8,457,545 | B2 | 6/2013 | Chan | |
| 8,484,111 | B2 | 7/2013 | Frankland et al. | |
| 8,490,025 | B2 | 7/2013 | Jakobson et al. | |
| 8,504,945 | B2 | 8/2013 | Jakobson et al. | |
| 8,510,045 | B2 | 8/2013 | Rueben et al. | |
| 8,510,664 | B2 | 8/2013 | Rueben et al. | |
| 8,566,301 | B2 | 10/2013 | Rueben et al. | |
| 8,646,103 | B2 | 2/2014 | Jakobson et al. | |
| 8,886,766 | B2 | 11/2014 | Dunn et al. | |
| 8,984,051 | B2 | 3/2015 | Olsen et al. | |
| 9,058,363 | B2 | 6/2015 | Dunn et al. | |
| 9,094,359 | B2 | 7/2015 | Olsen et al. | |
| 9,208,187 | B2 | 12/2015 | Dunn | |
| 9,253,283 | B2 | 2/2016 | Dunn et al. | |
| 2001/0044791 | A1 | 11/2001 | Richter et al. | |
| 2002/0072951 | A1 | 6/2002 | Lee et al. | |
| 2002/0082892 | A1 | 6/2002 | Raffel et al. | |
| 2002/0129352 | A1 | 9/2002 | Brodersen et al. | |
| 2002/0140731 | A1 | 10/2002 | Subramaniam et al. | |
| 2002/0143997 | A1 | 10/2002 | Huang et al. | |
| 2002/0162090 | A1 | 10/2002 | Parnell et al. | |
| 2002/0165742 | A1 | 11/2002 | Robbins | |
| 2003/0004971 | A1 | 1/2003 | Gong | |
| 2003/0018705 | A1 | 1/2003 | Chen et al. | |
| 2003/0018830 | A1 | 1/2003 | Chen et al. | |
| 2003/0066031 | A1 | 4/2003 | Laane et al. | |
| 2003/0066032 | A1 | 4/2003 | Ramachandran et al. | |
| 2003/0069936 | A1 | 4/2003 | Warner et al. | |
| 2003/0070000 | A1 | 4/2003 | Coker et al. | |
| 2003/0070004 | A1 | 4/2003 | Mukundan et al. | |
| 2003/0070005 | A1 | 4/2003 | Mukundan et al. | |
| 2003/0074418 | A1 | 4/2003 | Coker et al. | |
| 2003/0120675 | A1 | 6/2003 | Stauber et al. | |
| 2003/0151633 | A1 | 8/2003 | George et al. | |

(56) References Cited

U.S. PATENT DOCUMENTS

2003/0159136 A1 8/2003 Huang et al.
2003/0187921 A1 10/2003 Diec et al.
2003/0189600 A1 10/2003 Gune et al.
2003/0204427 A1 10/2003 Gune et al.
2003/0206192 A1 11/2003 Chen et al.
2003/0225730 A1 12/2003 Warner et al.
2004/0001092 A1 1/2004 Rothwein et al.
2004/0010489 A1 1/2004 Rio et al.
2004/0015981 A1 1/2004 Coker et al.
2004/0027388 A1 2/2004 Berg et al.
2004/0128001 A1 7/2004 Levin et al.
2004/0186860 A1 9/2004 Lee et al.
2004/0193510 A1 9/2004 Catahan et al.
2004/0199489 A1 10/2004 Barnes-Leon et al.
2004/0199536 A1 10/2004 Barnes-Leon et al.
2004/0199543 A1 10/2004 Braud et al.
2004/0249854 A1 12/2004 Barnes-Leon et al.
2004/0260534 A1 12/2004 Pak et al.
2004/0260659 A1 12/2004 Chan et al.
2004/0268299 A1 12/2004 Lei et al.
2005/0050555 A1 3/2005 Exley et al.
2005/0091098 A1 4/2005 Brodersen et al.
2008/0040673 A1 2/2008 Zuckerberg et al.
2008/0249972 A1 10/2008 Dillon
2009/0063415 A1 3/2009 Chatfield et al.
2009/0100342 A1 4/2009 Jakobson
2009/0177744 A1 7/2009 Marlow et al.
2011/0151890 A1 6/2011 Platt et al.
2011/0218958 A1 9/2011 Warshavsky et al.
2011/0247051 A1 10/2011 Bulumulla et al.
2011/0276396 A1 11/2011 Rathod
2012/0042218 A1 2/2012 Cinarkaya et al.
2012/0223951 A1 9/2012 Dunn et al.
2012/0233137 A1 9/2012 Jakobson et al.
2012/0290407 A1 11/2012 Hubbard et al.
2013/0021370 A1 1/2013 Dunn et al.
2013/0024454 A1 1/2013 Dunn
2013/0024511 A1 1/2013 Dunn et al.
2013/0024788 A1 1/2013 Olsen et al.
2013/0054706 A1 2/2013 Graham et al.
2013/0060859 A1 3/2013 Olsen et al.
2013/0061156 A1 3/2013 Olsen et al.
2013/0091229 A1 4/2013 Dunn et al.
2013/0198652 A1 8/2013 Dunn et al.
2013/0205215 A1 8/2013 Dunn et al.
2013/0205400 A1* 8/2013 Yerli .................. H04L 63/0407 726/26
2013/0212497 A1 8/2013 Zelenko et al.
2013/0218948 A1 8/2013 Jakobson
2013/0218949 A1 8/2013 Jakobson
2013/0218966 A1 8/2013 Jakobson
2013/0232156 A1 9/2013 Dunn et al.
2013/0247216 A1 9/2013 Cinarkaya et al.
2013/0304830 A1 11/2013 Olsen et al.
2014/0019187 A1 1/2014 Olsen et al.
2014/0040374 A1 2/2014 Olsen et al.
2014/0059651 A1* 2/2014 Luster .................. G06F 21/604 726/4
2014/0082078 A1 3/2014 Dunn et al.
2014/0129632 A1* 5/2014 Sutton .................. G06F 21/552 709/204
2014/0359537 A1 12/2014 Jakobson et al.
2015/0006289 A1 1/2015 Jakobson et al.
2015/0007050 A1 1/2015 Jakobson et al.
2015/0026600 A1 1/2015 Dunn et al.
2015/0095162 A1 4/2015 Jakobson et al.
2015/0142596 A1 5/2015 Jakobson et al.
2015/0156160 A1 6/2015 Olsen et al.
2015/0172563 A1 6/2015 Jakobson et al.
2015/0220587 A1 8/2015 Dunn

OTHER PUBLICATIONS

Lauren Drell, "How to: Set Up a Facebook Page" (http://mashable.com/2011/05/22/how-to-facebook-page/#Ai1 mnhag05qp), May 22, 2011, Mashable.*

Mari Smith, "Four Ways to Post on Your Facebook Fan Page as Yourself" (https://www.facebook.com/notes/mari-smith/four-ways-to-post-on-your-facebook-fan-page-as-yourself/10150143562061340/), Jan. 26, 2011, facebook.*

"Google Plus Users", Google+Ripples, Oct. 31, 2011 [retrieved on Feb. 21, 2012 from Internet at http://www.googleplusers.com/google-ripples.html], 3 pages.

U.S. Non-Final Office Action dated Jun. 18, 2015, issued in U.S. Appl. No. 14/024,468.

U.S. Notice of Allowance dated Oct. 22, 2015, issued in U.S. Appl. No. 14/024,468.

* cited by examiner

| Event ID 911 | Object ID 912 | Created by ID 913 |
|---|---|---|
| E1 | O615 | U5 |
| E2 | O489 | U101 |
| ⋮ | | |

Event History Table 910

| Event ID 931 | Comment 932 | Time/ Date 933 |
|---|---|---|
| E37 | " " | 10-21-2010 5:32 PM |
| E37 | " " | 9-17-2010 |
| ⋮ | | |

Comment Table 930

| Event ID 921 | Old value 922 | New value 923 |
|---|---|---|
| E37 | 300 | 400 |
| E37 | 4.23 | 4.10 |
| ⋮ | | |

Field Change Table 920

| Event ID 951 | Post Text 952 | Time/ Date 953 |
|---|---|---|
| E69 | " " | 10-11-2010 4:12 PM |
| E90 | " " | 8-12-2010 |
| ⋮ | | |

Post Table 950

| User ID 941 | Object ID 942 |
|---|---|
| U819 | O615 |
| U819 | O489 |
| U719 | O615 |

User Subscription Table 940

| User ID 961 | Event ID 962 |
|---|---|
| U819 | E37 |
| U819 | E90 |
| U719 | E37 |

News Feed Table 960

*FIGURE 9A*

| User ID 1901 | Access Rights 1903 | Invisibility Level 1905 |
|---|---|---|
| U812 | R, W, D, U | 0 |
| U819 | R, W, D, U | 1 |
| U911 | R | 2 |
| U110 | R, D | 3 |
| U312 | R, W, D | 3 |

Entity Subscription Table 1910

| Invisibility Level 1911 | User IDs 1913 |
|---|---|
| 1 | U812, U323, U098, U212, U312... |
| 2 | U987, U090, U112, U098, U831... |
| 3 | U098, U091, U093, U411, U009... |

Invisibility Level Table 1920

| Entity ID 1921 | Event ID 1923 | Invisibility Level 1925 |
|---|---|---|
| O431 | E37 | 0 |
| O431 | E90 | 0 |
| O432 | E37 | 3 |

Feed Table 1930

*FIGURE 19*

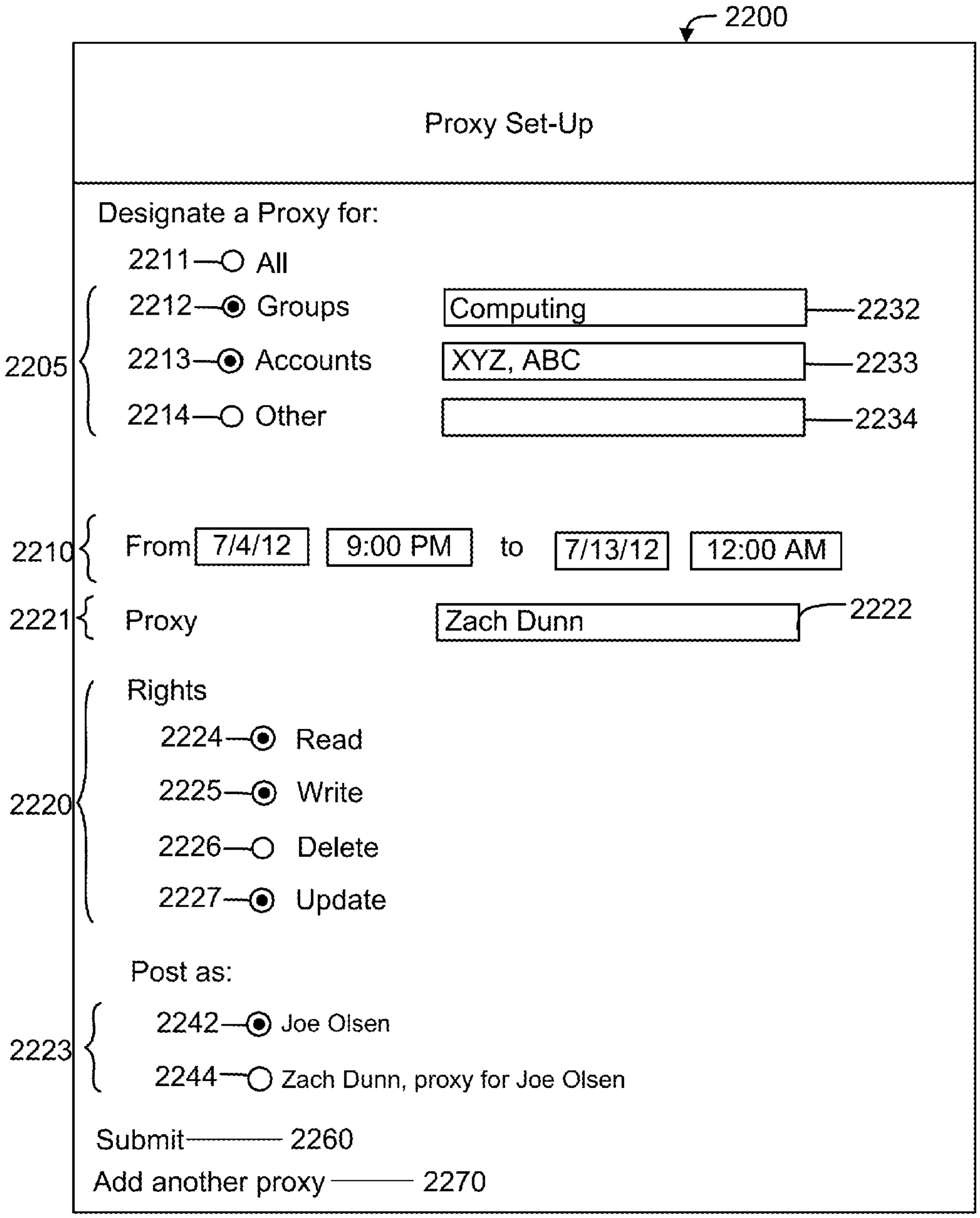

*FIGURE 22*

```
                                    ┌─ 2200
                                    ▼
┌─────────────────────────────────────────────────────┐
│                                                     │
│                    Proxy Set-Up                     │
│─────────────────────────────────────────────────────│
│   Designate a Proxy for:                            │
│     2211─○ All                                      │
│     2212─◉ Groups       ┌─Computing──────┐─2232     │
│2205 2213─◉ Accounts     │ XYZ, ABC       │─2233     │
│     2214─○ Other        │                │─2234     │
│                                                     │
│                                                     │
│2210  From [7/4/12] [9:00 PM] to [7/13/12] [12:00 AM]│
│                                                     │
│2221  Proxy            [Zach Dunn        ]─2222      │
│                                                     │
│      Rights                                         │
│         2224─◉  Read                                │
│         2225─◉  Write                               │
│2220     2226─○  Delete                              │
│         2227─◉  Update                              │
│                                                     │
│      Post as:                                       │
│         2242─◉  Joe Olsen                           │
│2223     2244─○  Zach Dunn, proxy for Joe Olsen      │
│                                                     │
│      Submit ──── 2260                               │
│      Add another proxy ──── 2270                    │
└─────────────────────────────────────────────────────┘

```

| Entity ID 2301 | User ID 2303 | Proxy User ID 2305 | Start Date/Time 2307 | Stop Date/Time 2309 | Access Rights 2311 |
|---|---|---|---|---|---|
| O431 | U101 | U900 | 10-11-2013 4:00 PM | 10-21-2013 3:00 PM | R, W, D, U |
| O432 | U311 | U003 | 10-21-2013 9:00 AM | 10-25-2013 5:00 PM | R, W, D |
| O432 | U999 | U111 | 10-21-2013 9:00 AM | 10-21-2013 5:00 PM | R, W, D, U |

Proxy Table 2300

FIGURE 23

| Event ID 2411 | Object ID 2412 | Created by ID 2413 | Proxy ID 2415 |
|---|---|---|---|
| E1 | O615 | U5 | U121 |
| E2 | O489 | U101 | U098 |

⋮

Event History Table 2410

*FIGURE 24*

SYSTEMS AND METHODS FOR GHOSTING AND PROVIDING PROXIES IN A NETWORK FEED

PRIORITY DATA

This patent document claims priority to co-pending and commonly assigned U.S. patent application Ser. No. 14/024,468, titled "Systems and Methods for Ghosting and Providing Proxies in a Network Feed", by Dunn et al., filed on Sep. 11, 2013, which claims priority to U.S. Provisional Patent Application No. 61/701,485, titled "System And Method For Ghosting And Providing Proxies In A Network Feed", by Dunn et al., filed on Sep. 14, 2012. Each of U.S. patent application Ser. No. 14/024,468 and U.S. Provisional Patent Application No. 61/701,485 is hereby incorporated by reference in its entirety and for all purposes.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This patent document relates generally to providing on-demand services in an online social network using a database system and, more specifically, to techniques for maintaining anonymity of users of the social network.

BACKGROUND

"Cloud computing" services provide shared resources, software, and information to computers and other devices upon request. In cloud computing environments, software can be accessible over the Internet rather than installed locally on in-house computer systems. Cloud computing typically involves over-the-Internet provision of dynamically scalable and often virtualized resources. Technological details can be abstracted from the users, who no longer have need for expertise in, or control over, the technology infrastructure "in the cloud" that supports them.

Database resources can be provided in a cloud computing context. However, using conventional database management techniques, it is difficult to know about the activity of other users of a database system in the cloud or other network. For example, the actions of a particular user, such as a salesperson, on a database resource may be important to the user's boss. The user can create a report about what the user has done and send it to the boss, but such reports may be inefficient, not timely, and incomplete. Also, it may be difficult to identify other users who might benefit from the information in the report.

BRIEF DESCRIPTION OF THE DRAWINGS

The included drawings are for illustrative purposes and serve only to provide examples of possible structures and operations for the disclosed inventive systems, apparatus, and methods for providing anonymity of users and providing proxies in an online social network. These drawings in no way limit any changes in form and detail that may be made by one skilled in the art without departing from the spirit and scope of the disclosed implementations.

FIG. 9A shows an example of a plurality of tables that may be used in tracking events and creating feeds according to some implementations.

FIG. 19 shows an example of a plurality of tables that may be used in tracking ghost users and invisibility levels and creating feeds, according to some implementations.

FIG. 22 shows an example of a proxy set-up page 2200 in the form of a GUI, as displayed on a display device according to some implementations.

FIG. 23 shows an example of a proxy table 2300 that may be used in tracking proxies.

FIG. 24 shows an example of an event history table 2410 that may be used in tracking proxy activity.

DETAILED DESCRIPTION

Figure 1A:
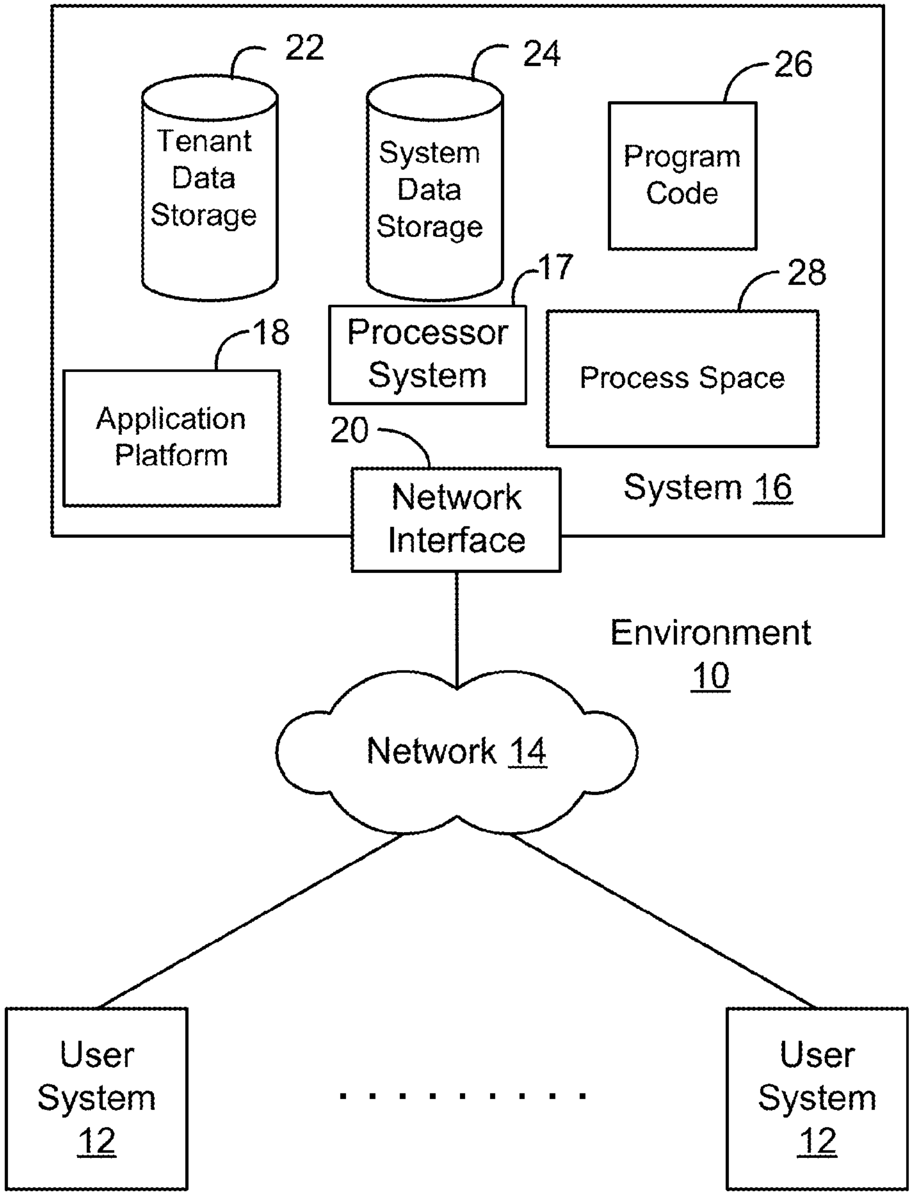
FIG. 1A shows a block diagram of an example of an environment 10 in which an on-demand database service can be used in accordance with some implementations.

Examples of systems, apparatus, and methods according to the disclosed implementations are described in this section. These examples are being provided solely to add context and aid in the understanding of the disclosed implementations. It will thus be apparent to one skilled in the art that implementations may be practiced without some or all of these specific details. In other instances, certain process/method operations, also referred to herein as "blocks," have not been described in detail in order to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the blocks of methods shown and described herein are not necessarily performed in the order indicated. It should also be understood that the methods may include more or fewer blocks than are indicated. In some implementations, blocks described herein as separate blocks may be combined. Conversely, what may be described herein as a single block may be implemented in multiple blocks.

Various implementations described or referenced herein are directed to different methods, apparatus, systems, and computer-readable storage media for maintaining anonymity and designating proxies in an online social network, also referred to herein as a social networking system. One example of an online social network is Chatter®, provided by salesforce.com, inc. of San Francisco, Calif. Online social networks are increasingly becoming a common way to facilitate communication among people and groups of people, any of whom can be recognized as users of a social networking system. Some online social networks can be implemented in various settings, including organizations, e.g., enterprises such as companies or business partnerships, academic institutions, or groups within such an organization. For instance, Chatter® can be used by employee users in a division of a business organization to share data, communicate, and collaborate with each other for various purposes.

In some online social networks, users can access one or more social network feeds, which include information updates presented as items or entries in the feed. Such a feed item can include a single information update or a collection of individual information updates. A feed item can include various types of data including character-based data, audio data, image data and/or video data. A social network feed can be displayed in a graphical user interface (GUI) on a display device such as the display of a computing device as described below. The information updates can include various social network data from various sources and can be stored in an on-demand database service environment. In some implementations, the disclosed methods, apparatus, systems, and computer-readable storage media may be configured or designed for use in a multi-tenant database environment.

In some implementations, an online social network may allow a user to follow data objects in the form of records such as cases, accounts, or opportunities, in addition to following individual users and groups of users. The "following" of a record stored in a database, as described in greater detail below, allows a user to track the progress of that record. Updates to the record, also referred to herein as changes to the record, are one type of information update that can occur and be noted on a social network feed such as a record feed or a news feed of a user subscribed to the record. Examples of record updates include field changes in the record, updates to the status of a record, as well as the creation of the record itself. Some records are publicly accessible, such that any user can follow the record, while other records are private, for which appropriate security clearance/permissions are a prerequisite to a user following the record.

Information updates can include various types of updates, which may or may not be linked with a particular record. For example, information updates can be user-submitted messages or can otherwise be generated in response to user actions or in response to events. Examples of messages include: posts, comments, indications of a user's personal preferences such as "likes" and "dislikes", updates to a user's status, uploaded files, and hyperlinks to social network data or other network data such as various documents and/or web pages on the Internet. Posts can include alphanumeric or other character-based user inputs such as words, phrases, statements, questions, emotional expressions, and/or symbols. Comments generally refer to responses to posts, such as words, phrases, statements, answers, questions, and reactionary emotional expressions and/or symbols. Multimedia data can be included in, linked with, or attached to a post or comment. For example, a post can include textual statements in combination with a JPEG image or animated image. A like or dislike can be submitted in response to a particular post or comment. Examples of uploaded files include presentations, documents, multimedia files, and the like.

Users can follow a record by subscribing to the record, as mentioned above. Users can also follow other entities such as other types of data objects, other users, and groups of users. Feed tracked updates regarding such entities are one type of information update that can be received and included in the user's news feed. Any number of users can follow a particular entity and thus view information updates pertaining to that entity on the users' respective news feeds. In some social networks, users may follow each other by establishing connections with each other, sometimes referred to as "friending" one another. By establishing such a connection, one user may be able to see information generated by, generated about, or otherwise associated with another user. For instance, a first user may be able to see information posted by a second user to the second user's personal social network page. One implementation of such a personal social network page is a user's profile page, for example, in the form of a web page representing the user's profile. In one example, when the first user is following the second user, the first user's news feed can receive a post from the second user submitted to the second user's profile feed, also referred to herein as the user's "wall," which is one example of a social network feed displayed on the user's profile page.

In some implementations, a social network feed may be specific to a group of users of an online social network. For instance, a group of users may publish a news feed. Members of the group may view and post to this group feed in accordance with a permissions configuration for the feed and the group. Information updates in a group context can also include changes to group status information.

In some implementations, when data such as posts or comments input from one or more users are submitted to a social network feed for a particular user, group, object, or other construct within an online social network, an email notification or other type of network communication may be transmitted to all users following the user, group, or object in addition to the inclusion of the data as a feed item in one or more feeds, such as a user's profile feed, a news feed, or a record feed. In some online social networks, the occurrence of such a notification is limited to the first instance of a published input, which may form part of a larger conversation. For instance, a notification may be transmitted for an initial post, but not for comments on the post. In some other implementations, a separate notification is transmitted for each such information update.

Some implementations of the disclosed systems, apparatus, methods, and computer readable storage media are configured to maintain anonymity in an online social network. For instance, the disclosed techniques can be implemented to define a ghost feature to enable user invisibility, while allowing the user to be fully operational in the social network. Multiple levels of invisibility can be defined, allowing users a flexible way to maintain their anonymity. Using some of the implementations disclosed herein, a user can be designated as a ghost user with respect to one or more groups, records, or other entities in the online social network.

In some implementations, a ghost user can follow an entity, having access to social network feeds associated with the entity, while concealing his identity and/or content published to the social network feed from at least some of the other followers of the entity. For example, for training purposes, a contract negotiation team may want a supervisor to monitor negotiations over a social network feed. To avoid undermining the authority of the contract negotiator, the supervisor may be designated a ghost user and avoid being visible to others as a follower of the thread, group, or post. Further, in some implementations, the ghost user may submit a post or other feed content, selecting which followers can see the content.

One or more levels of user invisibility can be defined to determine the extent of the ghost user's invisibility in the online social network. For example, in one implementation, the identity of and/or feed content associated with a ghost user following a group may be concealed from all followers except the group leader, all followers outside the ghost user's department, or all followers outside the ghost user's organization. In various implementations, a ghost user can select who he/she is invisible to when requesting to be added as a ghost user, or on a continuous basis, for example, when submitting a post. In some implementations, an invisibility level may be determined by the system, for example, based on a default setting.

Various access rights may be defined for a ghost user. For instance, in some implementations, a ghost user can have complete access to a social network feed, including the ability to post if the ghost user wishes to participate. In some implementations, a ghost user may have a more limited set of access rights, for example, the ability to read a feed, but not post to it. Access rights can be defined when the user is designated as a ghost user.

Some implementations of the disclosed systems, apparatus, methods, and computer readable storage media are configured to designate a proxy in an online social network. In some implementations, a first user can be designated a proxy user for a second user with respect to one or more cases, groups, accounts, and other entities in the online social network. For instance, the disclosed techniques can be implemented to allow a user to designate a proxy to handle his or her cases. Feed content submitted by the proxy user can be published in one or more social network feeds with an indication of the association with the original user.

In various implementations, the feed content can include an indication of the proxy user or conceal the proxy user's identity. For example, if a user Albert Smith designates Tom Jones to be his proxy, posts that Tom submits as Albert's proxy may appear to other users exactly as if Albert had submitted the posts. Alternatively, the posts may be labeled with an indication of the proxy such as: "Tom Jones, proxy for Albert Smith." Various access rights may be defined for a proxy user. For example, a proxy user may be limited to updating other users on the status of a case. In some implementations, proxy activity may be tracked. For example, the identity of the proxy user and the content of the post or other message may be stored in a database table.

These and other implementations may be embodied in various types of hardware, software, firmware, and combinations thereof. For example, some techniques disclosed herein may be implemented, at least in part, by computer-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of computer-readable media include, but are not limited to, magnetic media such as hard disks, floppy disks, and magnetic tape; optical media such as CD-ROM disks; magneto-optical media; and hardware devices that are specially configured to store program instructions, such as read-only memory ("ROM") devices and random access memory ("RAM") devices. These and other features of the disclosed implementations will be described in more detail below with reference to the associated drawings.

The term "multi-tenant database system" can refer to those systems in which various elements of hardware and software of a database system may be shared by one or more customers. For example, a given application server may simultaneously process requests for a great number of customers, and a given database table may store rows of data such as feed items for a potentially much greater number of customers. The term "query plan" generally refers to one or more operations used to access information in a database system.

A "user profile" or "user's profile" is generally configured to store and maintain data about a given user of the database system. The data can include general information, such as name, title, phone number, a photo, a biographical summary, and a status, e.g., text describing what the user is currently doing. As mentioned below, the data can include messages created by other users. Where there are multiple tenants, a user is typically associated with a particular tenant. For example, a user could be a salesperson of a company, which is a tenant of the database system that provides a database service.

The term "record" generally refers to a data entity, such as an instance of a data object created by a user of the database service, for example, about a particular (actual or potential) business relationship or project. The data object can have a data structure defined by the database service (a standard object) or defined by a user (custom object). For example, a record can be for a business partner or potential business partner (e.g., a client, vendor, distributor, etc.) of the user, and can include information describing an entire company, subsidiaries, or contacts at the company. As another example, a record can be a project that the user is working on, such as an opportunity (e.g., a possible sale) with an existing partner, or a project that the user is trying to get. In one implementation of a multi-tenant database system, each record for the tenants has a unique identifier stored in a common table. A record has data fields that are defined by the structure of the object (e.g., fields of certain data types and purposes). A record can also have custom fields defined by a user. A field can be another record or include links thereto, thereby providing a parent-child relationship between the records.

The terms "social network feed" and "feed" are used interchangeably herein and generally refer to a combination (e.g., a list) of feed items or entries with various types of information and data. Such feed items can be stored and maintained in one or more database tables, e.g., as rows in the table(s), that can be accessed to retrieve relevant information to be presented as part of a displayed feed. The term "feed item" (or feed element) refers to an item of information, which can be presented in the feed such as a post submitted by a user. Feed items of information about a user can be presented in a user's profile feed of the database, while feed items of information about a record can be presented in a record feed in the database, by way of example. A profile feed and a record feed are examples of different social network feeds. A second user following a first user and a record can receive the feed items associated with the first user and the record for display in the second user's news feed, which is another type of social network feed. In some implementations, the feed items from any number of followed users and records can be combined into a single social network feed of a particular user.

As examples, a feed item can be a message, such as a user-generated post of text data, and a feed tracked update to a record or profile, such as a change to a field of the record. Feed tracked updates are described in greater detail below. A feed can be a combination of messages and feed tracked updates. Messages include text created by a user, and may include other data as well. Examples of messages include posts, user status updates, and comments. Messages can be created for a user's profile or for a record. Posts can be created by various users, potentially any user, although some restrictions can be applied. As an example, posts can be made to a wall section of a user's profile page (which can include a number of recent posts) or a section of a record that includes multiple posts. The posts can be organized in chronological order when displayed in a graphical user interface (GUI), for instance, on the user's profile page, as part of the user's profile feed. In contrast to a post, a user status update changes a status of a user and can be made by that user or an administrator. A record can also have a status, the update of which can be provided by an owner of the record or other users having suitable write access permissions to the record. The owner can be a single user, multiple users, or a group. In one implementation, there is only one status for a record.

In some implementations, a comment can be made on any feed item. In some implementations, comments are organized as a list explicitly tied to a particular feed tracked update, post, or status update. In some implementations, comments may not be listed in the first layer (in a hierarchal sense) of feed items, but listed as a second layer branching from a particular first layer feed item.

A "feed tracked update," also referred to herein as a "feed update," is one type of information update and generally refers to data representing an event. A feed tracked update can include text generated by the database system in response to the event, to be provided as one or more feed items for possible inclusion in one or more feeds. In one implementation, the data can initially be stored, and then the database system can later use the data to create text for describing the event. Both the data and/or the text can be a feed tracked update, as used herein. In various implementations, an event can be an update of a record and/or can be triggered by a specific action by a user. Which actions trigger an event can be configurable. Which events have feed tracked updates created and which feed updates are sent to which users can also be configurable. Messages and feed updates can be stored as a field or child object of the record. For example, the feed can be stored as a child object of the record.

A "group" is generally a collection of users. In some implementations, the group may be defined as users with a same or similar attribute, or by membership. In some implementations, a "group feed", also referred to herein as a "group news feed", includes one or more feed items about any user in the group. In some implementations, the group feed also includes information updates and other feed items that are about the group as a whole, the group's purpose, the group's description, and group records and other objects stored in association with the group. Threads of information updates including group record updates and messages, such as posts, comments, likes, etc., can define group conversations and change over time.

An "entity feed" or "record feed" generally refers to a feed of feed items about a particular record in the database, such as feed tracked updates about changes to the record and posts made by users about the record. An entity feed can be composed of any type of feed item. Such a feed can be displayed on a page such as a web page associated with the record, e.g., a home page of the record. As used herein, a "profile feed" or "user's profile feed" is a feed of feed items about a particular user. In one example, the feed items for a profile feed include posts and comments that other users make about or send to the particular user, and status updates made by the particular user. Such a profile feed can be displayed on a page associated with the particular user. In another example, feed items in a profile feed could include posts made by the particular user and feed tracked updates initiated based on actions of the particular user.

I. General Overview

Systems, apparatus, and methods are provided for implementing enterprise level social and business information networking. Such implementations can provide more efficient use of a database system. For instance, a user of a database system may not easily know when important information in the database has changed, e.g., about a project or client. Implementations can provide feed tracked updates about such changes and other events, thereby keeping users informed.

By way of example, a user can update a record, e.g., an opportunity such as a possible sale of 1000 computers. Once the record update has been made, a feed tracked update about the record update can then automatically be provided, e.g., in a feed, to anyone subscribing to the opportunity or to the user. Thus, the user does not need to contact a manager regarding the change in the opportunity, since the feed tracked update about the update is sent via a feed right to the manager's feed page or other page.

Next, mechanisms and methods for providing systems implementing enterprise level social and business information networking will be described with reference to several implementations. First, an overview of an example of a database system is described, and then examples of tracking events for a record, actions of a user, and messages about a user or record are described. Various implementations about the data structure of feeds, customizing feeds, user selection of records and users to follow, generating feeds, and displaying feeds are also described.

II. System Overview

FIG. 1A shows a block diagram of an example of an environment 10 in which an on-demand database service can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

Environment 10 is an environment in which an on-demand database service exists. User system 12 may be implemented as any computing device(s) or other data processing apparatus such as a machine or system that is used by a user to access a database system 16. For example, any of user systems 12 can be a handheld computing device, a mobile phone, a laptop computer, a work station, and/or a network of such computing devices. As illustrated in FIG. 1A (and in more detail in FIG. 1B) user systems 12 might interact via a network 14 with an on-demand database service, which is implemented in the example of FIG. 1A as database system 16.

An on-demand database service, implemented using system 16 by way of example, is a service that is made available to outside users, who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, where a salesperson is using a particular user system 12 to interact with system 16, that user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the "Internet" with a capital "I." The Internet will be used in many of the examples herein. However, it should be understood that the networks that the present implementations might use are not so limited, although TCP/IP is a frequently implemented protocol.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 1A, implements a web-based customer relationship management (CRM) system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

Figure 1B:
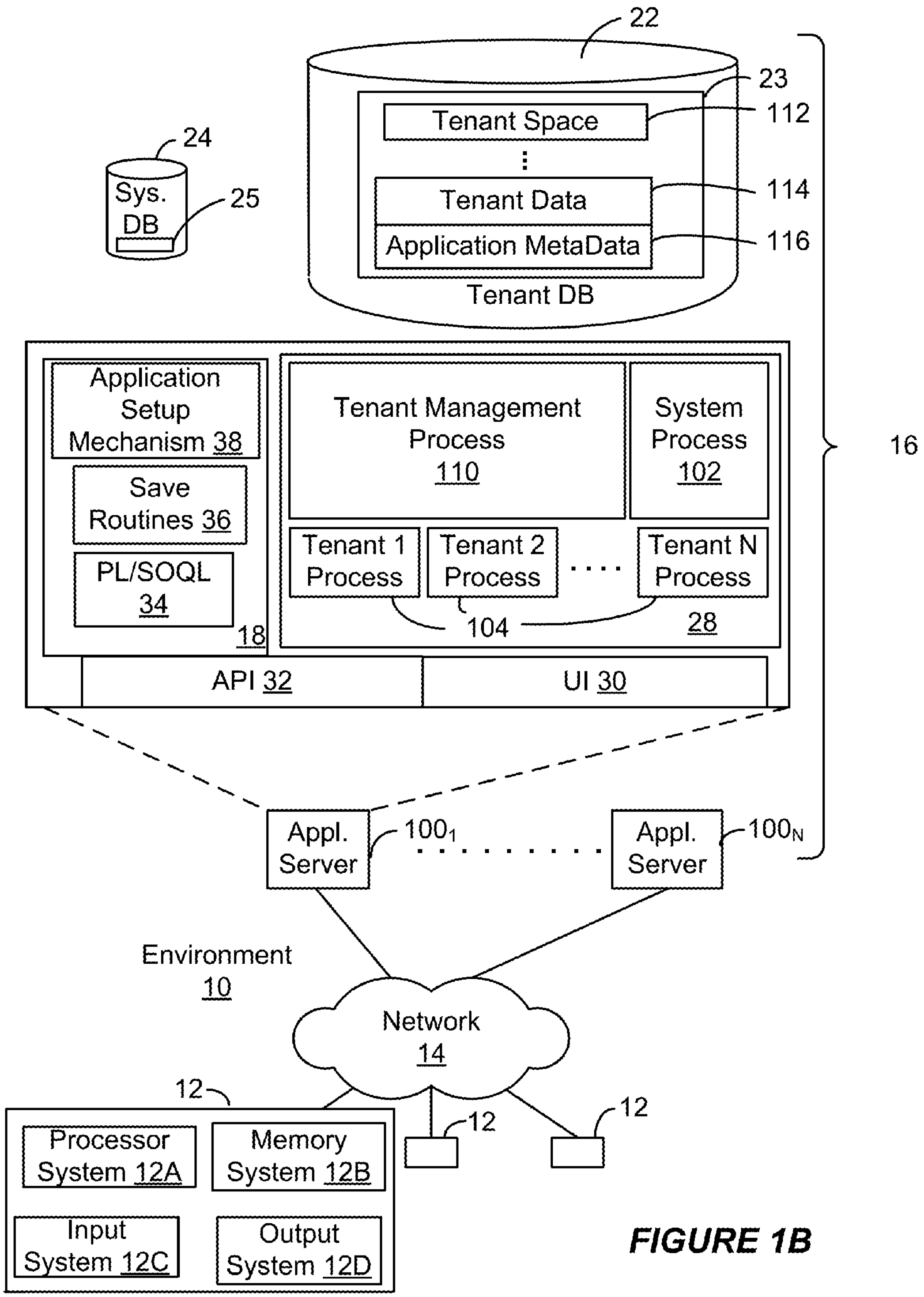
FIG. 1B shows a block diagram of an example of some implementations of elements of FIG. 1A and various possible interconnections between these elements.

One arrangement for elements of system 16 is shown in FIGS. 1A and 1B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 1A include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. The term "computing device" is also referred to herein simply as a "computer". User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a graphical user interface (GUI) provided by the browser on a display (e.g., a monitor screen, LCD display, etc.) of the computing device in conjunction with pages, forms, applications and other information provided by system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. Non-transitory computer-readable media can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to a computing device or system, including processing hardware and process space(s), an associated storage medium such as a memory device or database, and, in some instances, a database application (e.g., OODBMS or RDBMS) as is well known in the art. It should also be understood that "server system" and "server"

are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

FIG. 1B shows a block diagram of an example of some implementations of elements of FIG. 1A and various possible interconnections between these elements. That is, FIG. 1B also illustrates environment 10. However, in FIG. 1B elements of system 16 and various interconnections in some implementations are further illustrated. FIG. 1B shows that user system 12 may include processor system 12A, memory system 12B, input system 12C, and output system 12D. FIG. 1B shows network 14 and system 16. FIG. 1B also shows that system 16 may include tenant data storage 22, tenant data 23, system data storage 24, system data 25, User Interface (UI) 30, Application Program Interface (API) 32, PL/SOQL 34, save routines 36, application setup mechanism 38, applications servers 1001-100N, system process space 102, tenant process spaces 104, tenant management process space 110, tenant storage space 112, user storage 114, and application metadata 116. In other implementations, environment 10 may not have the same elements as those listed above and/or may have other elements instead of, or in addition to, those listed above.

User system 12, network 14, system 16, tenant data storage 22, and system data storage 24 were discussed above in FIG. 1A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 1B, system 16 may include a network interface 20 (of FIG. 1A) implemented as a set of HTTP application servers 100, an application platform 18, tenant data storage 22, and system data storage 24. Also shown is system process space 102, including individual tenant process spaces 104 and a tenant management process space 110. Each application server 100 may be configured to communicate with tenant data storage 22 and the tenant data 23 therein, and system data storage 24 and the system data 25 therein to serve requests of user systems 12. The tenant data 23 might be divided into individual tenant storage spaces 112, which can be either a physical arrangement and/or a logical arrangement of data. Within each tenant storage space 112, user storage 114 and application metadata 116 might be similarly allocated for each user. For example, a copy of a user's most recently used (MRU) items might be stored to user storage 114. Similarly, a copy of MRU items for an entire organization that is a tenant might be stored to tenant storage space 112. A UI 30 provides a user interface and an API 32 provides an application programmer interface to system 16 resident processes to users and/or developers at user systems 12. The tenant data and the system data may be stored in various databases, such as one or more Oracle□ databases.

Application platform 18 includes an application setup mechanism 38 that supports application developers' creation and management of applications, which may be saved as metadata into tenant data storage 22 by save routines 36 for execution by subscribers as one or more tenant process spaces 104 managed by tenant management process 110 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 116 for the subscriber making the invocation and executing the metadata as an application in a virtual machine.

Each application server 100 may be communicably coupled to database systems, e.g., having access to system data 25 and tenant data 23, via a different network connection. For example, one application server 1001 might be coupled via the network 14 (e.g., the Internet), another application server 100N-1 might be coupled via a direct network link, and another application server 100N might be coupled by yet a different network connection. Transfer Control Protocol and Internet Protocol (TCP/IP) are typical protocols for communicating between application servers 100 and the database system. However, it will be apparent to one skilled in the art that other transport protocols may be used to optimize the system depending on the network interconnect used.

In certain implementations, each application server 100 is configured to handle requests for any user associated with any organization that is a tenant. Because it is desirable to be able to add and remove application servers from the server pool at any time for any reason, there is preferably no server affinity for a user and/or organization to a specific application server 100. In one implementation, therefore, an interface system implementing a load balancing function (e.g., an F5 Big-IP load balancer) is communicably coupled between the application servers 100 and the user systems 12 to distribute requests to the application servers 100. In one implementation, the load balancer uses a least connections algorithm to route user requests to the application servers 100. Other examples of load balancing algorithms, such as round robin and observed response time, also can be used. For example, in certain implementations, three consecutive requests from the same user could hit three different application servers 100, and three requests from different users could hit the same application server 100. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 100 to request and update system-level and tenant-level data from system 16 that may involve sending one or more queries to tenant data storage 22 and/or system data storage 24. System 16 (e.g., an application server 100 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 2A:
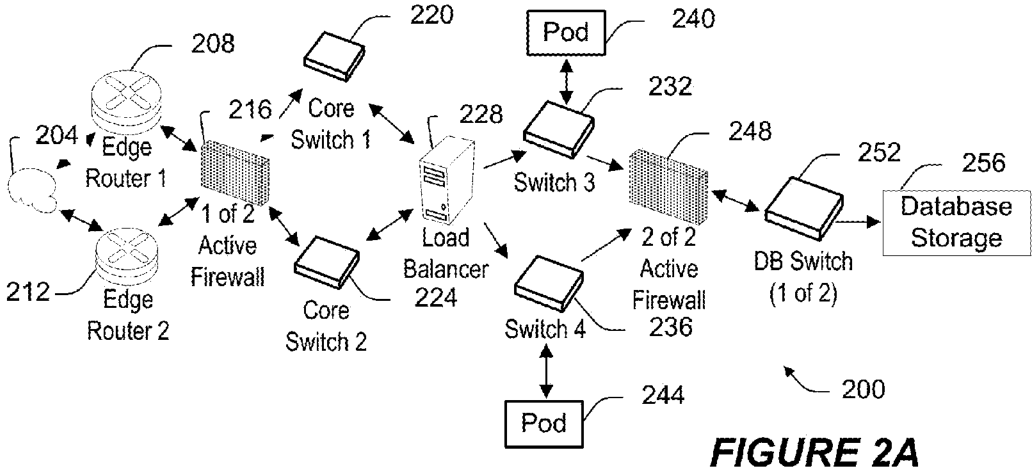
FIG. 2A shows a system diagram illustrating an example of architectural components of an on-demand database service environment 200 according to some implementations.

FIG. 2A shows a system diagram illustrating an example of architectural components of an on-demand database service environment 200 according to some implementations. A client machine located in the cloud 204, generally referring to one or more networks in combination, as described herein, may communicate with the on-demand database service environment via one or more edge routers 208 and 212. A client machine can be any of the examples of user systems 12 described above. The edge routers may communicate with one or more core switches 220 and 224 via firewall 216. The core switches may communicate with a load balancer 228, which may distribute server load over different pods, such as the pods 240 and 244. The pods 240 and 244, which may each include one or more servers and/or other computing resources, may perform data processing and other operations used to provide on-demand services. Communication with the pods may be conducted via pod switches 232 and 236. Components of the on-demand database service environment may communicate with a database storage 256 via a database firewall 248 and a database switch 252.

Figure 2B:
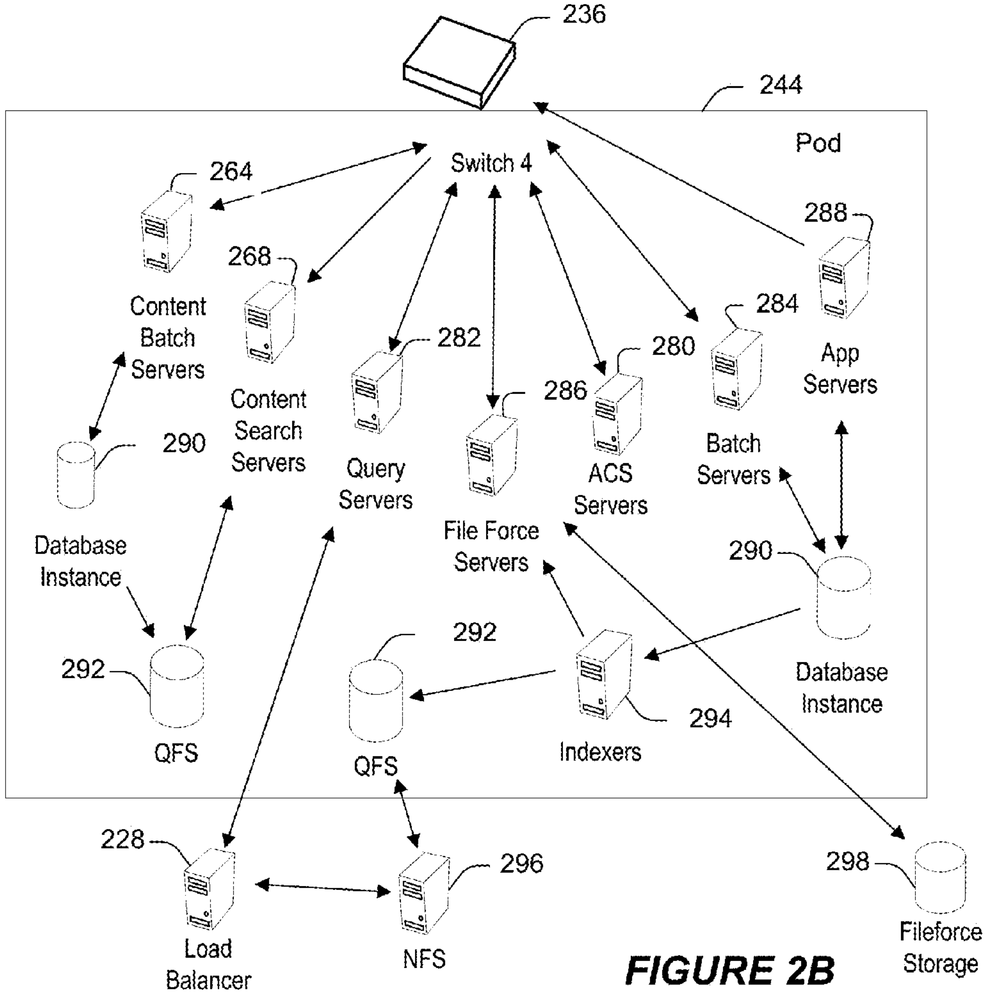
FIG. 2B shows a system diagram further illustrating an example of architectural components of an on-demand database service environment according to some implementations.

As shown in FIGS. 2A and 2B, accessing an on-demand database service environment may involve communications transmitted among a variety of different hardware and/or software components. Further, the on-demand database service environment 200 is a simplified representation of an actual on-demand database service environment. For example, while only one or two devices of each type are shown in FIGS. 2A and 2B, some implementations of an on-demand database service environment may include anywhere from one to many devices of each type. Also, the on-demand database service environment need not include each device shown in FIGS. 2A and 2B, or may include additional devices not shown in FIGS. 2A and 2B.

Moreover, one or more of the devices in the on-demand database service environment 200 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 204 is intended to refer to a data network or plurality of data networks, often including the Internet. Client machines located in the cloud 204 may communicate with the on-demand database service environment to access services provided by the on-demand database service environment. For example, client machines may access the on-demand database service environment to retrieve, store, edit, and/or process information.

In some implementations, the edge routers 208 and 212 route packets between the cloud 204 and other components of the on-demand database service environment 200. The edge routers 208 and 212 may employ the Border Gateway Protocol (BGP). The BGP is the core routing protocol of the Internet. The edge routers 208 and 212 may maintain a table of IP networks or 'prefixes', which designate network reachability among autonomous systems on the Internet.

In one or more implementations, the firewall 216 may protect the inner components of the on-demand database service environment 200 from Internet traffic. The firewall 216 may block, permit, or deny access to the inner components of the on-demand database service environment 200 based upon a set of rules and other criteria. The firewall 216 may act as one or more of a packet filter, an application gateway, a stateful filter, a proxy server, or any other type of firewall.

In some implementations, the core switches 220 and 224 are high-capacity switches that transfer packets within the on-demand database service environment 200. The core switches 220 and 224 may be configured as network bridges that quickly route data between different components within the on-demand database service environment. In some implementations, the use of two or more core switches 220 and 224 may provide redundancy and/or reduced latency.

In some implementations, the pods 240 and 244 may perform the core data processing and service functions provided by the on-demand database service environment. Each pod may include various types of hardware and/or software computing resources. An example of the pod architecture is discussed in greater detail with reference to FIG. 2B.

In some implementations, communication between the pods 240 and 244 may be conducted via the pod switches 232 and 236. The pod switches 232 and 236 may facilitate communication between the pods 240 and 244 and client machines located in the cloud 204, for example via core switches 220 and 224. Also, the pod switches 232 and 236 may facilitate communication between the pods 240 and 244 and the database storage 256.

In some implementations, the load balancer 228 may distribute workload between the pods 240 and 244. Balancing the on-demand service requests between the pods may assist in improving the use of resources, increasing throughput, reducing response times, and/or reducing overhead. The load balancer 228 may include multilayer switches to analyze and forward traffic.

In some implementations, access to the database storage 256 may be guarded by a database firewall 248. The database firewall 248 may act as a computer application firewall operating at the database application layer of a protocol stack. The database firewall 248 may protect the database storage 256 from application attacks such as structure query language (SQL) injection, database rootkits, and unauthorized information disclosure.

In some implementations, the database firewall 248 may include a host using one or more forms of reverse proxy services to proxy traffic before passing it to a gateway router. The database firewall 248 may inspect the contents of database traffic and block certain content or database requests. The database firewall 248 may work on the SQL application level atop the TCP/IP stack, managing applications' connection to the database or SQL management interfaces as well as intercepting and enforcing packets traveling to or from a database network or application interface.

In some implementations, communication with the database storage 256 may be conducted via the database switch 252. The multi-tenant database storage 256 may include more than one hardware and/or software components for handling database queries. Accordingly, the database switch 252 may direct database queries transmitted by other components of the on-demand database service environment (e.g., the pods 240 and 244) to the correct components within the database storage 256.

In some implementations, the database storage 256 is an on-demand database system shared by many different organizations. The on-demand database system may employ a multi-tenant approach, a virtualized approach, or any other type of database approach. An on-demand database system is discussed in greater detail with reference to FIGS. 1A and 1B.

FIG. 2B shows a system diagram further illustrating an example of architectural components of an on-demand database service environment according to some implementations. The pod 244 may be used to render services to a user of the on-demand database service environment 200. In some implementations, each pod may include a variety of servers and/or other systems. The pod 244 includes one or more content batch servers 264, content search servers 268, query servers 282, file force servers 286, access control system (ACS) servers 280, batch servers 284, and app servers 288. Also, the pod 244 includes database instances 290, quick file systems (QFS) 292, and indexers 294. In one or more implementations, some or all communication between the servers in the pod 244 may be transmitted via the switch 236.

In some implementations, the app servers 288 may include a hardware and/or software framework dedicated to the execution of procedures (e.g., programs, routines, scripts) for supporting the construction of applications provided by the on-demand database service environment 200 via the pod 244. In some implementations, the hardware and/or software framework of an app server 288 is configured to execute operations of the services described herein, including performance of the blocks of methods described with reference to FIGS. 15-24. In alternative implementations, two or more app servers 288 may be included and cooperate to perform such methods, or one or more other servers described herein can be configured to perform the disclosed methods.

The content batch servers 264 may handle requests internal to the pod. These requests may be long-running and/or not tied to a particular customer. For example, the content batch servers 264 may handle requests related to log mining, cleanup work, and maintenance tasks.

The content search servers 268 may provide query and indexer functions. For example, the functions provided by the content search servers 268 may allow users to search through content stored in the on-demand database service environment.

The file force servers 286 may manage requests for information stored in the Fileforce storage 298. The Fileforce storage 298 may store information such as documents, images, and basic large objects (BLOBs). By managing requests for information using the file force servers 286, the image footprint on the database may be reduced.

The query servers 282 may be used to retrieve information from one or more file systems. For example, the query system 282 may receive requests for information from the app servers 288 and then transmit information queries to the NFS 296 located outside the pod.

The pod 244 may share a database instance 290 configured as a multi-tenant environment in which different organizations share access to the same database. Additionally, services rendered by the pod 244 may call upon various hardware and/or software resources. In some implementations, the ACS servers 280 may control access to data, hardware resources, or software resources.

In some implementations, the batch servers 284 may process batch jobs, which are used to run tasks at specified times. Thus, the batch servers 284 may transmit instructions to other servers, such as the app servers 288, to trigger the batch jobs.

In some implementations, the QFS 292 may be an open source file system available from Sun Microsystems® of Santa Clara, Calif. The QFS may serve as a rapid-access file system for storing and accessing information available within the pod 244. The QFS 292 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 268 and/or indexers 294 to identify, retrieve, move, and/or update data stored in the network file systems 296 and/or other storage systems.

In some implementations, one or more query servers 282 may communicate with the NFS 296 to retrieve and/or update information stored outside of the pod 244. The NFS 296 may allow servers located in the pod 244 to access information to access files over a network in a manner similar to how local storage is accessed.

In some implementations, queries from the query servers 222 may be transmitted to the NFS 296 via the load balancer 228, which may distribute resource requests over various resources available in the on-demand database service environment. The NFS 296 may also communicate with the QFS 292 to update the information stored on the NFS 296 and/or to provide information to the QFS 292 for use by servers located within the pod 244.

In some implementations, the pod may include one or more database instances 290. The database instance 290 may transmit information to the QFS 292. When information is transmitted to the QFS, it may be available for use by servers within the pod 244 without using an additional database call.

In some implementations, database information may be transmitted to the indexer 294. Indexer 294 may provide an index of information available in the database 290 and/or QFS 292. The index information may be provided to file force servers 286 and/or the QFS 292.

III. Tracking Updates to a Record Stored in a Database

As multiple users might be able to change the data of a record, it can be useful for certain users to be notified when a record is updated. Also, even if a user does not have authority to change a record, the user still might want to know when there is an update to the record. For example, a vendor may negotiate a new price with a salesperson of company X, where the salesperson is a user associated with tenant Y. As part of creating a new invoice or for accounting purposes, the salesperson can change the price saved in the database. It may be important for co-workers to know that the price has changed. The salesperson could send an email to certain people, but this is onerous and the salesperson might not email all of the people who need to know or want to know. Accordingly, some implementations of the disclosed techniques can inform others (e.g., co-workers) who want to know about an update to a record automatically.

Figure 3:
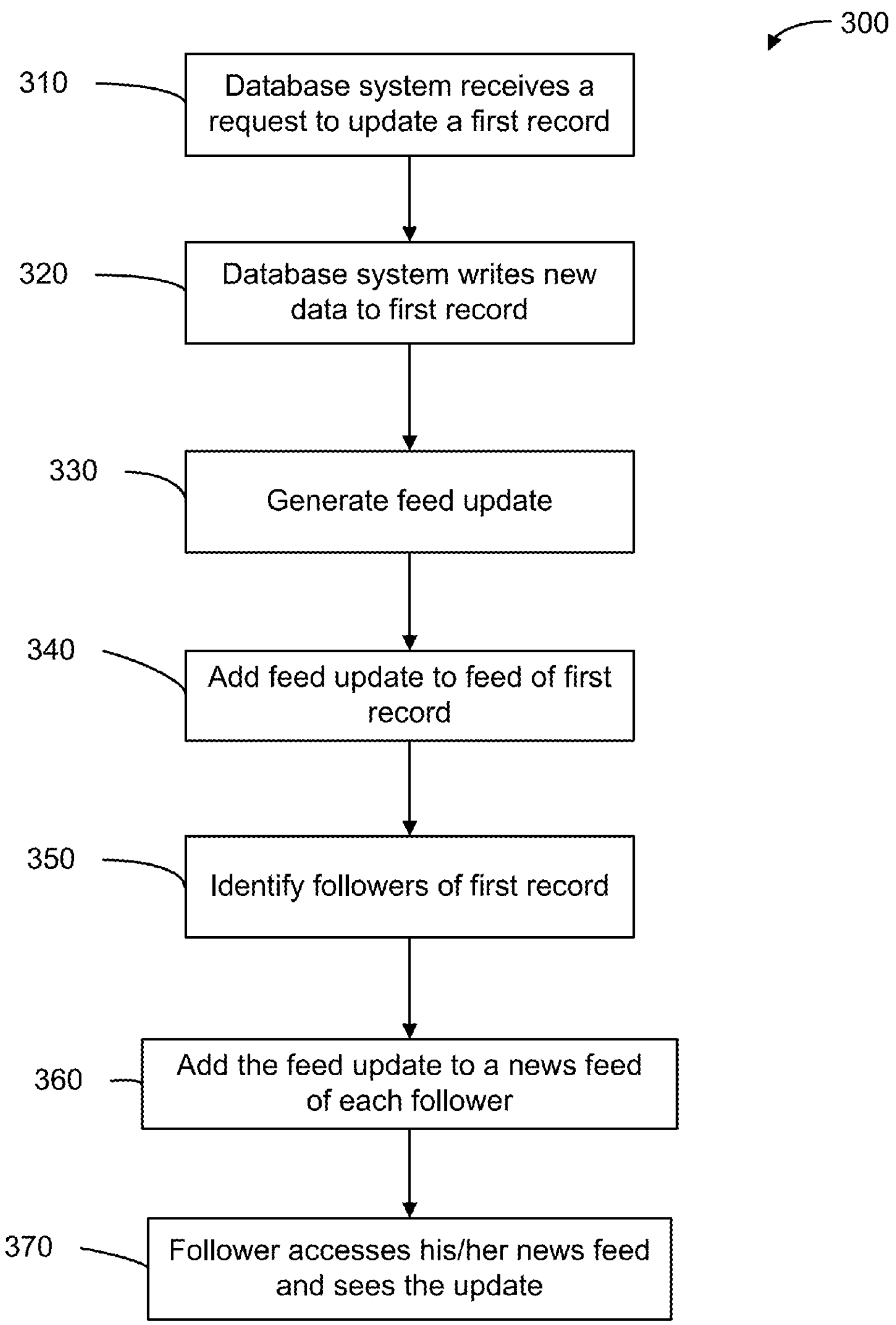
FIG. 3 shows a flowchart of an example of a method 300 for tracking updates to a record stored in a database system, performed in accordance with some implementations.

FIG. 3 shows a flowchart of an example of a method 300 for tracking updates to a record stored in a database system, performed in accordance with some implementations. Method 300 (and other methods described herein) may be implemented at least partially with multi-tenant database system 16, e.g., by one or more processors configured to receive or retrieve information, process the information, store results, and transmit the results. In other implementations, method 300 may be implemented at least partially with a single tenant database system. In various implementations, blocks may be omitted, combined, or split into additional blocks for method 300, as well as for other methods described herein.

In block 310, the database system receives a request to update a first record. In one implementation, the request is received from a first user. For example, a user may be accessing a page associated with the first record, and may change a displayed field and hit save. In another implementation, the database system can automatically create the request. For instance, the database system can create the request in response to another event, e.g., a request to change a field could be sent periodically at a particular date and/or time of day, or a change to another field or object. The database system can obtain a new value based on other fields of a record and/or based on parameters in the system.

The request for the update of a field of a record is an example of an event associated with the first record for which a feed tracked update may be created. In other implementations, the database system can identify other events besides updates to fields of a record. For example, an event can be a submission of approval to change a field. Such an event can also have an associated field (e.g., a field showing a status of whether a change has been submitted). Other examples of events can include creation of a record, deletion of a record, converting a record from one type to another (e.g., converting a lead to an opportunity), closing a record (e.g., a case type record), and potentially any other state change of a record—any of which could include a field change associated with the state change. Any of these events update the record whether by changing a field of the record, a state of the record, or some other characteristic or property of the record. In one implementation, a list of supported events for creating a feed tracked update can be maintained within the database system, e.g., at a server or in a database.

In block 320, the database system writes new data to the first record. In one implementation, the new data may include a new value that replaces old data. For example, a field is updated with a new value. In another implementation, the new data can be a value for a field that did not contain data before. In yet another implementation, the new data could be a flag, e.g., for a status of the record, which can be stored as a field of the record.

In some implementations, a "field" can also include records, which are child objects of the first record in a parent-child hierarchy. A field can alternatively include a pointer to a child record. A child object itself can include further fields. Thus, if a field of a child object is updated with a new value, the parent record also can be considered to have a field changed. In one example, a field could be a list of related child objects, also called a related list.

In block 330, a feed tracked update is generated about the update to the record. In one implementation, the feed tracked update is created in parts for assembling later into a display version. For example, event entries can be created and tracked in a first table, and changed field entries can be tracked in another table that is cross-referenced with the first table. More specifics of such implementations are provided later, e.g., with respect to FIG. 9A. In another implementation, the feed tracked update is automatically generated by the database system. The feed tracked update can convey in words that the first record has been updated and provide details about what was updated in the record and who performed the update. In some implementations, a feed tracked update is generated for only certain types of event and/or updates associated with the first record.

In one implementation, a tenant (e.g., through an administrator) can configure the database system to create (enable) feed tracked updates only for certain types of records. For example, an administrator can specify that records of designated types such as accounts and opportunities are enabled. When an update (or other event) is received for the enabled record type, then a feed tracked update would be generated. In another implementation, a tenant can also specify the fields of a record whose changes are to be tracked, and for which feed tracked updates are created. In one aspect, a maximum number of fields can be specified for tracking, and may include custom fields. In one implementation, the type of change can also be specified, for example, that the value change of a field is to be larger than a threshold (e.g., an absolute amount or a percentage change). In yet another implementation, a tenant can specify which events are to cause a generation of a feed tracked update. Also, in one implementation, individual users can specify configurations specific to them, which can create custom feeds as described in more detail below.

In one implementation, changes to fields of a child object are not tracked to create feed tracked updates for the parent record. In another implementation, the changes to fields of a child object can be tracked to create feed tracked updates for the parent record. For example, a child object of the parent type can be specified for tracking, and certain fields of the child object can be specified for tracking. As another example, if the child object is of a type specified for tracking, then a tracked change for the child object is propagated to parent records of the child object.

In block 340, the feed tracked update is added to a feed for the first record. In one implementation, adding the feed tracked update to a feed can include adding events to a table (which may be specific to a record or be for all or a group of objects), where a display version of a feed tracked update can be generated dynamically and presented in a GUI as a feed item when a user requests a feed for the first record. In another implementation, a display version of a feed tracked update can be added when a record feed is stored and maintained for a record. As mentioned above, a feed may be maintained for only certain records. In one implementation, the feed of a record can be stored in the database associated with the record. For example, the feed can be stored as a field (e.g., as a child object) of the record. Such a field can store a pointer to the text to be displayed for the feed tracked update.

In some implementations, only the current feed tracked update (or other current feed item) may be kept or temporarily stored, e.g., in some temporary memory structure. For example, a feed tracked update for only a most recent change to any particular field is kept. In other implementations, many previous feed tracked updates may be kept in the feed. A time and/or date for each feed tracked update can be tracked. Herein, a feed of a record is also referred to as an entity feed, as a record is an instance of a particular entity object of the database.

In block 350, followers of the first record can be identified. A follower is a user following the first record, such as a subscriber to the feed of the first record. In one implementation, when a user requests a feed of a particular record, such an identification of block 350 can be omitted. In another implementation where a record feed is pushed to a user (e.g., as part of a news feed), then the user can be identified as a follower of the first record. Accordingly, this block can include the identification of records and other objects being followed by a particular user.

In one implementation, the database system can store a list of the followers for a particular record. In various implementations, the list can be stored with the first record or associated with the record using an identifier (e.g., a pointer) to retrieve the list. For example, the list can be stored in a field of the first record. In another implementation, a list of the records that a user is following is used. In one implementation, the database system can have a routine that runs for each user, where the routine polls the records in the list to determine if a new feed tracked update has been added to a feed of the record. In another implementation, the routine for the user can be running at least partially on a user device, which contacts the database to perform the polling.

In block 360, in one implementation, the feed tracked update can be stored in a table, as described in greater detail below. When the user opens a feed, an appropriate query is sent to one or more tables to retrieve updates to records, also described in greater detail below. In some implementations, the feed shows feed tracked updates in reverse chronological order. In one implementation, the feed tracked update is pushed to the feed of a user, e.g., by a routine that determines the followers for the record from a list associated with the record. In another implementation, the feed tracked update is pulled to a feed, e.g., by a user device. This pulling may occur when a user requests the feed, as occurs in block 370. Thus, these actions may occur in a different order. The creation of the feed for a pull may be a dynamic creation that identifies records being followed by the requesting user, generates the display version of relevant feed tracked updates from stored information (e.g., event and field change), and adds the feed tracked updates into the feed. A feed of feed tracked updates of records and other objects that a user is following is also generally referred to herein as a news feed, which can be a subset of a larger social network feed in which other types of information updates appear, such as posts.

In yet another implementation, the feed tracked update could be sent as an email to the follower, instead of in a feed. In one implementation, email alerts for events can enable people to be emailed when certain events occur. In another implementation, emails can be sent when there are posts on a user profile and posts on entities to which the user subscribes. In one implementation, a user can turn on/off email alerts for all or some events. In an implementation, a user can specify what kind of feed tracked updates to receive about a record that the user is following. For example, a user can choose to only receive feed tracked updates about certain fields of a record that the user is following, and potentially about what kind of update was performed (e.g., a new value input into a specified field, or the creation of a new field).

In block 370, a follower can access his/her news feed to see the feed tracked update. In one implementation, the user has just one news feed for all of the records that the user is following. In one aspect, a user can access his/her own feed by selecting a particular tab or other object on a page of an interface to the database system. Once selected the feed can be provided as a list, e.g., with an identifier (e.g., a time) or including some or all of the text of the feed tracked update. In another implementation, the user can specify how the feed tracked updates are to be displayed and/or sent to the user. For example, a user can specify a font for the text, a location of where the feed can be selected and displayed, amount of text to be displayed, and other text or symbols to be displayed (e.g., importance flags).

Figure 4:
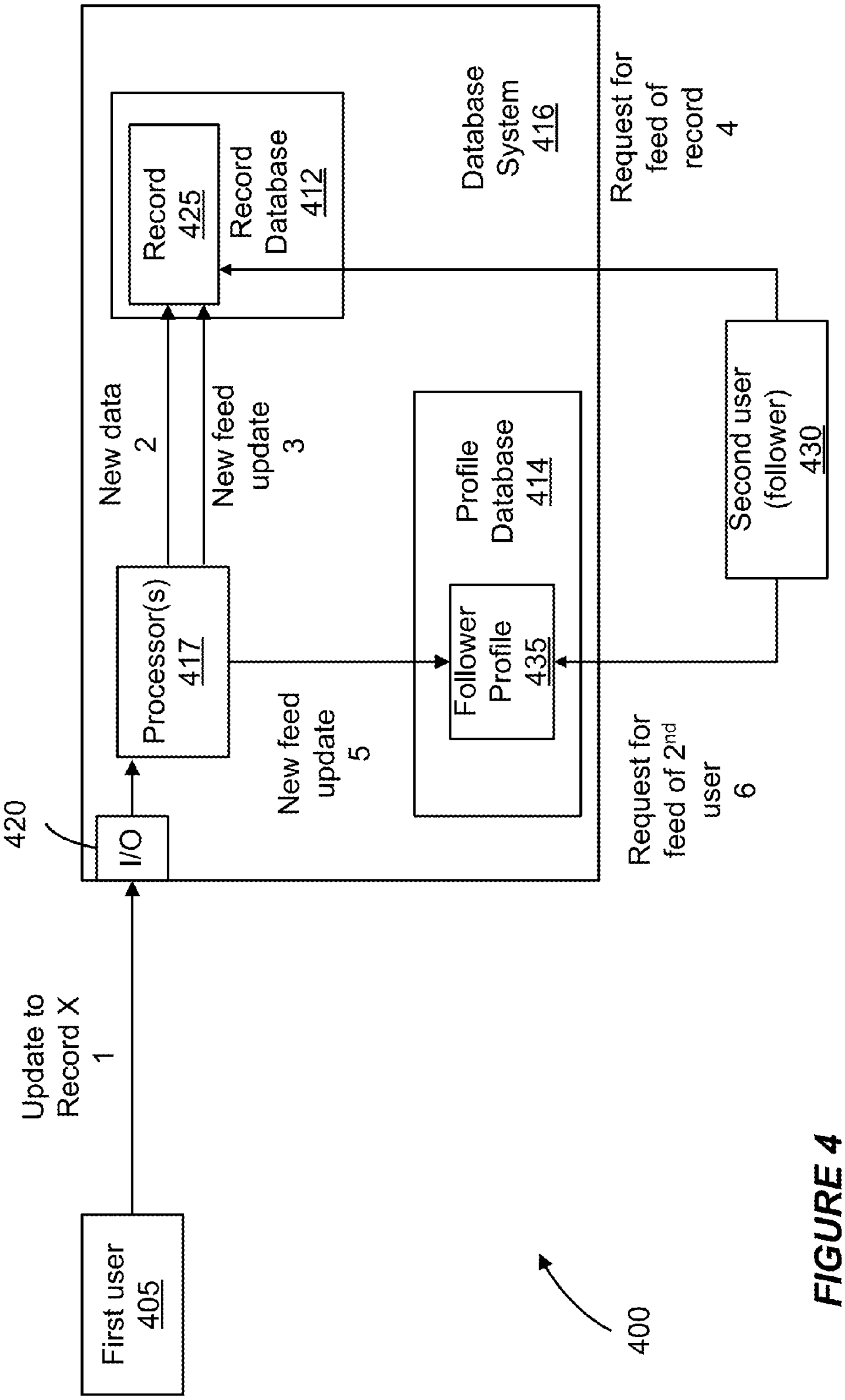
FIG. 4 shows a block diagram of an example of components of a database system configuration 400 performing a method for tracking an update to a record according to some implementations.

FIG. 4 shows a block diagram of an example of components of a database system configuration 400 performing a method for tracking an update to a record according to some implementations. Database system configuration 400 can perform implementations of method 300, as well as implementations of other methods described herein.

A first user 405 sends a request 1 to update record 425 in database system 416. Although an update request is described, other events that are being tracked are equally applicable. In various implementations, the request 1 can be sent via a user interface (e.g., 30 of FIG. 1B) or an application program interface (e.g., API 32). An I/O port 420 can accommodate the signals of request 1 via any input interface, and send the signals to one or more processors 417. The processor 417 can analyze the request and determine operations to be performed. Herein, any reference to a processor 417 can refer to a specific processor or any set of processors in database system 416, which can be collectively referred to as processor 417.

Processor 417 can determine an identifier for record 425, and send commands with the new data 2 of the request to record database 412 to update record 425. In one implementation, record database 412 is where tenant storage space 112 of FIG. 1B is located. The request 1 and new data commands 2 can be encapsulated in a single write transaction sent to record database 412. In one implementation, multiple changes to records in the database can be made in a single write transaction.

Processor 417 can also analyze request 1 to determine whether a feed tracked update is to be created, which at this point may include determining whether the event (e.g., a change to a particular field) is to be tracked. This determination can be based on an interaction (i.e., an exchange of data) with record database 412 and/or other databases, or based on information stored locally (e.g., in cache or RAM) at processor 417. In one implementation, a list of record types that are being tracked can be stored. The list may be different for each tenant, e.g., as each tenant may configure the database system to its own specifications. Thus, if the record 425 is of a type not being tracked, then the determination of whether to create a feed tracked update can stop there.

The same list or a second list (which can be stored in a same location or a different location) can also include the fields and/or events that are tracked for the record types in the first list. This list can be searched to determine if the event is being tracked. A list may also contain information having the granularity of listing specific records that are to be tracked (e.g., if a tenant can specify the particular records to be tracked, as opposed to just type).

As an example, processor 417 may obtain an identifier associated with record 425 (e.g., obtained from request 1 or database 412), potentially along with a tenant identifier, and cross-reference the identifier with a list of records for which feed tracked updates are to be created. Specifically, the record identifier can be used to determine the record type and a list of tracked types can be searched for a match. The specific record may also be checked if such individual record tracking was enabled. The name of the field to be changed can also be used to search a list of tracking-enabled fields. Other criteria besides field and events can be used to determine whether a feed tracked update is created, e.g., type of change in the field. If a feed tracked update is to be generated, processor 417 can then generate the feed tracked update.

In some implementations, a feed tracked update is created dynamically when a feed (e.g., the entity feed of record 425) is requested. Thus, in one implementation, a feed tracked update can be created when a user requests the entity feed for record 425. In this implementation, the feed tracked update may be created (e.g., assembled), including re-created, each time the entity feed is to be displayed to any user. In one implementation, one or more event history tables can keep track of previous events so that the feed tracked update can be re-created.

In another implementation, a feed tracked update can be created at the time the event occurs, and the feed tracked update can be added to a list of feed items. The list of feed items may be specific to record 425, or may be an aggregate of feed items including feed items for many records. Such an aggregate list can include a record identifier so that the feed items for the entity feed of record 425 can be easily retrieved. For example, after the feed tracked update has been generated, processor 417 can add the new feed tracked update 3 to a feed of record 425. As mentioned above, in one implementation, the feed can be stored in a field (e.g., as a child object) of record 425. In another implementation, the feed can be stored in another location or in another database, but with a link (e.g., a connecting identifier) to record 425. The feed can be organized in various ways, e.g., as a linked list, an array, or other data structure.

A second user 430 can access the new feed tracked update 3 in various ways. In one implementation, second user 430 can send a request 4 for the record feed. For example, second user 430 can access a home page (detail page) of the record 425 (e.g., with a query or by browsing), and the feed can be obtained through a tab, button, or other activation object on the page. The feed can be displayed on the screen or downloaded.

In another implementation, processor 417 can add the new feed tracked update 5 to a feed (e.g., a news feed) of a user that is following record 425. In one implementation, processor 417 can determine each of the followers of record 425 by accessing a list of the users that have been registered as followers. This determination can be done for each new event (e.g., update 1). In another implementation, processor 417 can poll (e.g., with a query) the records that second user 430 is following to determine when new feed tracked updates (or other feed items) are available. Processor 417 can use a follower profile 435 of second user 430 that can contain a list of the records that the second user 430 is following. Such a list can be contained in other parts of the database as well. Second user 430 can then send a request 6 to his/her profile 435 to obtain a feed, which contains the new feed tracked update. The user's profile 435 can be stored in a profile database 414, which can be the same or different than database 412.

In some implementations, a user can define a news feed to include new feed tracked updates from various records, which may be limited to a maximum number. In one implementation, each user has one news feed. In another implementation, the follower profile 435 can include the specifications of each of the records to be followed (with the criteria for what feed tracked updates are to be provided and how they are displayed), as well as the feed.

Some implementations can provide various types of record (entity) feeds. Entity Feeds can exist for record types like account, opportunity, case, and contact. An entity feed can tell a user about the actions that people have taken on that particular record or on one its related records. The entity feed can include who made the action, which field was changed, and the old and new values. In one implementation, entity feeds can exist on all supported records as a list that is linked to the specific record. For example, a feed could be stored in a field that allows lists (e.g., linked lists) or as a child object.

IV. Tracking Actions of a User

In addition to knowing about events associated with a particular record, it can be helpful for a user to know what a particular user is doing. In particular, it might be nice to know what the user is doing without the user having to generate the feed tracked update (e.g., a user submitting a synopsis of what the user has done). Accordingly, implementations can automatically track actions of a user that trigger events, and feed tracked updates can be generated for certain events.

Figure 5:
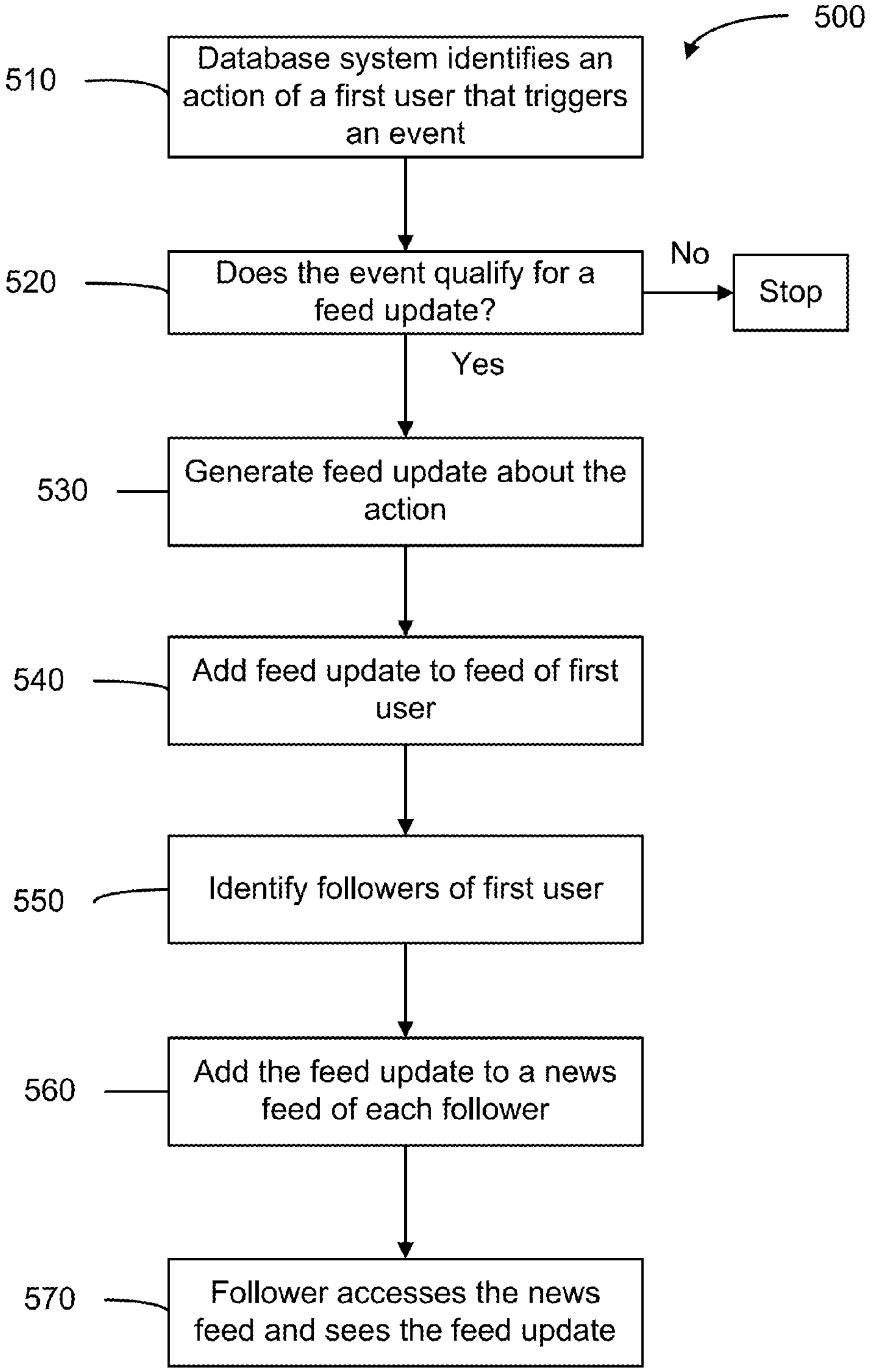
FIG. 5 shows a flowchart of an example of a method 500 for tracking actions of a user of a database system, performed in accordance with some implementations.

FIG. 5 shows a flowchart of an example of a method 500 for tracking actions of a user of a database system, performed in accordance with some implementations.

Method 500 may be performed in addition to method 300. The operations of method 300, including order of blocks, can be performed in conjunction with method 500 and other methods described herein. Thus, a feed can be composed of changes to a record and actions of users.

In block 510, a database system (e.g., 16 of FIGS. 1A and 1B) identifies an action of a first user. In one implementation, the action triggers an event, and the event is identified. For example, the action of a user requesting an update to a record can be identified, where the event is receiving a request or is the resulting update of a record. The action may thus be defined by the resulting event. In another implementation, only certain types of actions (events) are identified. Which actions are identified can be set as a default or can be configurable by a tenant, or even configurable at a user level. In this way, processing effort can be reduced since only some actions are identified.

In block 520, it is determined whether the event qualifies for a feed tracked update. In one implementation, a predefined list of events (e.g., as mentioned herein) can be created so that only certain actions are identified. In one implementation, an administrator (or other user) of a tenant can specify the type of actions (events) for which a feed tracked update is to be generated. This block may also be performed for method 300.

In block 530, a feed tracked update is generated about the action. In an example where the action is an update of a record, the feed tracked update can be similar or the same as the feed tracked update created for the record. The description can be altered though to focus on the user as opposed to the record. For example, "John D. has closed a new opportunity for account XYZ" as opposed to "an opportunity has been closed for account XYZ."

In block 540, the feed tracked update is added to a profile feed of the first user when, e.g., the user clicks on a tab to open a page in a browser program displaying the feed. In one implementation, a feed for a particular user can be accessed on a page of the user's profile, in a similar manner as a record feed can be accessed on a detail page of the record. In another implementation, the first user may not have a profile feed and the feed tracked update may just be stored temporarily before proceeding. A profile feed of a user can be stored associated with the user's profile. This profile feed can be added to a news feed of another user.

In block 550, followers of the first user are identified. In one implementation, a user can specify which type of actions other users can follow. Similarly, in one implementation, a follower can select what actions by a user the follower wants to follow. In an implementation where different followers follow different types of actions, which users are followers of that user and the particular action can be identified, e.g., using various lists that track what actions and criteria are being followed by a particular user. In various implementations, the followers of the first user can be identified in a similar manner as followers of a record, as described above for block 350.

In block 560, the feed tracked update is added to a news feed of each follower of the first user when, e.g., the follower clicks on a tab to open a page displaying the news feed. The feed tracked update can be added in a similar manner as the feed items for a record feed. The news feed can contain feed tracked updates both about users and records. In another implementation, a user can specify what kind of feed tracked updates to receive about a user that the user is following. For example, a user could specify feed tracked updates with particular keywords, of certain types of records, of records owned or created by certain users, particular fields, and other criteria as mentioned herein.

In block 570, a follower accesses the news feed and sees the feed tracked update. In one implementation, the user has just one news feed for all of the records that the user is following. In another implementation, a user can access his/her own feed (i.e. feed about his/her own actions) by selecting a particular tab or other object on a page of an interface to the database system. Thus, a feed can include feed tracked updates about what other users are doing in the database system. When a user becomes aware of a relevant action of another user, the user can contact the co-worker, thereby fostering teamwork.

V. Generation of a Feed Tracked Update

As described above, some implementations can generate text describing events (e.g., updates) that have occurred for a record and actions by a user that trigger an event. A database system can be configured to generate the feed tracked updates for various events in various ways.

In one implementation, the feed tracked update is a grammatical sentence, thereby being easily understandable by a person. In another implementation, the feed tracked update provides detailed information about the update. In various examples, an old value and new value for a field may be included in the feed tracked update, an action for the update may be provided (e.g., submitted for approval), and the names of particular users that are responsible for replying or acting on the feed tracked update may be also provided. The feed tracked update can also have a level of importance based on settings chosen by the administrator, a particular user requesting an update, or by a following user who is to receive the feed tracked update, which fields is updated, a percentage of the change in a field, the type of event, or any combination of these factors.

The system may have a set of heuristics for creating a feed tracked update from the event (e.g., a request to update). For example, the subject may be the user, the record, or a field being added or changed. The verb can be based on the action requested by the user, which can be selected from a list of verbs (which may be provided as defaults or input by an administrator of a tenant). In one implementation, feed tracked updates can be generic containers with formatting restrictions, As an example of a feed tracked update for a creation of a new record, "Mark Abramowitz created a new Opportunity for IBM—20,000 laptops with Amount as $3.5M and Sam Palmisano as Decision Maker." This event can be posted to the profile feed for Mark Abramowitz and the entity feed for record of Opportunity for IBM—20,000 laptops. The pattern can be given by (AgentFullName) created a new (ObjectName)(RecordName) with [(FieldName) as (FieldValue) [, / and]]*[[added/changed/removed] (RelatedListRecordName) [as / to / as] (RelatedListRecordValue) [, / and]]*. Similar patterns can be formed for a changed field (standard or custom) and an added child record to a related list.

VI. Tracking Commentary from or about a User

Some implementations can also have a user submit text, instead of the database system generating a feed tracked update. As the text is submitted as part or all of a message by a user, the text can be about any topic. Thus, more information than just actions of a user and events of a record can be conveyed. In one implementation, the messages can be used to ask a question about a particular record, and users following the record can provide comments and responses.

Figure 6:
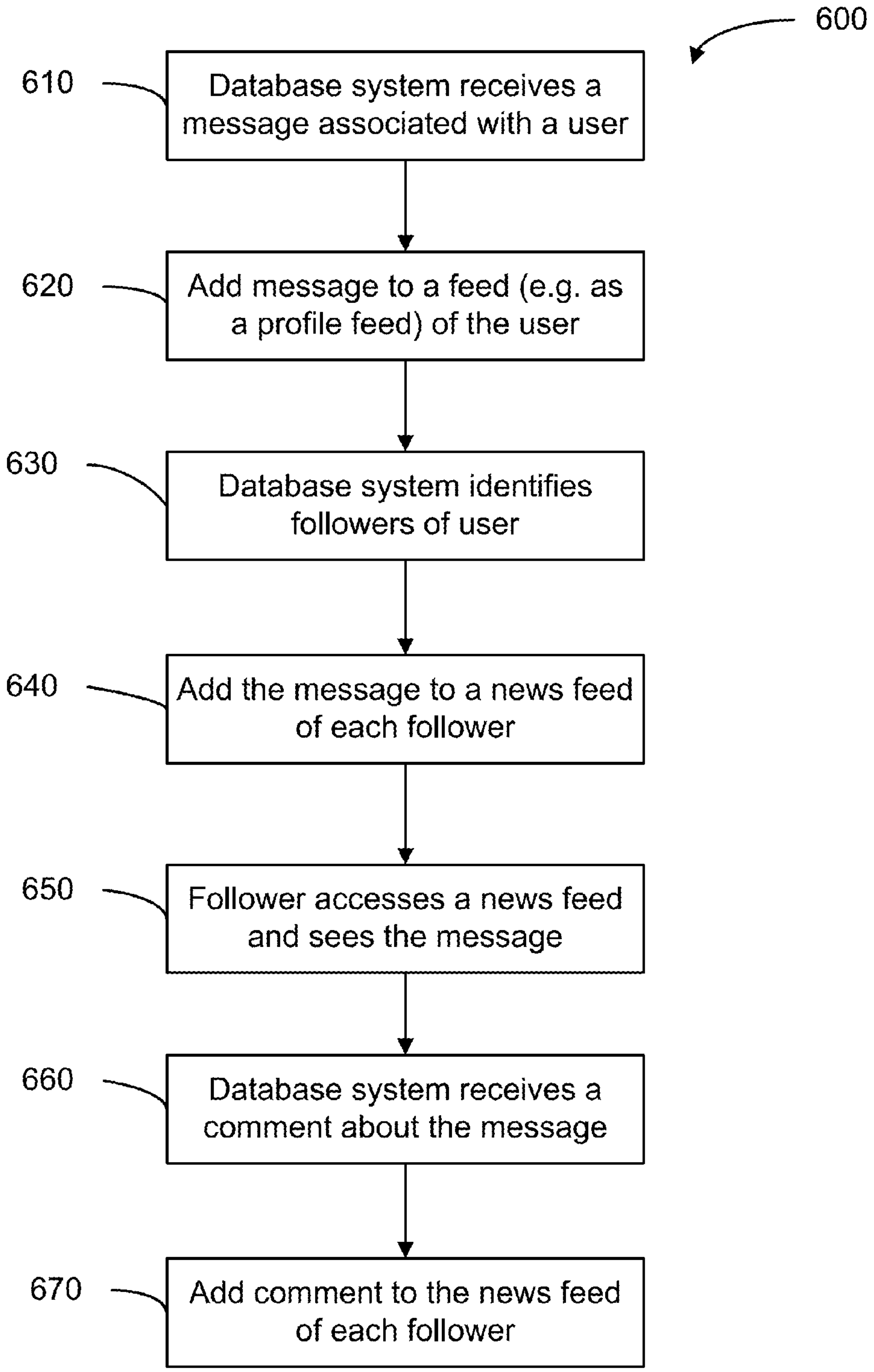
FIG. 6 shows a flowchart of an example of a method 600 for creating a news feed from messages created by a user about a record or another user, performed in accordance with some implementations.

FIG. 6 shows a flowchart of an example of a method 600 for creating a news feed from messages created by a user about a record or another user, performed in accordance with some implementations. In one implementation, method 600 can be combined with methods 300 and 500. In one aspect, a message can be associated with the first user when the first user creates the message (e.g., a post or comment about a record or another user). In another aspect, a message can be associated with the first user when the message is about the first user (e.g., posted by another user on the first user's profile feed).

In block 610, the database system receives a message (e.g., a post or status update) associated with a first user. The message (e.g., a post or status update) can contain text and/or multimedia content submitted by another user or by the first user. In one implementation, a post is for a section of the first user's profile page where any user can add a post, and where multiple posts can exist. Thus, a post can appear on the first user's profile page and can be viewed when the first user's profile is visited. For a message about a record, the post can appear on a detail page of a record. Note the message can appear in other feeds as well. In another implementation, a status update about the first user can only be added by the first user. In one implementation, a user can only have one status message.

In block 620, the message is added to a table, as described in greater detail below. When the feed is opened, a query filters one or more tables to identify the first user, identify other persons that the user is following, and retrieve the message. Messages and record updates are presented in a combined list as the feed. In this way, in one implementation, the message can be added to a profile feed of the first user, which is associated (e.g., as a related list) with the first user's profile. In one implementation, the posts are listed indefinitely. In another implementation, only the most recent posts (e.g., last 50) are kept in the profile feed. Such implementations can also be employed with feed tracked updates. In yet another implementation, the message can be added to a profile of the user adding the message.

In block 630, the database system identifies followers of the first user. In one implementation, the database system can identify the followers as described above for method 500. In various implementations, a follower can select to follow a feed about the actions of the first user, messages about the first user, or both (potentially in a same feed).

In block 640, the message is added to a news feed of each follower. In one implementation, the message is only added to a news feed of a particular follower if the message matches some criteria, e.g., the message includes a particular keyword or other criteria. In another implementation, a message can be deleted by the user who created the message. In one implementation, once deleted by the author, the message is deleted from all feeds to which the message had been added.

In block 650, the follower accesses a news feed and sees the message. For example, the follower can access a news feed on the follower's own profile page. As another example, the follower can have a news feed sent to his/her own desktop without having to first go to a home page.

In block 660, the database system receives a comment about the message. The database system can add the comment to a feed of the same first user, much as the original message was added. In one implementation, the comment can also be added to a feed of a second user who added the comment. In one implementation, users can also reply to the comment. In another implementation, users can add comments to a feed tracked update, and further comments can be associated with the feed tracked update. In yet another implementation, making a comment or message is not an action to which a feed tracked update is created. Thus, the message may be the only feed item created from such an action.

In one implementation, if a feed tracked update or post is deleted, its corresponding comments are deleted as well. In another implementation, new comments on a feed tracked update or post do not update the feed tracked update timestamp. Also, the feed tracked update or post can continue to be shown in a feed (profile feed, record feed, or news feed) if it has had a comment within a specified timeframe (e.g., within the last week). Otherwise, the feed tracked update or post can be removed in an implementation.

In some implementations, all or most feed tracked updates can be commented on. In other implementations, feed tracked updates for certain records (e.g., cases or ideas) are not commentable. In various implementations, comments can be made for any one or more records of opportunities, accounts, contacts, leads, and custom objects.

In block 670, the comment is added to a news feed of each follower. In one implementation, a user can make the comment within the user's news feed. Such a comment can propagate to the appropriate profile feed or record feed, and then to the news feeds of the following users. Thus, feeds can include what people are saying, as well as what they are doing. In one aspect, feeds are a way to stay up-to-date (e.g., on users, opportunities, etc.) as well as an opportunity to reach out to co-workers/partners and engage them around common goals.

In some implementations, users can rate feed tracked updates or messages (including comments). A user can choose to prioritize a display of a feed so that higher rated feed items show up higher on a display. For example, in an implementation where comments are answers to a specific question, users can rate the different status posts so that a best answer can be identified. As another example, users are able to quickly identify feed items that are most important as those feed items can be displayed at a top of a list. The order of the feed items can be based on an importance level (which can be determined by the database system using various factors, some of which are mentioned herein) and based on a rating from users. In one implementation, the rating is on a scale that includes at least 3 values. In another implementation, the rating is based on a binary scale.

Besides a profile for a user, a group can also be created. In various implementations, the group can be created based on certain attributes that are common to the users, can be created by inviting users, and/or can be created by receiving requests to join from a user. In one implementation, a group feed can be created, with messages being added to the group feed when someone submits a message to the group as a whole through a suitable user interface. For example, a group page may have a group feed or a section within the feed for posts, and a user can submit a post through a publisher component in the user interface by clicking on a "Share" or similar button. In another implementation, a message can be added to a group feed when the message is submitted about any one of the members. Also, a group feed can include feed tracked updates about actions of the group as a whole (e.g., when an administrator changes data in a group profile or a record owned by the group), or about actions of an individual member.

Figure 7:
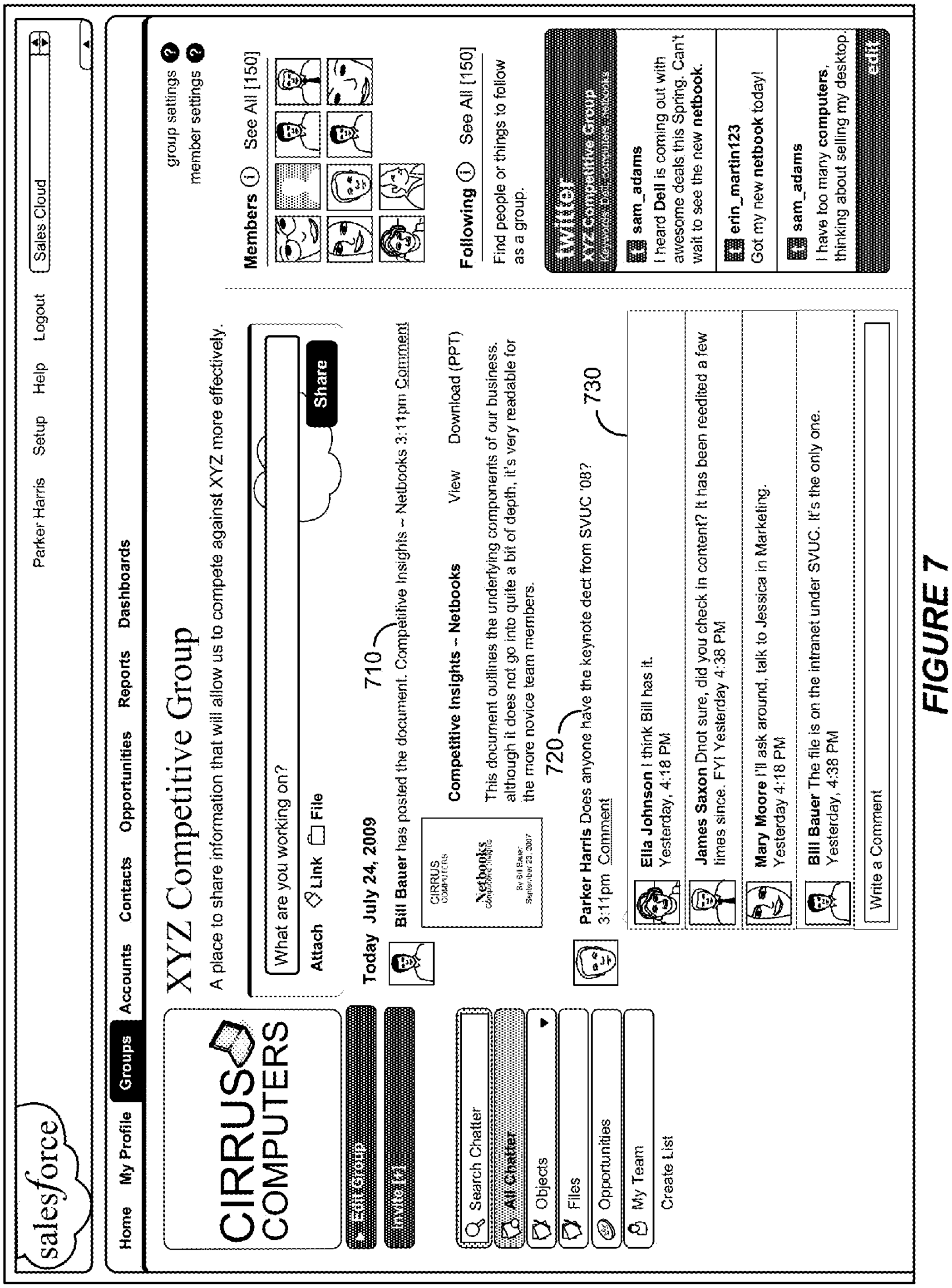
FIG. 7 shows an example of a group feed on a group page according to some implementations.

FIG. 7 shows an example of a group feed on a group page according to some implementations. As shown, a feed item 710 shows that a user has posted a document to the group object. The text "Bill Bauer has posted the document Competitive Insights" can be generated by the database system in a similar manner as feed tracked updates about a record being changed. A feed item 720 shows a post to the group, along with comments 730 from Ella Johnson, James Saxon, Mary Moore and Bill Bauer.

Figure 8:
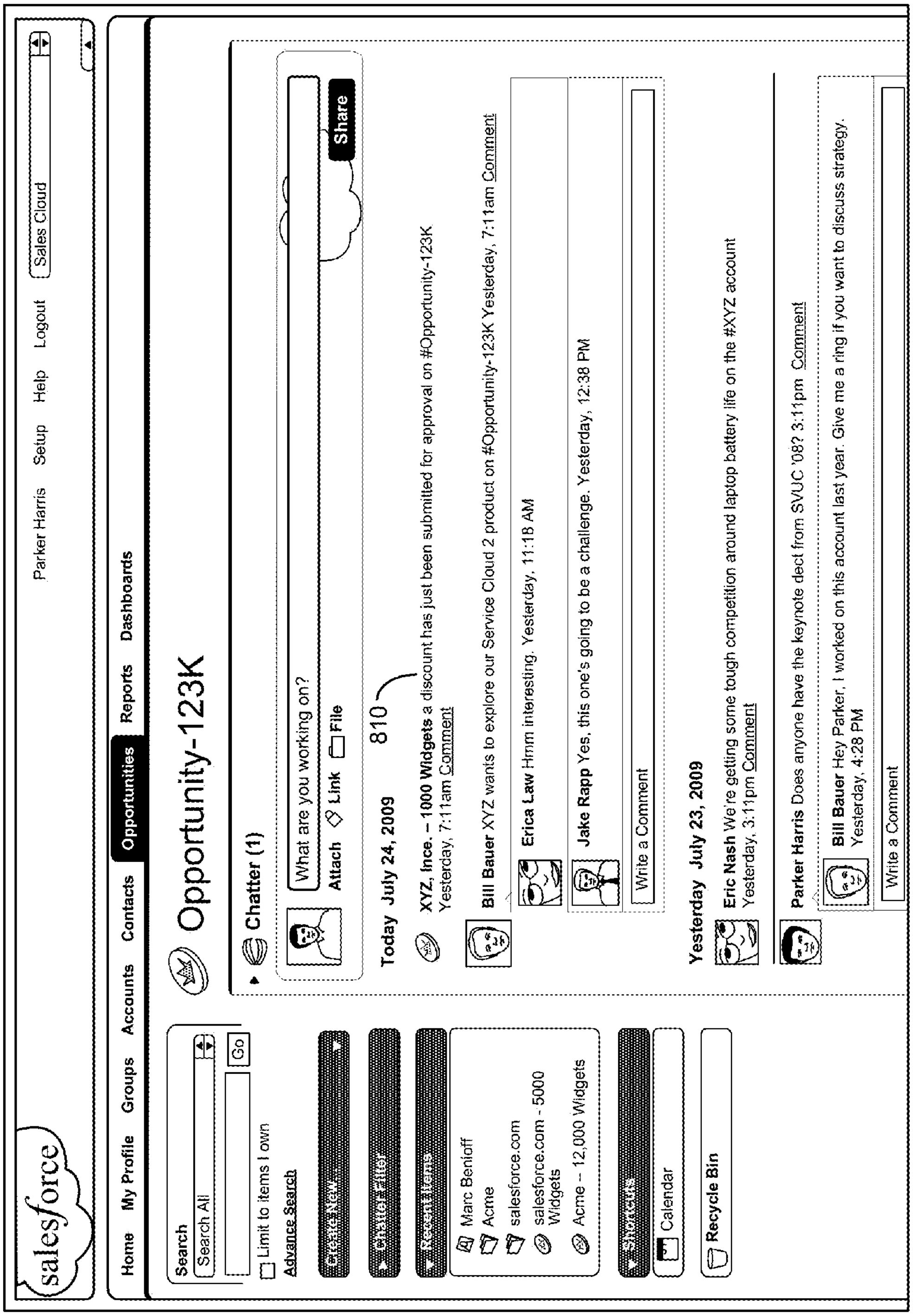
FIG. 8 shows an example of a record feed containing a feed tracked update, post, and comments according to some implementations.

FIG. 8 shows an example of a record feed containing a feed tracked update, post, and comments according to some implementations. Feed item 810 shows a feed tracked update based on the event of submitting a discount for approval. Other feed items show posts, e.g., from Bill Bauer, that are made to the record and comments, e.g., from Erica Law and Jake Rapp, that are made on the posts.

VII. Infrastructure for a Feed

A. Tables Used to Create a Feed

FIG. 9A shows an example of a plurality of feed tracked update tables that may be used in tracking events and creating feeds according to some implementations. The tables of FIG. 9A may have entries added, or potentially removed, as part of tracking events in the database from which feed items are creates or that correspond to feed items. In one implementation, each tenant has its own set of tables that are created based on criteria provided by the tenant.

An event history table 910 can provide a feed tracked update of events from which feed items are created. In one aspect, the events are for objects that are being tracked. Thus, table 910 can store and change feed tracked updates for feeds, and the changes can be persisted. In various implementations, event history table 910 can have columns of event ID 911, object ID 912 (also called parent ID), and created by ID 913. The event ID 911 can uniquely identify a particular event and can start at 1 (or other number or value).

Each new event can be added chronologically with a new event ID, which may be incremented in order. An object ID 912 can be used to track which record or user's profile is being changed. For example, the object ID can correspond to the record whose field is being changed or the user whose feed is receiving a post. The created by ID 913 can track the user who is performing the action that results in the event, e.g., the user that is changing the field or that is posting a message to the profile of another user.

In one implementation, a name of an event can also be stored in table 910. In one implementation, a tenant can specify events that they want tracked. In an implementation, event history table 910 can include the name of the field that changed (e.g., old and new values). In another implementation, the name of the field, and the values, are stored in a separate table. Other information about an event (e.g., text of comment, feed tracked update, post or status update) can be stored in event history table 910, or in other tables, as is now described.

A field change table 920 can provide a feed tracked update of the changes to the fields. The columns of table 920 can include an event ID 921 (which correlates to the event ID 911), an old value 922 for the field, and the new value 923 for the field. In one implementation, if an event changes more than one field value, then there can be an entry for each field changed. As shown, event ID 921 has two entries for event E37.

A comment table 930 can provide a feed tracked update of the comments made regarding an event, e.g., a comment on a post or a change of a field value. The columns of table 930 can include an event ID 921 (which correlates to the event ID 911), the comment column 932 that stores the text of the comment, and the time/date 933 of the comment. In one implementation, there can be multiple comments for each event. As shown, event ID 921 has two entries for event E37.

A user subscription table 940 can provide a list of the objects being followed (subscribed to) by a user. In one implementation, each entry has a user ID 941 of the user doing the following and one object ID 942 corresponding to the object being followed. In one implementation, the object being followed can be a record or a user. As shown, the user with ID U819 is following object IDs O615 and O489. If user U819 is following other objects, then additional entries may exist for user U819. Also as shown, user U719 is also following object O615. The user subscription table 940 can be updated when a user adds or deletes an object that is being followed.

In one implementation, regarding a profile feed and a news feed, these are read-only views on the event history table 910 specialized for these feed types. Conceptually the news feed can be a semi-join between the user subscription table 940 and the event history table 910 on the object IDs 912 and 942 for the user. In one aspect, these entities can have polymorphic parents and can be subject to a number of restrictions detailed herein, e.g., to limit the cost of sharing checks.

In one implementation, entity feeds are modeled in the API as a feed associate entity (e.g., AccountFeed, CaseFeed, etc). A feed associate entity includes information composed of events (e.g., event IDs) for only one particular record type. Such a list can limit the query (and sharing checks) to a specific record type. In one aspect, this structuring of the entity feeds can make the query run faster. For example, a request for a feed of a particular account can include the record type of account. In one implementation, an account feed table can then be searched, where the table has account record IDs and corresponding event IDs or pointers to particular event entries in event history table 910. Since the account feed table only contains some of the records (not all), the query can run faster.

In one implementation, there may be objects with no events listed in the event history table 910, even though the record is being tracked. In this case, the database service can return a result indicating that no feed items exist.

A feed item can represent an individual field change of a record, creation and deletion of a record, or other events being tracked for a record or a user. In one implementation, all of the feed items in a single transaction (event) can be grouped together and have the same event ID. A single transaction relates to the operations that can be performed in a single communication with the database. In another implementation where a feed is an object of the database, a feed item can be a child of a profile feed, news feed, or entity feed. If a feed item is added to multiple feeds, the feed item can be replicated as a child of each feed to which the feed item is added.

In some implementations, a comment exists as an item that depends from feed tracked updates, posts, status updates, and other items that are independent of each other. Thus, a feed comment object can exist as a child object of a feed item object. For example, comment table 930 can be considered a child table of event history table 910. In one implementation, a feed comment can be a child of a profile feed, news feed, or entity feed that is separate from other feed items.

In one implementation, viewing a feed pulls up the most recent messages or feed tracked updates (e.g., 25) and searches the most recent (e.g., 4) comments for each feed item. The comments can be identified via the comment table 930. In one implementation, a user can request to see more comments, e.g., by selecting a see more link.

After feed items have been generated, they can be filtered so that only certain feed items are displayed, which may be tailored to a specific tenant and/or user. In one implementation, a user can specify changes to a field that meet certain criteria for the feed item to show up in a feed displayed to the user, e.g., a news feed or even an entity feed displayed directly to the user. In one implementation, the criteria can be combined with other factors (e.g., number of feed items in the feed) to determine which feed items to display. For instance, if a small number of feed items exist (e.g., below a threshold), then all of the feed items may be displayed.

In one implementation, a user can specify the criteria via a query on the feed items in his/her new feed, and thus a feed may only return objects of a certain type, certain types of events, feed tracked updates about certain fields, and other criteria mentioned herein. Messages can also be filtered according to some criteria, which may be specified in a query. Such an added query can be added onto a standard query that is used to create the news feed for a user. A first user could specify the users and records that the first user is following in this manner, as well as identify the specific feed items that the first user wants to follow. The query could be created through a graphical interface or added by a user directly in a query language. Other criteria could include receiving only posts directed to a particular user or record, as opposed to other feed items.

In one implementation, a user can access a feed of a record if the user can access the record. The security rules for determining whether a user has access to a record can be performed in a variety of ways, some of which are described in commonly assigned U.S. Pat. No. 8,095,531, titled METHODS AND SYSTEMS FOR CONTROLLING ACCESS TO CUSTOM OBJECTS IN A DATABASE, by Weissman et al., issued on Jan. 10, 2012, and hereby incorporated by reference in its entirety and for all purposes.

In one implementation, a user can edit a feed of a record if the user has access to the record, e.g., deleting or editing a feed item. In another implementation, a user (besides an administrator) cannot edit a feed item, except for performing an action from which a feed item can be created. In one example, a user is first has to have access to a particular record and field for a feed item to be created based on an action of the user. In this case, an administrator can be considered to be a user with MODIFY-ALL-DATA security level. In yet another implementation, a user who created the record can edit the feed.

In one implementation, the text of posts are stored in a child table (post table 950), which can be cross-referenced with event history table 910. Post table 950 can include event ID 951 (to cross-reference with event ID 911), post text 952 to store the text of the post, and time/date 953. An entry in post table 950 can be considered a feed post object.

VIII. Subscribing to Users and Records to Follow

As described above, a user can follow users, groups, and records. Implementations can provide mechanisms for a user to manage which users, groups, and records that the user is currently following. In one implementation, a user can be limited to the number of users and records (collectively or separately) that the user can follow. For example, a user may be restricted to only following 10 users and 15 records, or as another example, 25 total. Alternatively, the user may be permitted to follow more or less users.

In one implementation, a user can go to a page of a record and then select to follow that object (e.g., with a button marked "follow" or "join"). In another implementation, a user can search for a record and have the matching records show up in a list. The search can include criteria of records that the user might want to follow. Such criteria can include the owner, the creation date, last comment date, and numerical values of particular fields (e.g., an opportunity with a value of more than $10,000).

A follow button (or other activation object) can then reside next to each record in the resulting list, and the follow button can be selected to start following the record. Similarly, a user can go to a profile page of a user and select to follow the user, or a search for users can provide a list, where one or more users can be selected for following from the list. The selections of subscribing and unsubscribing can add and delete rows in table 920.

In some implementations, a subscription center acts as a centralized place in a database application (e.g., application platform 18) to manage which records a user subscribes to, and which field updates the user wants to see in feed tracked updates. The subscription center can use a subscription table to keep track of the subscriptions of various users. In one implementation, the subscription center shows a list of all the items (users and records) a user is subscribed to. In another implementation, a user can unsubscribe to subscribed objects from the subscription center.

A. Automatic Subscription

Figure 9B:
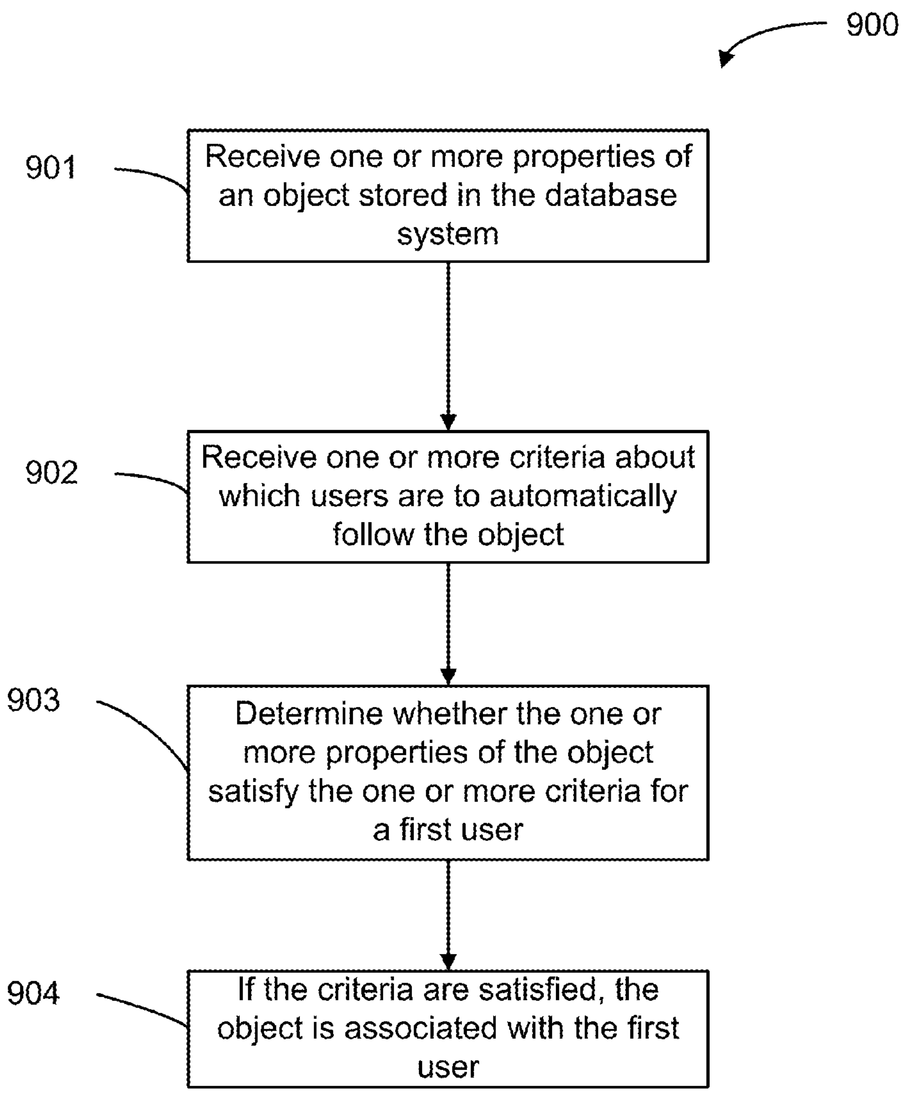
FIG. 9B shows a flowchart of an example of a method 900 for automatically subscribing a user to an object in a database system, performed in accordance with some implementations.

FIG. 9B shows a flowchart of an example of a method 900 for automatically subscribing a user to an object in a database system, performed in accordance with some implementations. Any of the following blocks can be performed wholly or partially with the database system, and in particular by one or more processor of the database system.

In block 901, one or more properties of an object stored in the database system are received. The properties can be received from administrators of the database system, or from users of the database system (which may be an administrator of a customer organization). The properties can be records or users, and can include any of the fields of the object that are stored in the database system. Examples of properties of a record include: an owner of the record, a user that converted the record from one record type to another record type, whether the first user has viewed the record, and a time the first user viewed the record. Examples of properties of a user include: which organization (tenant) the user is associated with, the second user's position in the same organization, and which other users the user had emailed or worked with on projects.

In block 902, the database system receives one or more criteria about which users are to automatically follow the object. Examples of the criteria can include: an owner or creator of a record is to follow the record, subordinates of an owner or creator of a record are to follow the record, and a user is to follow his/her manager, the user's peers, other users in the same business group as the user, and other users that the user has emailed or worked with on a project. The criteria can be specific to a user or group of users (e.g., users of a tenant).

In block 903, the database system determines whether the one or more properties of the object satisfy the one or more criteria for a first user. In one implementation, this determination can occur by first obtaining the criteria and then determining objects that satisfy the criteria. The determination can occur periodically, at time of creation of an object, or at other times.

In block 904, if the criteria are satisfied, the object is associated with the first user. The association can be in a list that stores information as to what objects are being followed by the first user. User subscription table 940 is an example of such a list. In one implementation, the one or more criteria are satisfied if one property satisfies at least one criterion. Thus, if the criteria are that a user follows his/her manager and the object is the user's manager, then the first user will follow the object.

In one implementation, a user can also be automatically unsubscribed, e.g., if a certain action happens. The action could be a change in the user's position within the organization, e.g., a demotion or becoming a contractor. As another example, if a case gets closed, then users following the case may be automatically unsubscribed.

IX. Adding Items to a Feed

As described above, a feed includes feed items, which include feed tracked updates and messages, as defined herein. Various feeds can be generated. For example, a feed can be generated about a record or about a user. Then, users can view these feeds. A user can separately view a feed of a record or user, e.g., by going to a home page for the user or the record. As described above, a user can also follow another user or record and receive the feed items of those feeds through a separate feed application. The feed application can provide each of the feeds that a user is following and, in some examples, can combine various feeds in a single social network feed.

A feed generator can refer to any software program running on a processor or a dedicated processor (or combination thereof) that can generate feed items (e.g., feed tracked updates or messages) and combine them into a feed. In one implementation, the feed generator can generate a feed item by receiving a feed tracked update or message, identifying what feeds the item should be added to, and adding the feed. Adding the feed can include adding additional information (metadata) to the feed tracked update or message (e.g., adding a document, sender of message, a determined importance, etc.). The feed generator can also check to make sure that no one sees feed tracked updates for data that they don't have access to see (e.g., according to sharing rules). A feed generator can run at various times to pre-compute feeds or to compute them dynamically, or combinations thereof.

In one implementation, processor 417 in FIG. 4 can identify an event that meets criteria for a feed tracked update, and then generate the feed tracked update. Processor 417 can also identify a message. For example, an application interface can have certain mechanisms for submitting a message (e.g., "submit" buttons on a profile page, detail page of a record, "comment" button on post), and use of these mechanisms can be used to identify a message to be added to a table used to create a feed or added directly to a list of feed items ready for display.

A. Adding Items to a Pre-Computed Feed

In some implementations, a feed of feed items is created before a user requests the feed. Such an implementation can run fast, but have high overall costs for storage. In one implementation, once a profile feed or a record feed has been created, a feed item (messages and feed tracked updates) can be added to the feed. The feed can exist in the database system in a variety of ways, such as a related list. The feed can include mechanisms to remove items as well as add them.

As described above, a news feed can be an aggregated feed of all the record feeds and profile feeds to which a user has subscribed. The news feed can be provided on the home page of the subscribing user. Therefore, a news feed can be created by and exist for a particular user. For example, a user can subscribe to receive entity feeds of certain records that are of interest to the user, and to receive profile feeds of people that are of interest (e.g., people on a same team, that work for the user, are a boss of the user, etc.). A news feed can tell a user about all the actions across all the records (and people) whom have explicitly (or implicitly) been subscribed to via the subscriptions center (described above).

In one implementation, only one instance of each feed tracked update is shown on a user's news feed, even if the feed tracked update is published in multiple entities to which the user is subscribed. In one aspect, there may be delays in publishing news articles. For example, the delay may be due to queued up messages for asynchronous entity feed tracked update persistence. Different feeds may have different delays (e.g., delay for new feeds, but none of profile and entity feeds). In another implementation, certain feed tracked updates regarding a subscribed profile feed or an entity feed are not shown because the user is not allowed access, e.g., due to sharing rules (which restrict which users can see which data). Also, in one implementation, data of the record that has been updated (which includes creation) can be provided in the feed (e.g., a file or updated value of a feed can be added as a flash rendition).

B. Dynamically Generating Feeds

In some implementations, a feed generator can generate the feed items dynamically when a user requests to see a particular feed, e.g., a profile feed, entity feed, or the user's news feed. In one implementation, the most recent feed items (e.g., top 50) are generated first. In one aspect, the other feed items can be generated as a background process, e.g., not synchronously with the request to view the feed. However, since the background process is likely to complete before a user gets to the next 50 feed items, the feed generation may appear synchronous. In another aspect, the most recent feed items may or may not include comments, e.g., that are tied to feed tracked updates or posts.

In one implementation, the feed generator can query the appropriate subset of tables shown in FIG. 9A and/or other tables as necessary, to generate the feed items for display. For example, the feed generator can query the event history table 910 for the updates that occurred for a particular record. The ID of the particular record can be matched against the ID of the record. In one implementation, changes to a whole set of records can be stored in one table. The feed generator can also query for status updates, posts, and comments, each of which can be stored in different parts of a record or in separate tables, as shown in FIG. 9A. What gets recorded in the entity event history table (as well as what is displayed) can be controlled by a feed settings page in setup, which can be configurable by an administrator and can be the same for the entire organization, as is described above for custom feeds.

In one implementation, there can be two feed generators. For example, one generator can generate the record and profile feeds and another generator can generate news feeds. For the former, the feed generator can query identifiers of the record or the user profile. For the latter, the news feed generator can query the subscribed profile feeds and record feeds, e.g., user subscription table 940. In one implementation, the feed generator looks at a person's subscription center to decide which feeds to query for and return a list of feed items for the user. The list can be de-duped, e.g., by looking at the event number and values for the respective table, such as field name or ID, comment ID, or other information.

C. Adding Information to Feed Tracked Update Tables

Figure 10:
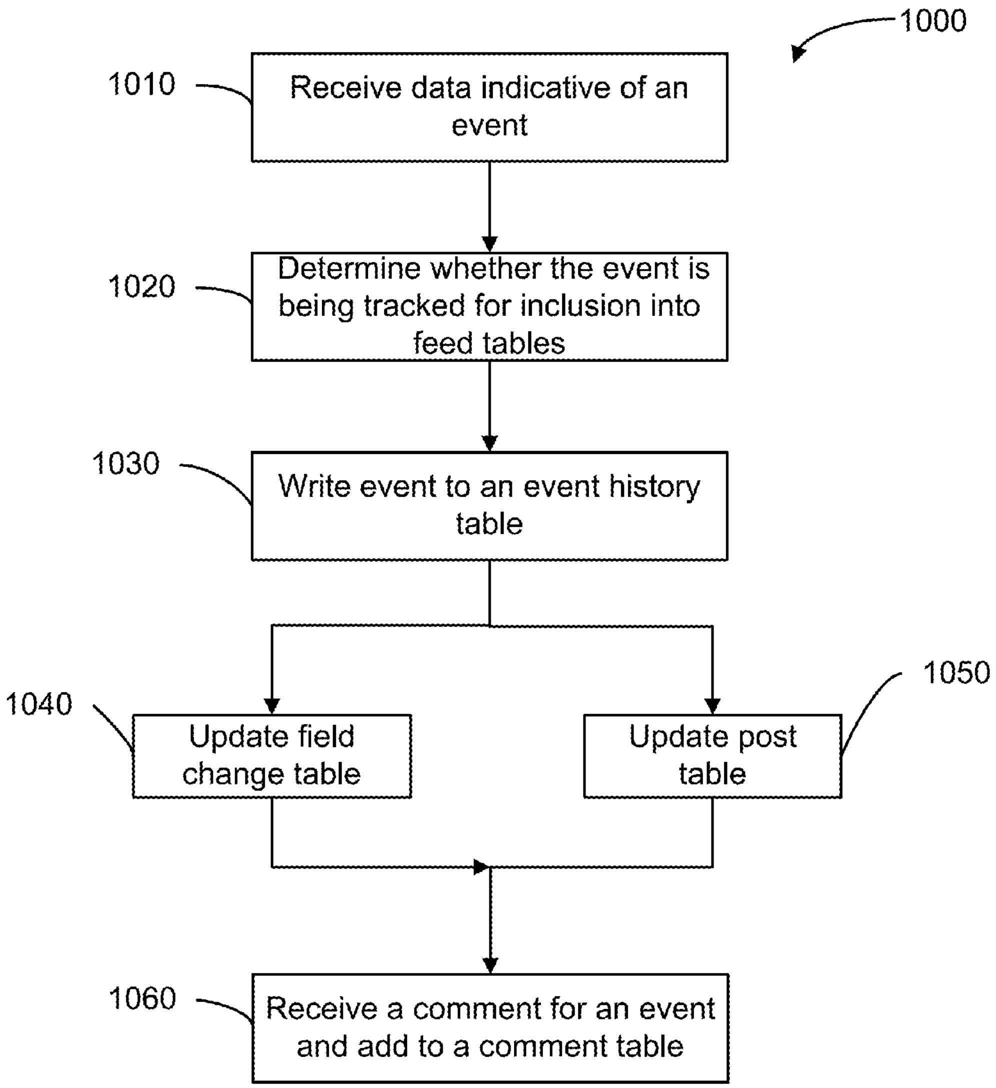
FIG. 10 shows a flowchart of an example of a method 1000 for saving information to feed tracking tables, performed in accordance with some implementations.

FIG. 10 shows a flowchart of an example of a method 1000 for saving information to feed tracking tables, performed in accordance with some implementations. In one implementation, some of the blocks may be performed regardless of whether a specific event or part of an event (e.g., only one field of an update is being tracked) is being tracked. In various implementations, a processor or set of processors (hardwired or programmed) can perform method 1000 and any other method described herein.

In block 1010, data indicative of an event is received. The data may have a particular identifier that specifies the event. For example, there may be a particular identifier for a field update. In another implementation, the transaction may be investigated for keywords identifying the event (e.g., terms in a query indicating a close, change field, or create operations).

In block 1020, it is determined whether the event is being tracked for inclusion into feed tracked update tables. The determination of what is being tracked can be based on a tenant's configuration as described above. In one aspect, the event has an actor (person performing an event), and an object of the event (e.g., record or user profile being changed).

In block 1030, the event is written to an event history table (e.g., table 910). In one implementation, this feed tracking operation can be performed in the same transaction that performs a save operation for updating a record. In another implementation, a transaction includes at least two roundtrip database operations, with one roundtrip being the database save (write), and the second database operation being the saving of the update in the feed tracked update table. In one implementation, the event history table is chronological. In another implementation, if user A posts on user B's profile, then user A is under the "created by" 913 and user B is under the object ID 912.

In block 1040, a field change table (e.g., field change table 920) can be updated with an entry having the event identifier and fields that were changed in the update. In one implementation, the field change table is a child table of the event history table. This table can include information about each of the fields that are changed. For example, for an event that changes the name and balance for an account record, an entry can have the event identifier, the old and new name, and the old and new balance. Alternatively, each field change can be in a different row with the same event identifier. The field name or ID can also be included to determine which field the values are associated.

In block 1050, when the event is a post, a post table (e.g., post table 950) can be updated with an entry having the event identifier and text of the post. In one implementation, the field change table is a child table of the event history table. In another implementation, the text can be identified in the transaction (e.g., a query command), stripped out, and put into the entry at the appropriate column. The various tables described herein can be combined or separated in various ways. For example, the post table and the field change table may be part of the same table or distinct tables, or may include overlapping portions of data.

In block 1060, a comment is received for an event and the comment is added to a comment table (e.g., comment table 930). The comment could be for a post or an update of a record, from which a feed tracked update can be generated for display. In one implementation, the text can be identified in the transaction (e.g., a query command), stripped out, and put into the entry at the appropriate column.

D. Reading Information from Feed Tracked Update Tables

Figure 11:
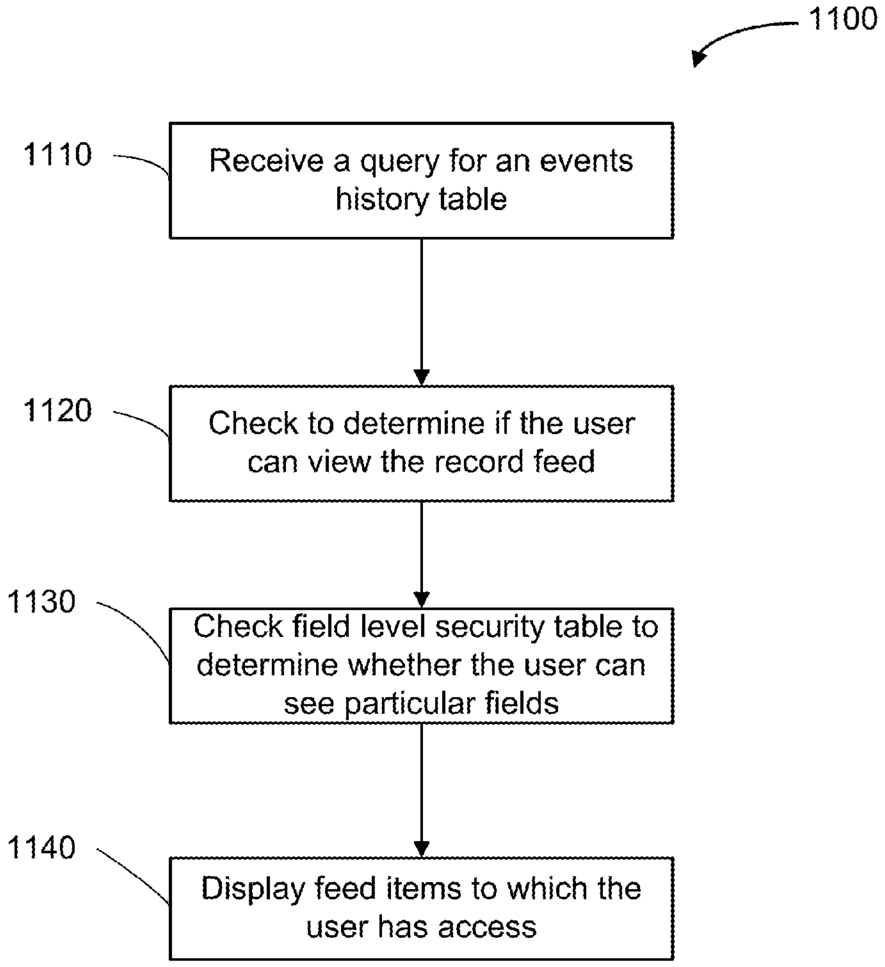
FIG. 11 shows a flowchart of an example of a method 1100 for reading a feed item as part of generating a feed for display, performed in accordance with some implementations.

FIG. 11 shows a flowchart of an example of a method 1100 for reading a feed item as part of generating a feed for display, performed in accordance with some implementations. In one implementation, the feed item may be read as part of creating a feed for a record.

In block 1110, a query is received for an events history table (e.g., event history table 910) for events related to a particular record. In one implementation, the query includes an identifier of the record for which the feed is being requested. In various implementations, the query may be initiated from a detail page of the record, a home page of a user requesting the record feed, or from a listing of different records (e.g., obtained from a search or from browsing).

In block 1120, the user's security level can be checked to determine if the user can view the record feed. Typically, a user can view a record feed, if the user can access the record. This security check can be performed in various ways. In one implementation, a first table is checked to see if the user has a classification (e.g., a security level that allows him to view records of the given type). In another implementation, a second table is checked to see if the user is allowed to see the specific record. The first table can be checked before the second table, and both tables can be different sections of a same table. If the user has requested the feed from the detail page of the record, one implementation can skip the security level check for the record since the check was already done when the user requested to view the detail page.

In one implementation, a security check is determined upon each request to view the record feed. Thus, whether or not a feed item is displayed to a user is determined based on access rights, e.g., when the user requests to see a feed of a record or a news feed of all the objects the user is following. In this manner, if a user's security changes, a feed automatically adapts to the user's security level when it is changed. In another implementation, a feed can be computed before being requested and a subsequent security check can be made to determine whether the person still has access right to view the feed items. The security (access) check may be at the field level, as well as at the record level.

In block 1130, if the user can access the record, a field level security table can be checked to determine whether the user can see particular fields. In one implementation, only those fields are displayed to the user. Alternatively, a subset of those the user has access to is displayed. The field level security check may optionally be performed at the same time and even using the same operation as the record level check. In addition, the record type check may also be performed at this time. If the user can only see certain fields, then any feed items related to those fields (e.g., as determined from field change table 920) can be removed from the feed being displayed.

In block 1140, the feed items that the user has access to are displayed. In one implementation, a predetermined number (e.g., 20) of feed items are displayed at a time. The method can display the first 20 feed items that are found to be readable, and then determine others while the user is viewing the first 20. In another implementation, the other feed items are not determined until the user requests to see them, e.g., by activating a see more link.

Figure 12:
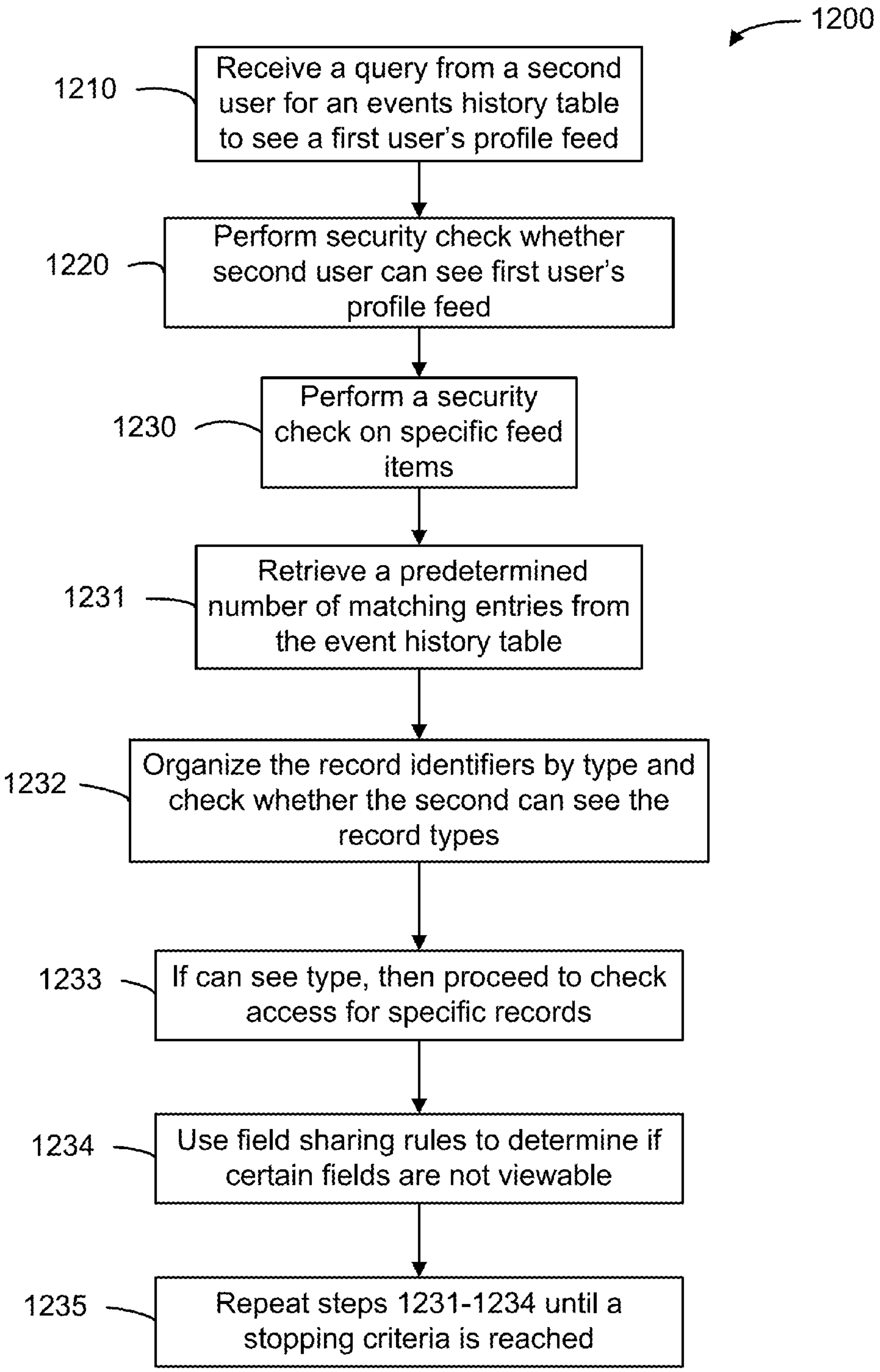
FIG. 12 shows a flowchart of an example of a method 1200 for reading a feed item of a profile feed for display, performed in accordance with some implementations.

FIG. 12 shows a flowchart of an example of a method 1200 for reading a feed item of a profile feed for display, performed in accordance with some implementations. In one implementation, the query includes an identifier of the user profile feed that is being requested. Certain blocks may be optional, as is also true for other methods described herein. For example, security checks may not be performed.

In block 1210, a query is directed to an event history table (e.g., event history table 910) for events having a first user as the actor of the event (e.g., creation of an account) or on which the event occurred (e.g., a post to the user's profile). In various implementations, the query may be initiated by a second user from the user's profile page, a home page of a user requesting the profile feed (e.g., from a list of users being followed), or from a listing of different users (e.g., obtained from a search or from browsing). Various mechanisms for determining aspects of events and obtaining information from tables can be the same across any of the methods described herein.

In block 1220, a security check may also be performed on whether the second user can see the first user's profile. In one implementation any user can see the profile of another user of the same tenant, and block 1220 is optional.

In block 1230, a security (access) check can be performed for the feed tracked updates based on record types, records, and/or fields, as well security checks for messages. In one implementation, only the feed tracked updates related to records that the person has updated are the ones that need security check as the feed items about the user are readable by any user of the same tenant. Users of other tenants are not navigable, and thus security can be enforced at a tenant level. In another implementation, messages can be checked for keywords or links to a record or field that the second user does not have access.

As users can have different security classifications, it is important that a user with a low-level security cannot see changes to records that have been performed by a user with high-level security. In one implementation, each feed item can be checked and then the viewable results displayed, but this can be inefficient. For example, such a security check may take a long time, and the second user would like to get some results sooner rather than later. The following blocks illustrate one implementation of how security might be checked for a first user that has a lot of feed items, but the second user cannot see most of them. This implementation can be used for all situations, but can be effective in the above situation.

In block 1231, a predetermined number of entries are retrieved from the event history table (e.g., starting from the most recent, which may be determined from the event identifier). The retrieved entries may just be ones that match the user ID of the query. In one implementation, entries are checked to find the entries that are associated with the user and with a record (i.e. not just posts to the user account). In another implementation, those entries associated with the user are allowed to be viewed, e.g., because the second user can see the profile of the first user as determined in block 1220.

In block 1232, the record identifiers are organized by type and the type is checked on whether the second user can see the record types. Other checks such as whether a record was manually shared (e.g., by the owner) can also be performed. In one implementation, the queries for the different types can be done in parallel.

In block 1233, if a user can see the record type, then a check can be performed on the specific record. In one implementation, if a user can see a record type, then the user can see all of the records of that type, and so this block can be skipped. In another implementation, the sharing model can account for whether a user below the second user (e.g., the second user is a manager) can see the record. In such an implementation, the second user may see such a record. In one implementation, if a user cannot see a specific record, then comments on that record are also not viewable.

In block 1234, field level sharing rules can be used to determine whether the second user can see information about an update or value of certain fields. In one implementation, messages can be analyzed to determine if reference to a particular field name is made. If so, then field level security can be applied to the messages.

In block 1280, blocks 1231-1234 are repeated until a stopping criterion is met. In one implementation, the stopping criteria may be when a maximum number (e.g., 100) of entries that are viewable have been identified. In another implementation, the stopping criteria can be that a maximum number (e.g., 500) of entries from the entity feed tracked update table have been analyzed, regardless of whether the entries are viewable or not.

In one implementation, a news feed can be generated as a combination of the profile feeds and the entity feeds, e.g., as described above. In one implementation, a list of records and user profiles for the queries in blocks 1110 and 1210 can be obtained form user subscription table 940. In one implementation, there is a maximum number of objects that can be followed.

E. Partial Pre-Computing of Items for a Feed

Figure 13:
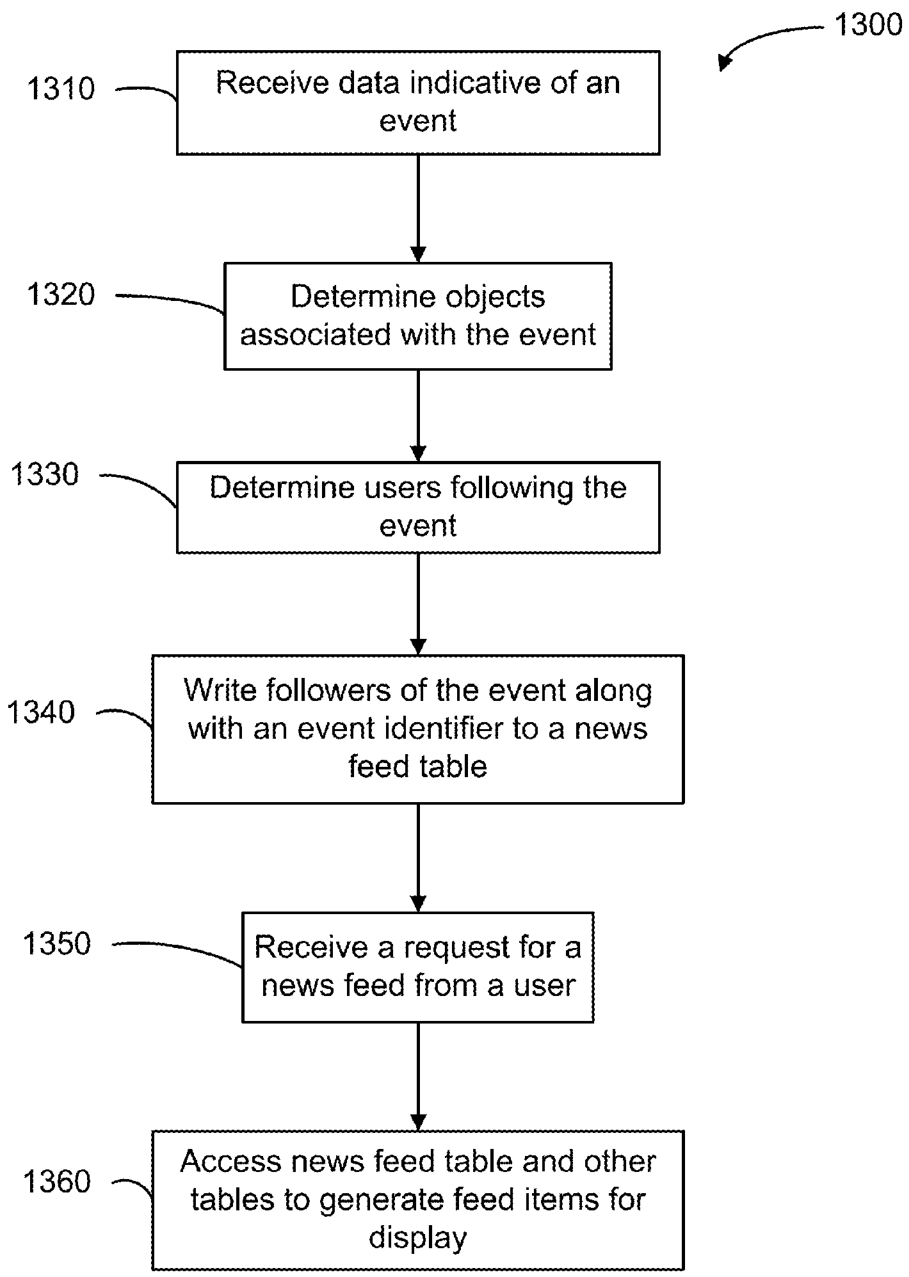
FIG. 13 shows a flowchart of an example of a method 1300 of storing event information for efficient generation of feed items to display in a feed, performed in accordance with some implementations.

FIG. 13 shows a flowchart of an example of a method 1300 of storing event information for efficient generation of feed items to display in a feed, performed in accordance with some implementations. In various implementations, method 1300 can be performed each time an event is written to the event history table, or periodically based on some other criteria (e.g., every minute, after five updates have been made, etc.).

In block 1310, data indicative of an event is received. The data may be the same and identified in the same way as described for block 1010. The event may be written to an event history table (e.g., table 910).

In block 1320, the object(s) associated with the event are identified. In various implementations, the object may be identified by according to various criteria, such as the record being changed, the user changing the record, a user posting a message, and a user whose profile the message is being posted to.

In block 1330, the users following the event are determined. In one implementation, one or more objects that are associated with the event are used to determine the users following the event. In one implementation, a subscription table (e.g., table 940) can be used to find the identified objects. The entries of the identified objects can contain an identifier (e.g., user ID 941) of each the users following the object In block 1340, the event and the source of the event, e.g., a record (for a record update) or a posting user (for a user-generated post) are written to a news feed table along with an event identifier. In one implementation, such information is added as a separate entry into the news feed table along with the event ID. In another implementation, each of the events for a user is added as a new column for the row of the user. In yet another implementation, more columns (e.g., columns from the other tables) can be added.

News feed table 960 shows an example of such a table with user ID 961 and event ID or pointer 962. The table can be organized in any manner. One difference from event history table 910 is that one event can have multiple entries (one for each subscriber) in the news feed table 960. In one implementation, all of the entries for a same user are grouped together, e.g., as shown. The user U819 is shown as following events E37 and E90, and thus any of the individual feed items resulting from those events. In another implementation, any new entries are added at the end of the table. Thus, all of the followers for a new event can be added as a group. In such an implementation, the event IDs would generally be grouped together in the table. Of course, the table can be sorted in any suitable manner.

In an implementation, if the number of users is small, then the feed items in one or more of the tables may be written as part of the same write transaction. In one implementation, the determination of small depends on the number of updates performed for the event (e.g., a maximum number of update operations may be allowed), and if more operations are performed, then the addition of the feed items is performed. In one aspect, the number of operations can be counted by the number of rows to be updated, including the rows of the record (which depends on the update event), and the rows of the feed tracked update tables, which can depend on the number of followers. In another implementation, if the number of users is large, the rest of the feed items can be created by batch. In one implementation, the feed items are written as part of a different transaction, i.e., by batch job.

In one implementation, security checks can be performed before an entry is added to the news feed table 960. In this manner, security checks can be performed during batch jobs and may not have to be performed at the time of requesting a news feed. In one implementation, the event can be analyzed and if access is not allowed to a feed item of the event, then an entry is not added. In one aspect, multiple feed items for a same user may not result from a same event (e.g., by how an event is defined in table 910), and thus there is no concern about a user missing a feed item that he/she should be able to view.

In block 1350, a request for a news feed is received from a user. In one implementation, the request is obtained when a user navigates to the user's home page. In another implementation, the user selects a table, link, or other page item that causes the request to be sent.

In block 1360, the news feed table and other tables are accessed to provide displayable feed items of the news feed. The news feed can then be displayed. In one implementation, the news feed table can then be joined with the event history table to determine the feed items. For example, the news feed table 960 can be searched for entries with a particular user ID. These entries can be used to identify event entries in event history table 910, and the proper information from any child tables can be retrieved. The feed items (e.g., feed tracked updates and messages) can then be generated for display.

In one implementation, the most recent feed items (e.g., 100 most recent) are determined first. The other feed items may then be determined in a batch process. Thus, the feed item that a user is most likely to view can come up first, and the user may not recognize that the other feed items are being done in batch. In one implementation, the most recent feed items can be gauged by the event identifiers. In another implementation, the feed items with a highest importance level can be displayed first. The highest importance being determined by one or more criteria, such as, who posted the feed item, how recently, how related to other feed items, etc.

In one implementation where the user subscription table 940 is used to dynamically create a news feed, the query would search the subscription table, and then use the object IDs to search the event history table (one search for each object the user is following). Thus, the query for the news feed can be proportional to the number of objects that one was subscribing to. The news feed table allows the intermediate block of determining the object IDs to be done at an earlier stage so that the relevant events are already known. Thus, the determination of the feed is no longer proportional to the number of object being followed.

In some implementations, a news feed table can include a pointer (as opposed to an event identifier) to the event history table for each event that is being followed by the user. In this manner, the event entries can immediately be retrieved without having to perform a search on the event history table. Security checks can be made at this time, and the text for the feed tracked updates can be generated.

X. Display of a Feed

Feeds include messages and feed tracked updates and can show up in many places in an application interface with the database system. In one implementation, feeds can be scoped to the context of the page on which they are being displayed. For example, how a feed tracked update is presented can vary depending on which page it is being displayed (e.g., in news feeds, on a detail page of a record, and even based on how the user ended up at a particular page). In another implementation, only a finite number of feed items are displayed (e.g., 50). In one implementation, there can be a limit specifically on the number of feed tracked updates or messages displayed. Alternatively, the limit can be applied to particular types of feed tracked updates or messages. For example, only the most recent changes (e.g., 5 most recent) for a field may be displayed. Also, the number of fields for which changes are displayed can also be limited. Such limits can also be placed on profile feeds and news feeds. In one implementation, feed items may also be subject to certain filtering criteria before being displayed, e.g., as described below.

XI. Filtering and Searching Feeds

It can be possible that a user subscribes to many users and records, which can cause a user's news feed to be very long and include many feed items. In such instances, it can be difficult for the user to read every feed item, and thus some important or interesting feed items may not be read. In some implementations, filters may be used to determine which feed items are added to a feed or displayed in the feed.

Figure 14:
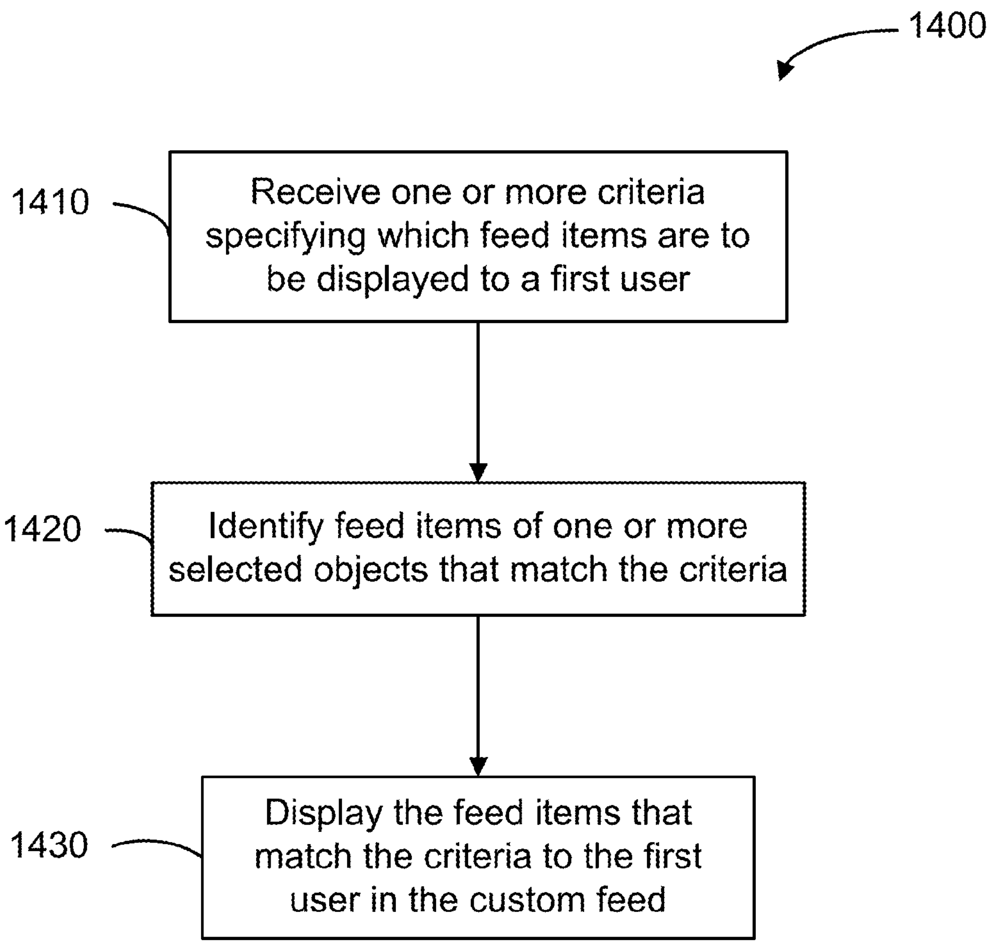
FIG. 14 shows a flowchart of an example of a method 1400 for creating a custom feed for users of a database system using filtering criteria, performed in accordance with some implementations.

FIG. 14 shows a flowchart of an example of a method 1400 for creating a custom feed for users of a database system using filtering criteria, performed in accordance with some implementations. Any of the following blocks can be performed wholly or partially with the database system, and in particular by one or more processor of the database system.

In block 1410, one or more criteria specifying which feed items are to be displayed to a first user are received from a tenant. In one implementation, the criteria specify which items to add to the custom feed. For example, the criteria could specify to only include feed items for certain fields of a record, messages including certain keywords, and other criteria mentioned herein. In another implementation, the criteria specify which items to remove from the custom feed. For example, the criteria could specify not to include feed items about certain fields or including certain keywords.

In block 1420, the database system identifies feed items of one or more selected objects that match the criteria. The feed items can be stored in the database, e.g., in one or more of the tables of FIG. 9A. In one implementation, the one or more selected objects are the objects that the first user is following. In another implementation, the one or more selected objects is a single record whose record feed the first user is requesting.

In block 1430, the feed items that match the criteria are displayed to the first user in the custom feed. The generation of text for a feed tracked update can occur after the identification of the feed items (e.g., data for a field change) and before the display of the final version of the feed item.

In one implementation, the criteria are received before a feed item is created. In another implementation, the criteria are received from the first user. In one aspect, the criteria may only used for determining feeds to display to the first user. In yet another implementation, the criteria are received from a first tenant and apply to all of the users of the first tenant. Also, in an implementation where a plurality of criteria are specified, the criteria may be satisfied for a feed item if one criterion is satisfied.

Some implementations can provide mechanisms to search for feed items of interest. For example, the feed items can be searched by keyword, e.g., as entered by a user. As another example, a tab (or other selection device) can show feed items about or from a particular user. In one implementation, only messages (or even just comments) from a particular user can be selected. Besides searching for feed items that match criteria, one also could search for a particular feed item.

XII. Ghosting and Proxies

Figure 15:
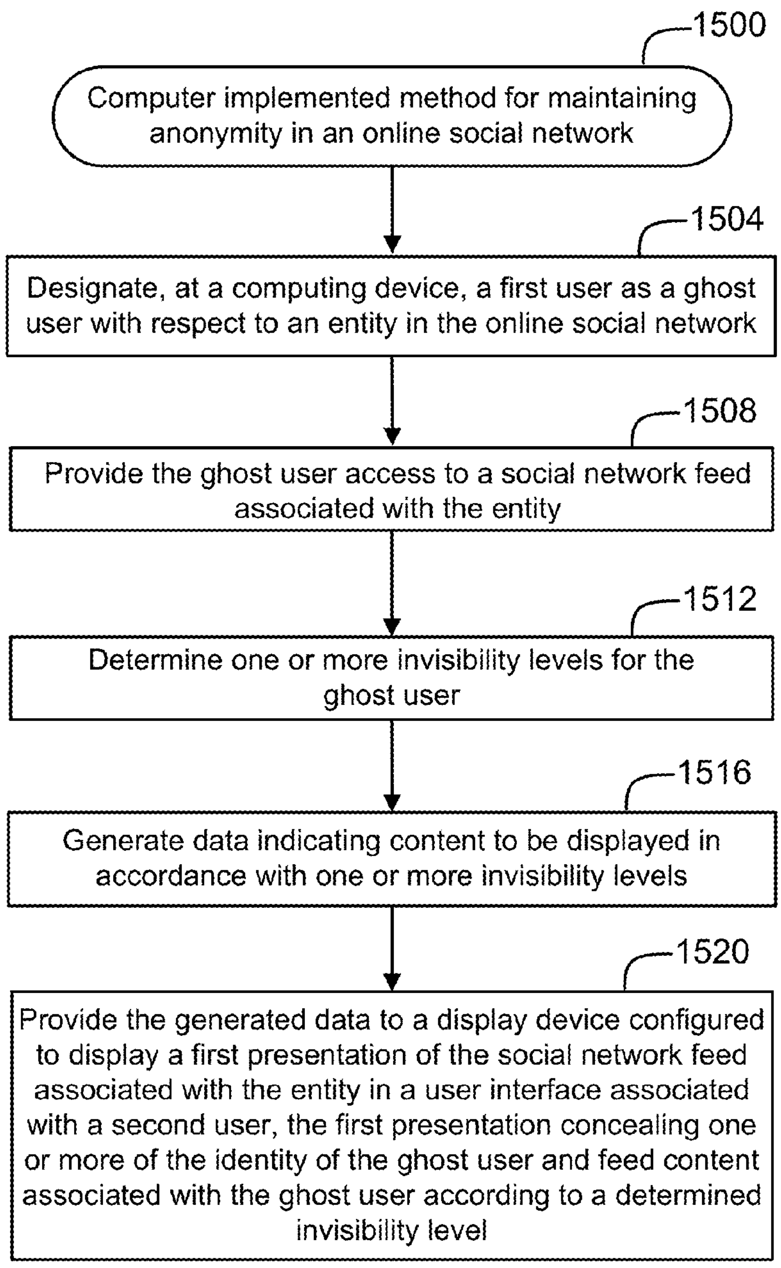
FIG. 15 shows a flowchart of an example of a computer implemented method 1500 for maintaining anonymity in an online social network, performed in accordance with some implementations.

FIG. 15 shows a flowchart of an example of a computer implemented method 1500 for maintaining anonymity in an online social network, performed in accordance with some implementations. At block 1504, a first user is designated as a ghost user with respect to an entity in the online social network at a computing device or any number of computing devices cooperating to perform method 1500. As described in the examples below, a ghost user can follow a user, group, or other entity while being invisible at various levels in the social networking environment. For instance, a human resources manager may want to monitor an employee's activity on a group feed without showing up as a follower of the feed. In another instance, in the context of Facebook®, a parent may want to follow his teenager without embarrassing the teenager by showing up as a follower on her profile.

In the context of FIG. 15, an entity can refer to any construct in the online social network that can be followed. In addition to users and groups of users, examples of entities with respect to which the first user can be a designated a ghost user can include records, posts, conversations, and documents. In some implementations, the entity can be a CRM entity such as a case, account, contact, lead, or opportunity. For example, a high-level executive may want to follow an opportunity feed without showing up as a follower of the feed in user systems of lower level employees to avoid unnerving these employees.

In various implementations, a user may request to follow a user, group, record, or other entity as a ghost user, or a user may be automatically added as follower of the entity as a ghost user. In some instances, for example, a GUI provided on a display of user system such as user system 12 in FIG. 1A may include a button marked "follow as ghost". In some implementations, a group of users may be designated as a ghost group or ghost sub-group. For example, a member of an Executive Management committee may have the ability to designate all other members of the committee as ghost users following a particular group, thereby creating a ghost sub-group following the group.

In some instances, a user may be automatically subscribed to one or more entities based on attributes identified in: the user's profile, entities (e.g., records, organizations, other groups, other users) being followed by the user, records (e.g., cases, accounts, clients) with which a user is associated, the user's title (such as vice-president, team leader, account executive, sales representative, etc.), the user's team, department, role, senior or junior relative status in the organization, social networking status, relationships with other users in terms of chain of command (e.g., the user's direct reports, etc.), and other data indicating relationships with various entities. For example, a manager may be automatically subscribed as a ghost user to all groups or records created by her direct reports. Examples of methods for designating a user as a ghost user with respect to an entity in the online social network are described below with respect to FIG. 16.

In some instances, a suitable storage medium stores data designating the first user as a ghost user as indicated at block 1504. By way of example, at block 1504, a designation of the first user as a ghost user can be stored on a suitable storage medium such as tenant data storage 22 and/or system data storage 24 of FIGS. 1A and 1B. In other examples, any of the various databases and/or memory devices disclosed herein can serve as storage media to store and maintain ghost user information in block 1504. In some implementations, ghost user designations can be stored in one or more database tables that can be accessed to retrieve relevant information as part of a display. For example, a database table stored on a suitable storage medium (such as user subscription table 940 in FIG. 9A) can store followers of a group, record, or other entity in rows, with one more columns identifying certain followers as ghost users.

In FIG. 1508, the ghost user is provided access to a social network feed associated with the entity. According to various implementations, the ghost user can have complete or limited access to the feed. For instance, a ghost user may be fully operational in the feed, with the ability to read, update, post to, and delete feed content just as she would if she were a non-ghost user subscribed to the feed. In some other instances, a ghost user may have the ability to only read the feed content. The level of access provided at block 1508 can be determined, for example, by the creator of the group or other entity, or by the system. In some implementations, the level of access provided to a ghost user can depend on the seniority level of the ghost user. For example, a middle manager may be allowed to read information updates in a feed as a ghost user, but not post to the feed, while a high-level executive may be allowed to post to the feed as a ghost user.

Access information stored on a suitable storage medium such as tenant data storage 22 and/or system data storage 24 of FIGS. 1A and 1B or in any of the various databases and/or memory devices disclosed herein can be retrieved in block 1504. For example, permission levels indicating access may be stored in a database table that stores followers of an entity and ghost user designations, or in a cross-referenced database table.

In FIG. 15, at block 1512, the one or more computing device performing method 1500 is configured to determine one or more invisibility levels for the ghost user. The extent of the ghost user's invisibility can be determined by an invisibility level. An invisibility level can determine to whom the ghost user is invisible and/or what is concealed. In some instances, a ghost user may be invisible to all users. For example, a ghost user following a group may be invisible to all other followers of the group. In some instances, a ghost user may be visible only to subset of the other users, e.g., to a group creator, or to other members of the ghost user's organization. In various implementations, the users to whom the ghost user is invisible may be determined by user input and/or automatically by the system. For example, a ghost user may type or make a selection in a settings page of a user interface indicating the users to which he wishes to be invisible. In some instances, a ghost user may identify users who can see a post or other update at the time of posting. In another example, a group leader may determine one or more invisibility levels available for ghost users or certain classes of ghost users in setting up a group.

In some instances, the system may automatically determine the users to which the ghost user is invisible based on a default setting or based one or more attributes such as the ghost user's title (such as vice-president, team leader, account executive, sales representative, etc.), team, department, role, senior or junior relative status in the organization, social networking status, relationships with other users in terms of chain of command (e.g., the user's direct reports, etc.), and other data indicating relationships with other users.

One or more of ghost user identity, feed content, and other user activity can be concealed from the other users. For example, when a group page is rendered, the identity of the ghost user will be concealed on the group page such that the ghost user will not appear under a "Members" region of the group page, at least when presented on a user interface of a user to whom the ghost user is invisible. Typically, there will be no indication that there is a ghost user following the group. However, in some implementations, a page may indicate that there are one or more ghost users following the group while concealing the identities of the ghost users. For example, a ghost user may be represented by a ghost icon. Feed content such as updates to the ghost user's status, posts, comments, indications of preference such as "likes" and "dislikes", uploaded files, and hyperlinks to social network data or other network data such as various documents and/or web pages on the Internet can be concealed according to a determined invisibility level.

In some instances, data indicating the one or more invisibility levels determined at block 1512 can be stored on a suitable storage medium such as tenant data storage 22 and/or system data storage 24 of FIGS. 1A and 1B or any of the various databases and/or memory devices disclosed herein. The determined invisibility levels and metadata indicating the respective users to which they apply can also be stored in one or more database tables that can be accessed to retrieve relevant information as part of a display. For example, a database table stored on a suitable storage medium can store subscribers in rows, with one more columns identifying ghost users and associated invisibility levels. A cross-referenced table can store invisibility levels in rows with one or more columns identifying the users to which the invisibility levels apply. In some implementations, an additional one or more columns may identify content to be concealed. Examples of database tables for tracking ghost users and invisibility levels are described below with reference to FIG. 19.

In FIG. 15, at block 1516, the one or more computing devices performing method 1500 are configured to generate data indicating content to be displayed in accordance with one or more invisibility levels of the ghost user and at, block 1520, the one or more computing devices are configured to display a presentation of the social network feed in a user interface associated with a second user, with the presentation concealing one or more of the identity of the ghost user and feed content associated with the ghost user according to a determined invisibility level.

In FIG. 15, at block 1520, in some examples, the display device can be a display of a user system 12 as described above with reference to FIGS. 1A and 1B. Such a user system 12 can be operated by another subscriber of the social network feed. The display device of block 1520 can be configured to concurrently display other components in a suitable user interface, lists of users, and relevant data regarding a group, a user's profile, a record, or other construct in the online social network.

In FIG. 15, in one example, an app server 288 in the on-demand service environment 200 of FIGS. 2A and 2B includes one or more processors configured to perform part or all of blocks 1504-1520. In other instances, one or more other computing devices such as user systems 12 and/or other servers retrieve, process, and exchange data to cooperate with app server 288 to perform the blocks. When user input data, for example, provides the invisibility level of block 1512, such data can be received by a server over a data network from a user operating a user system 12 as shown in FIGS. 1A and 1B. In other instances, such data is received from a proxy server on behalf of a user or other data source. Various implementations of method 1500 are possible, such that any of the servers described above with reference to FIG. 2B or other computing devices disclosed herein can be configured to receive and process parameters and information updates in accordance with method 1500.

Returning to block 1520, in one example, the data provided to the display device is transmitted from a server such as app server 288 over network 14 to a user system 12 of FIGS. 1A and 1B. In this example, the display device is one component of the user system 12, which includes a processor configured to execute a web browser program stored on user system 12 to output a graphical presentation of the feed on the display device, for instance, in a GUI. In other examples, the data provided to the display device at block 1520 is generated locally at user system 12. By the same token, one or more of the blocks 1504-1520 as described above can also be performed at a user system 12 as an alternative to being performed at one or more servers in an online social network. The same is true for the other examples of methods described below.

Figure 16:
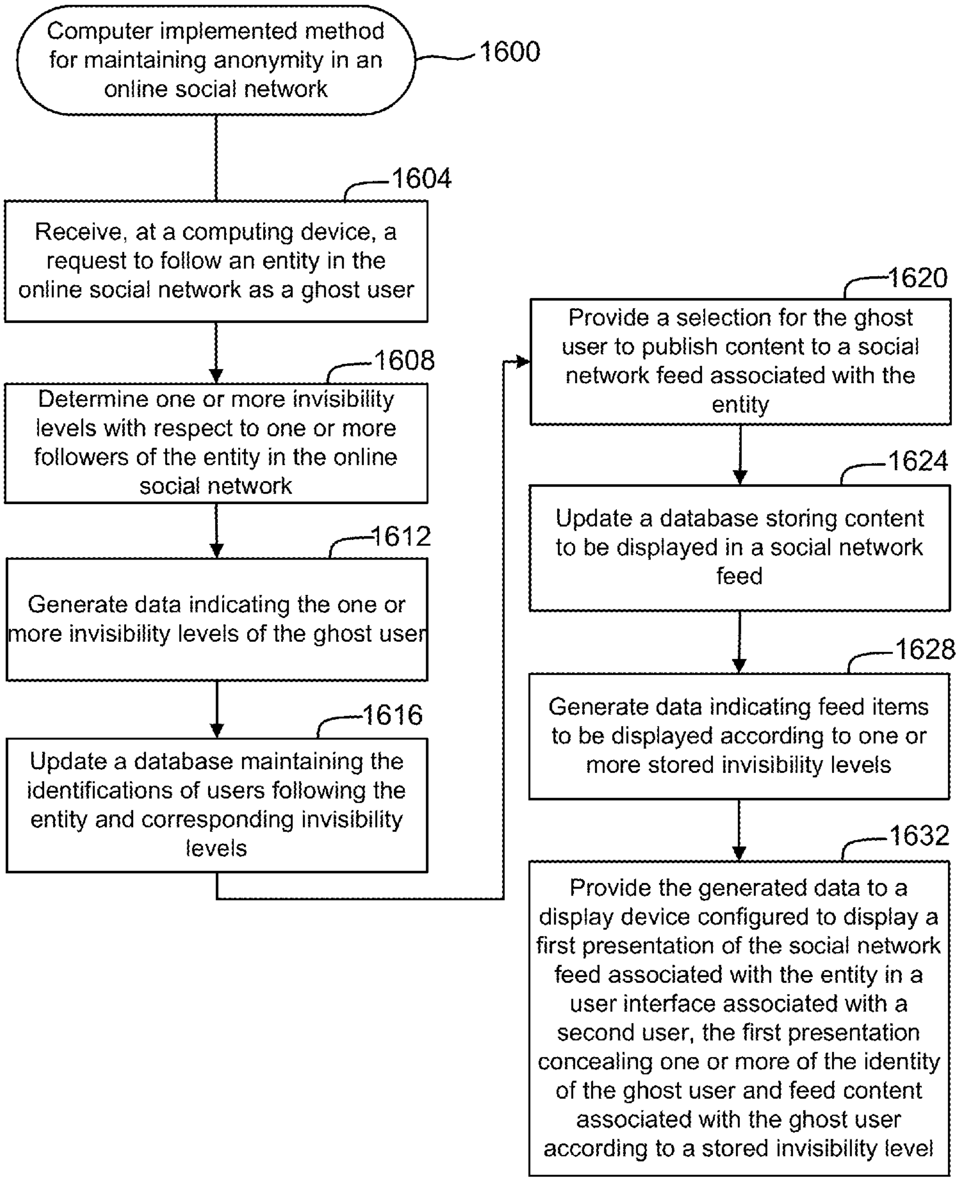
FIG. 16 shows a flowchart of an example of a computer implemented method 1600 for maintaining anonymity in an online social network, performed in accordance with some implementations.

FIG. 16 shows a flowchart of an example of a computer implemented method 1600 for maintaining anonymity in an online social network, performed in accordance with some implementations. FIG. 16 is described with reference to FIGS. 17-20B. At block 1604, a request to follow an entity in the online social network as a ghost user is received at a computing device or computing devices configured to perform method 1600. The request can be submitted by the potential ghost user, for example, in various manners. For instance, to join a public group as a ghost user, the user may click a button "Join as Ghost" on a group detail page or in a groups list with reference to the group. In another instance, a user may respond to an invitation to join as a ghost.

Figure 17:
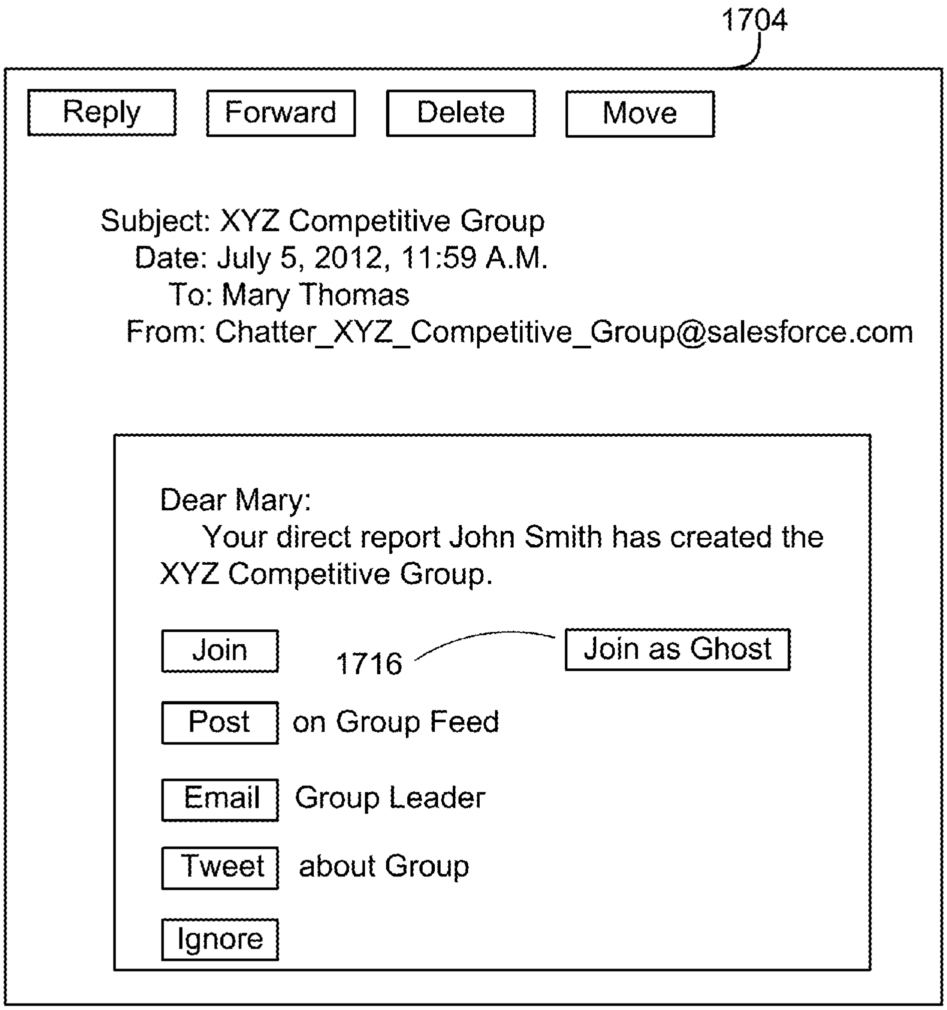
FIG. 17 shows an example of a network communication for inviting a user to join a group as a ghost user, where the network communication is in the form of an email displayed in a graphical user interface (GUI) on a recipient user's display device, according to some implementations.

FIG. 17 shows an example of a network communication for inviting a user to join a group as a ghost user, where the network communication is in the form of an email displayed in a GUI on a recipient user's display device, according to some implementations. In FIG. 17, an invitation to join the XYZ Competitive Group has been sent as an email 1704 to Mary Thomas. A graphical representation of the email is shown, as presented in a user interface of a computing device operated by Mary using an appropriate email application or service. In this example, the email 1704 is sent from the one or more computing devices to Mary in response to the creation of the group by one of her direct reports, John Smith. The email 1704 includes a "Join as Ghost" button 1716 as one of a number of options for responding to the invitation. "Join as Ghost" button 1716 is a graphical representation of a link, the selection of which sends an email or other network communication to instruct one or more servers in the online social network to designate Mary as a ghost member of the XYZ Competitive Group. The "Join as Ghost" button 1716 in email 1704 of FIG. 17 represents one of many examples of manners in which a user can request to follow an entity as a ghost user.

Figure 18:
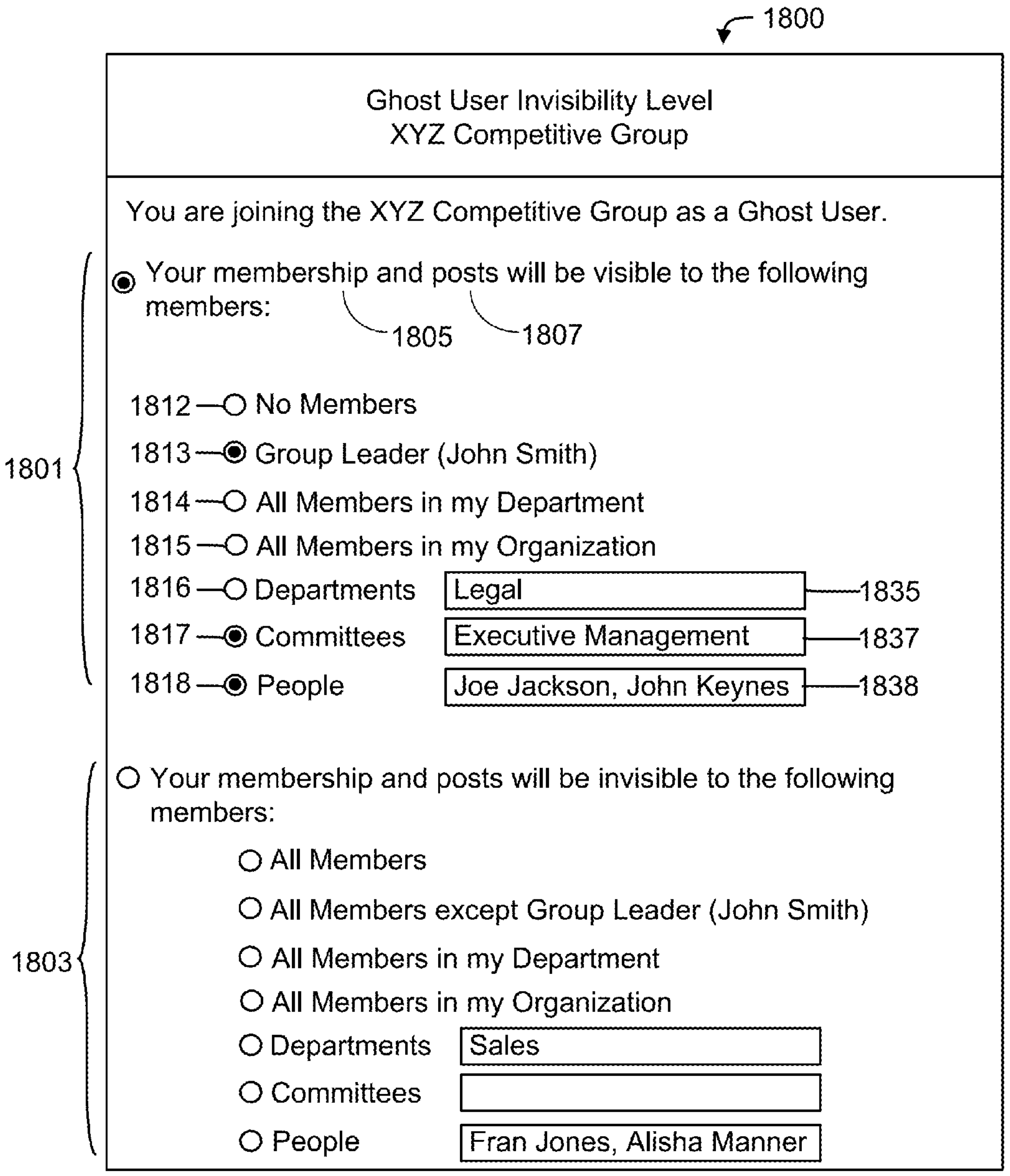
FIG. 18 shows an example of a ghost user invisibility levels set-up window 1800 as displayed in a GUI on a display device, where a user or administrator can define invisibility levels, according to some implementations.

Returning to FIG. 16, at block 1608, one or more invisibility levels with respect to one or more followers of the entity are determined. FIG. 18 shows an example of a ghost user invisibility levels set-up window 1800 as displayed in a GUI on a display device, where a user or administrator can define invisibility levels, according to some implementations. In FIG. 18, the ghost user invisibility levels set-up window 1800 includes a number of selections and data entry fields operable in a user interface. Window 1800 can be generated, for example, in response to pressing a button such as "Join as Ghost" button 1716 in FIG. 17, or other similar action. Window 1800 can be displayed on a display device as an overlay of a feed or profile page of a user interface or as a separate window, depending on the desired implementation.

The ghost user invisibility levels set-up window 1800 in FIG. 18 has a "visible" list 1801, with selections of users to whom the ghost user will be visible and an "invisible" list 1803, with selections of users to whom the ghost user will be invisible. In the example of FIG. 18, the ghost user is notified that her membership (at 1805) and posts (at 1807) will be visible to the selected users. In some other implementations, the invisibility levels may be further defined by what is visible or invisible to selected users. For example, in some implementations, a ghost user may define a first set of users to whom her membership in the group will be visible and further define a subset of the first set of users to whom her posts will be visible.

In the visible list 1801, the ghost user has defined the users to whom she will be visible with the selections of Group Leader (John Smith) 1813, Committees (Executive Management) 1817, and People (Joe Jackson and John Keynes) 1818. In other examples, numerous other users could also or alternatively be selected, such as no members 1812, all members in the ghost user's department 1814, all members in the ghost user's organization 1815, and members of other departments 1816. Various selections can have accompanying data entry fields 1835-1838 for the ghost user to enter data defining the invisibility levels. In various implementations, the ghost user may enter the data using a keyboard and/or select one or more entries from a drop-down list. In addition to or instead of defining invisibility levels using visible list 1801, the ghost user may define the users to who she will be invisible using the invisible list 1803.

In some implementations, part or all of the determinations can be performed automatically by one or more computing devices. For instance, when a user submits a request to follow a record feed as a ghost user, data can automatically be retrieved from that user's profile as stored in a database and screened to define one or more invisibility levels. In some implementations, when the user's profile identifies the user as having a particular seniority level, the one or more computing devices can be configured to automatically apply default invisibility levels such that the user is invisible to all users with a lower seniority level and visible to all users with the same or higher seniority level as the ghost user. In some other implementations, combinations of user-defined invisibility levels and system-defined invisibility levels can be determined. For example, a ghost user may always be visible to a group leader, such that the ghost user cannot opt to conceal her identity or posts from the group leader.

Returning to FIG. 16, at block 1612, the one or more computing devices performing method 1600 are configured to generate data indicating the one or more invisibility levels of the ghost user with respect to one or more followers of the entity and at block 1616, the one or more computing devices are configured to update a database maintaining the identifications of users following the entity and corresponding invisibility levels. Examples of database tables including users and corresponding invisibility levels are discussed below with respect to FIG. 19.

FIG. 19 shows an example of an entity subscription table 1910 that may be used to track users following a particular entity, in accordance with some implementations. While the entity subscription table 1910 in FIG. 19 tracks users for a particular entity (e.g., a group, a record, etc.), the subscription information may be stored in a table tracking user subscriptions to multiple entities, such as user subscription table 940 in FIG. 9A. In various implementations, entity subscription table 1910 can have columns of user ID 1901, access rights 1903, and invisibility level 1905. In some implementations, entity subscription table 1910 may include an additional column designating certain users as ghost users. In the example in Figure 1910, ghost users may be designated as by any invisibility level other than "0", with invisibility level "0" indicating a user who is completely visible. Access rights 1903 may be determined as discussed above with respect to block 1508 of FIG. 15. In this example, users U812 and U819 may have full access to page and/or social network feed associated with the entity including the ability to R (read), W (write), U (update), and D (delete), while users U911, U310, and U312 have more limited access.

As noted above, in this example, an invisibility level of "0" can indicate a fully visible (non-ghost) user, while invisibility levels 1-3 each represent a different extent of invisibility for ghost users U819, U911, U110, and U312. For example, ghost user U819, having an invisibility level of "1" may be invisible only to other subscribers outside his organization; ghost user U911, having an invisibility level of "2" may be invisible only to other subscribers outside the Legal department; ghost users U110 and U312, having an invisibility level of "3" may be invisible to all other subscribers except the group leader.

Entity subscription table 1910 can refer to an invisibility level table 1920 that can be used to store invisibility levels and metadata indicating the users to which the invisibility levels apply. Invisibility level table 1920 includes columns of invisibility level 1911 and user IDs 1913. In this example, invisibility level "1" is associated with a list of users U812, U323, U098, U212, U312, etc., to whom ghost users having an invisibility level of "1" will be invisible. In some implementations, an invisibility level may be defined by one or more departments, organizations, etc., and can have a pointer to one or more tables including a list of those users. Also, in some implementations, data indicating one or more additional rules for a particular invisibility level may be stored in invisibility level table 1920. For example, a ghost user having an invisibility level of "4" may be presented with a list of other followers of the entity to select from on a post-by-post basis.

A feed table 1930 may also include invisibility level information that can be used to generate a feed according to an invisibility level. In the example of FIG. 19, the feed table can be a group feed table, an account feed table, a case feed table, a news feed table, etc. as described above. The feed table 1930 in FIG. 19 can include entity column 1921, event ID or pointer column 1923, and invisibility level column 1925. When generating a feed as described in FIG. 11, whether the event is invisible to the user to which the feed is to be displayed can be checked. Tables 1910, 1920, and 1930 can be stored in any suitable storage medium accessible by one or more computing devices performing the methods described herein, such as system data storage 24 or tenant data storage 22 of FIG. 1B.

Returning to FIG. 16, at block 1620, a selection for the ghost user to publish content to a social network feed associated with the entity is provided. Such a selection can be provided, for example, in any manner described above including using a "Share" button on the profile page associated with the entity. The content can then be stored as described above in FIG. 10, for example, in a feed tracking table at block 1624. In some implementations, the content with invisibility level information can be stored in a table such as feed table 1930 in FIG. 19.

At block 1628, the one or more computing devices performing method 1600 are configured to generate data indicating feed items to be displayed according to one or more invisibility levels and at block 1632, the one or more computing devices are configured to display a first presentation of the social network feed in a user interface a second user. The first presentation conceals one or more of the identity of the ghost user and feed content associated with the ghost user according to a stored invisibility level.

In some implementations, a second presentation of the social network feed associated with the entity is displayed in a user interface associated with a third user, the presentation including the one or more of the identity of the ghost user and feed content associated with the ghost user concealed in the first presentation. By way of example, FIG. 20A shows an example of a page in which a ghost user is visible and FIG. 20B showing an example of the page shown in FIG. 20A with the identity the ghost user and associated feed content concealed.

Figure 20A:
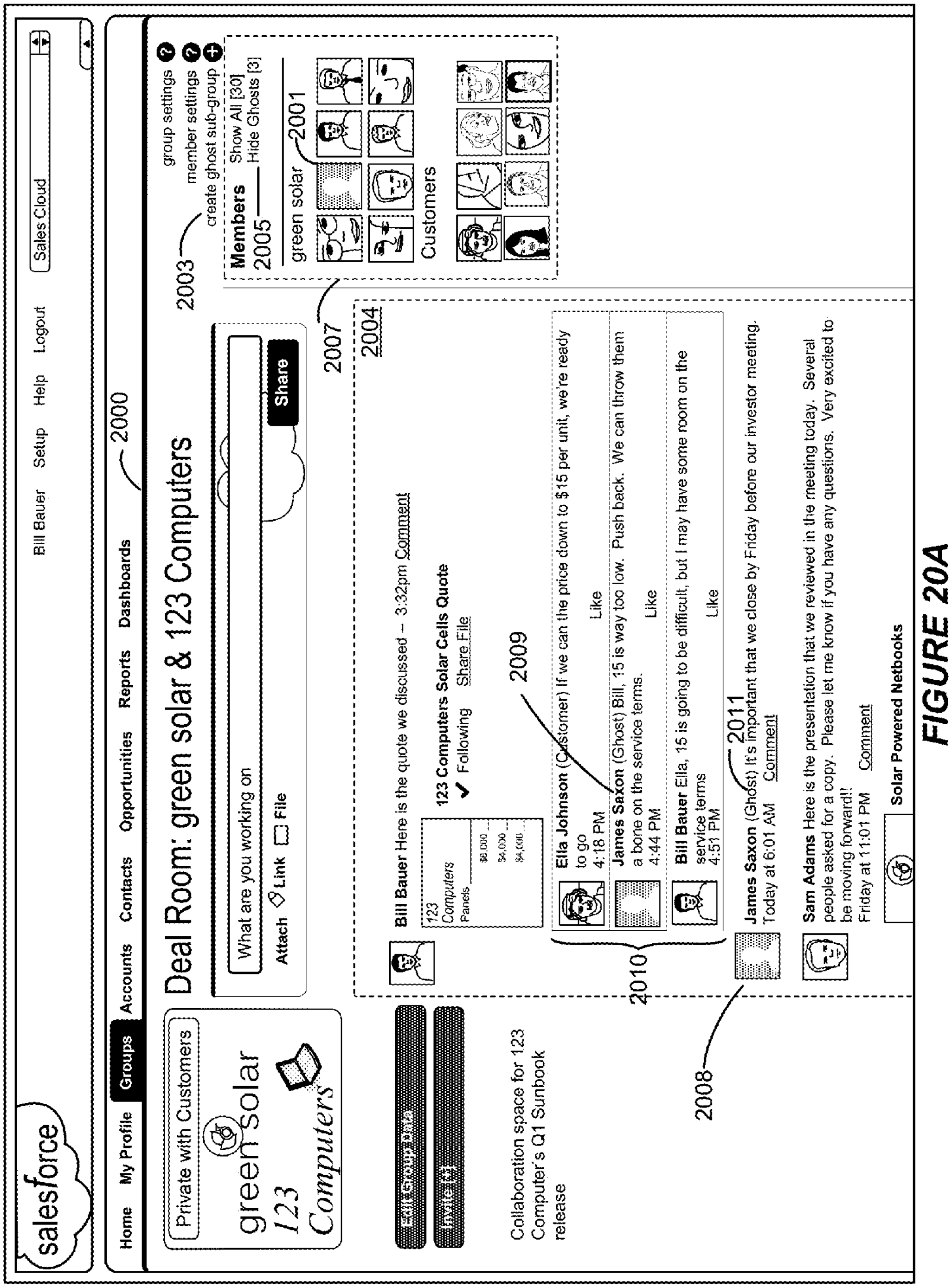
FIG. 20A shows an example of a group page 2000 including a display of feed content submitted by a ghost user.

FIG. 20A shows an example of a group page 2000 for a private group "Deal Room: green solar & 123 Computers" set up to facilitate negotiations between Green Solar and its customer, 123 Computers. The group page 2000 includes an option 2003 to create a ghost sub-group, a member region 2007, and a group feed 2004. In this example, the group page is rendered on a user device of user Bill Bauer, an employee of Green Solar. A contract negotiation team may want an executive to oversee negotiations, but to avoid undermining the authority of the contract negotiator or unnerving the employees of the customer, the executive may choose to join the group as a ghost user. In this example, an executive James Saxon is a ghost user, visible only to members who are Green Solar employees. Because ghost user James Saxon is visible to Bill Bauer, a Green Solar employee, a thumbnail image 2001 is included in member region 2007 on the display provided on Bill Bauer's user device. According to various implementations, member region 2007 may or may not include an indication that ghost user James Saxon is a ghost user. For example, ghost users may listed in a separate sub-region of the members region or be identified by an icon in addition to or instead of their images. In the same or alternative implementations, an indication of a member as a ghost user may be provided in a hover box, for example. Such an indication may or may not further include information about one or more invisibility levels of the ghost user. In some alternate implementations, a ghost user may show up in a member region 2007 without any indication that she is a ghost user. In the example of FIG. 20A, member region 2007 indicates that there are 30 total members in the group, including 3 ghost users. The user Bill Bauer is also presented with an option 2005 to "Hide Ghosts [3]".

The group feed 2004 as presented on the user device of Bill Bauer includes two feed items authored by ghost user James Saxon: a post 2008 stating that "It's important that we close by Friday before our investor meeting" and a comment 2009 in a thread 2010 advising Bill Bauer to push back on a counteroffer presented by customer Ella Johnson. The post 2008 is an example of a post that ghost user James Saxon may not want to be seen by the customer, as it could provide the customer with additional leverage in the negotiation. The comment 2009 is an example of a comment that ghost user James Saxon may not want to be seen by the customer, as it could undermine Bill Bauer. According to various implementations, feed items authored by a ghost user may or may not include an indication that ghost user James Saxon is a ghost user. In the example of FIG. 20A, each item authored by ghost user James Saxon is labeled at 2011 with "(Ghost)". This can let Bill Bauer and the other Green Solar employees know that the content published by James Saxon and other ghost users is not visible to the customer. In some implementations, a list of members to whom a ghost user or a particular post or other feed content is invisible may be provided, for example, in a hover box.

Figure 20B:
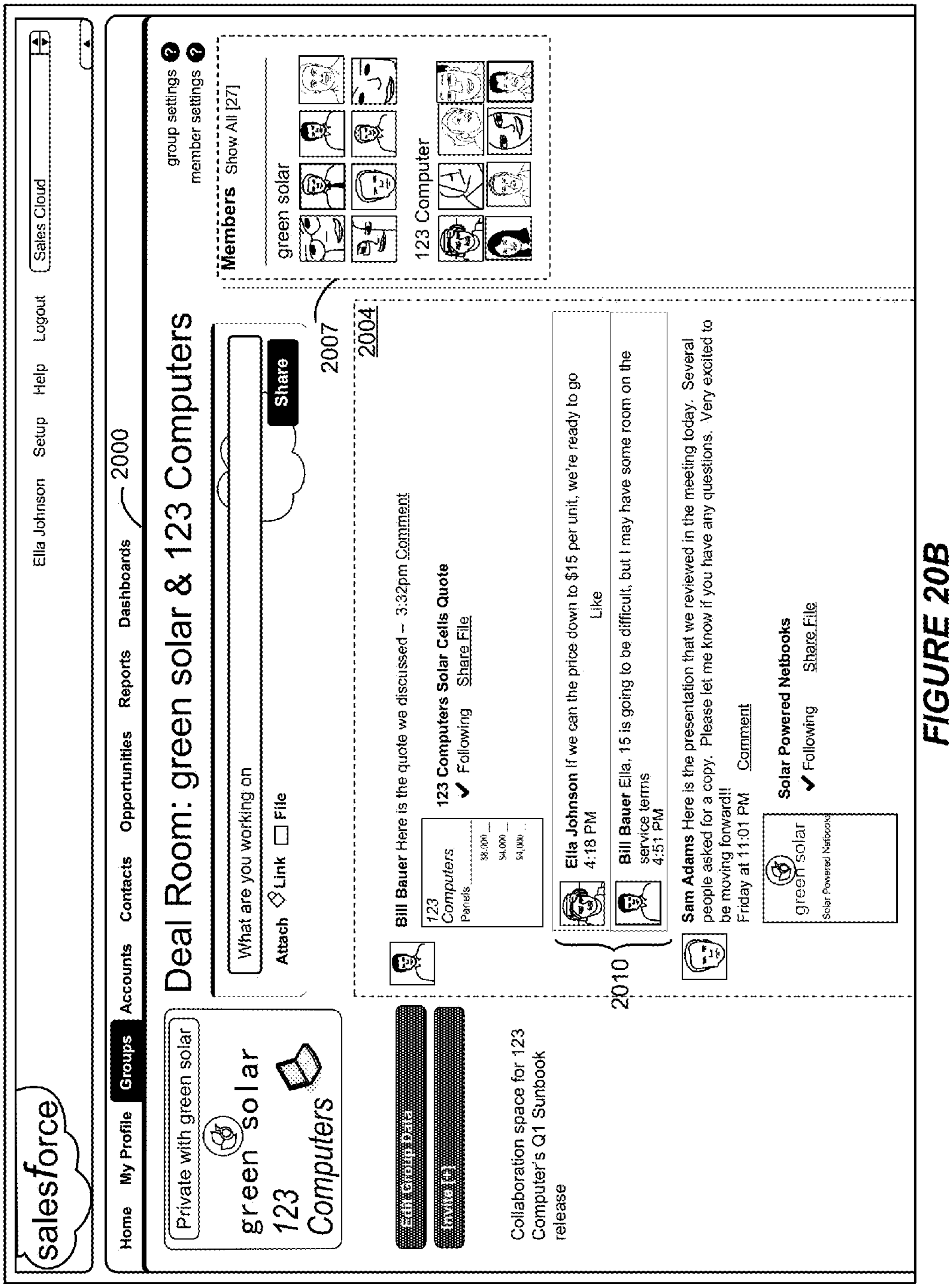
FIG. 20B shows an example of the group page 2000 shown in FIG. 20A in which ghost user identity and feed content submitted by the ghost user is concealed.

FIG. 20B shows an example of the group page 2000 for the private group "Deal Room: green solar & 123 Computers" as presented on a user device of user Ella Johnson, an employee of 123 Computers. In the presentation shown in FIG. 20B, James Saxon does not appear in member region 2007, with only 27 members listed rather than the 30 listed in FIG. 20A. Further, group feed 2004 does not include any content authored by ghost user James Saxon. Specifically, thread 2010 does not include comment 2009 and post 2008 is also concealed from user Ella Johnson.

Figure 21:
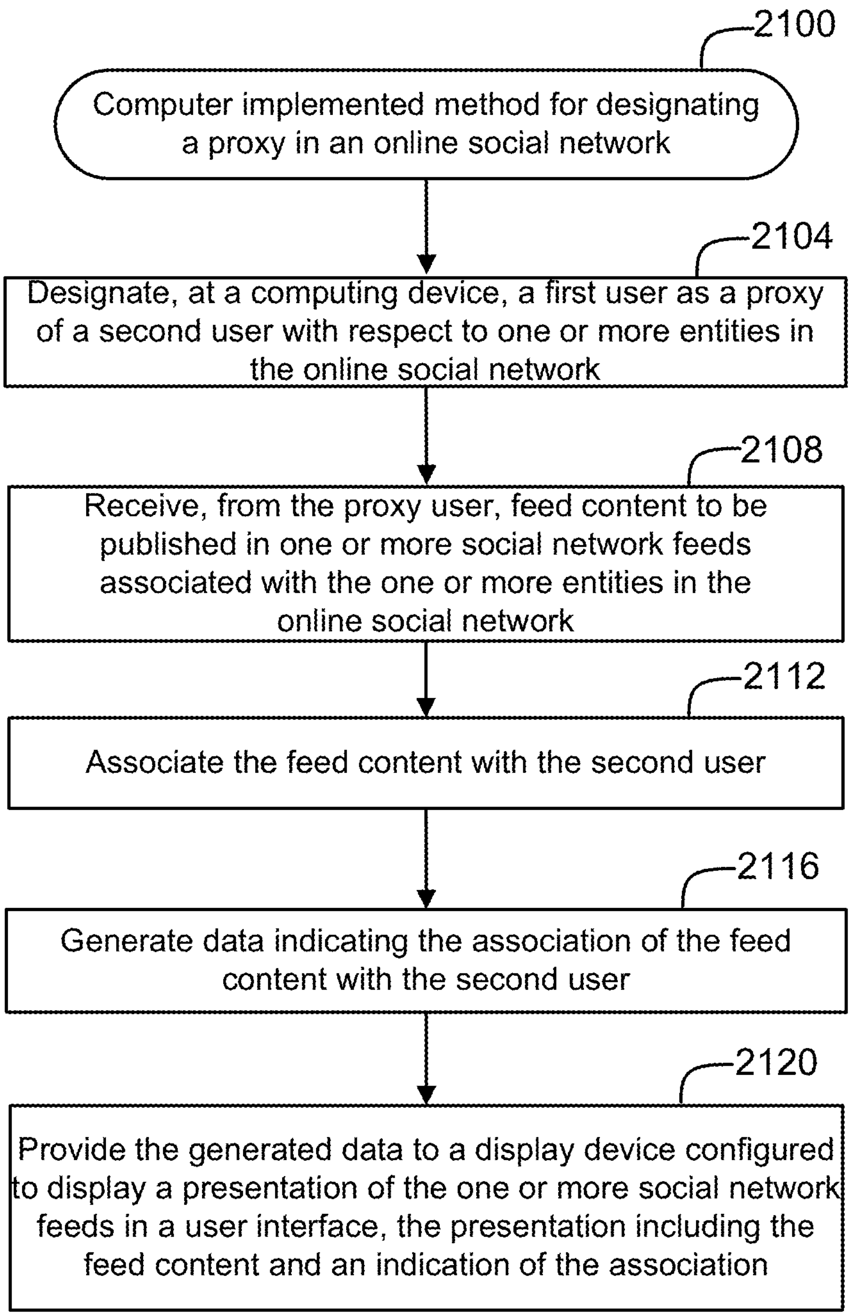
FIG. 21 shows an example of a flowchart of a computer implemented method 2100 for providing a proxy in an online social network, performed in accordance with some implementations.

Some implementations of the disclosed systems, apparatus, methods, and computer readable storage media are configured to designate a proxy in an online social network. FIG. 21 shows an example of a flowchart of a computer implemented method 2100 for providing a proxy in an online social network, performed in accordance with some implementations. At block 2104, a first user is designated as a proxy user of a second user with respect to one or more entities in the online social network. As described in the examples below, a first user can be designated as a proxy with respect to a particular user, group of users, records, or other entities within the online social network. For example, an organization may want its helpdesk employees to use their real names in a social network feed (rather than a generic handle like "helpdesk") to provide a personal touch. When a helpdesk employee takes vacation time, he may designate a proxy to handle his cases. In another example, it may be an employee's responsibility to post frequently in one or more group feeds in the online social network. When that employee takes vacation, she may want to designate a coworker as a proxy to post in some of the less important group feeds.

In various implementations, a user may designate another user as a proxy. In some instances, for example, a GUI provided on a display of user system such as user system 12 in FIG. 1A may include an option to designate proxy. An example of a proxy set-up page is described below with reference to FIG. 22. In some instances, a user may be automatically subscribed to one or more entities based on attributes identified in: users' profiles, entities (e.g., records, organizations, other groups, other users) being followed by users, records (e.g., cases, accounts, clients) with which a user is associated, titles (such as vice-president, team leader, account executive, sales representative, etc.), team, department, role, senior or junior relative status in the organization, social networking status, relationships with other users in terms of chain of command (e.g., the user's direct reports, etc.), and other data indicating relationships with various entities. For example, an employee may be automatically designated as a proxy user for a co-worker having the same job title when that co-worker requests vacation time.

FIG. 22 shows an example of a proxy set-up page 2200 for user Joe Olsen in the form of a GUI, as displayed on a display device according to some implementations. Proxy set-up page 2200 includes an entity region 2205 in which a user can specify various entities for which to designate a proxy. The entity region 2205 also includes an option 2211 to designate a proxy for all purposes, including for all groups, records, and other entities that the user follows. In this example, entity region 2205 includes selections for inclusion for proxy designation of groups 2212, accounts 2213, and other entities 2214.

These various selections can have accompanying data entry fields 2232-2234 for the user to enter data referencing the respective entities. In various implementations, Joe may enter the data using a keyboard and/or select one or more entries from a drop-down list. In entity region 2205, the entities groups 2212 and accounts 2213 have been selected, with the user entering the "Computing" group and "XYZ" and "ABC" accounts. By selecting the Computing group and the XYZ and ABC accounts, Joe can designate a proxy to act on his behalf with reference to those entities. In other examples, numerous entities could also or alternatively be selected, such as one or more groups, cases, clients, etc. In some implementations, a user may identify one or more feeds for which to designate a proxy.

A proxy duration region 2210 includes data entry fields identifying a time and date after which the proxy can be active. A stop time can be similarly selected, after which time the proxy will no longer be active. A proxy identification selection 2221 includes a data field 2222 at which the user who will act as a proxy can be identified. In various implementations, Joe may enter the name using a keyboard and/or select one or more entries from a drop-down list. For example, the drop-down list may include other people in the Joe's department or with Joe's job title, etc. In this example, Joe has selected Zach Dunn to act as his proxy with respect to the group and accounts identified in entity region 2205 for the duration specified in proxy duration region 2210. A proxy rights region 2220 includes selections of actions that the proxy is authorized to take on the user's behalf. In the example of FIG. 22, the proxy is authorized to read (2224), write to (2225), and update (2227) but not delete (2226) profiles and/or feeds associated with the selected entities. In other examples, numerous permissions could also or alternatively be selected, including permission to post updates but not to comment, etc.

All posts made by Zach as proxy for Joe will have Joe's name associated with them, however, the user may be able to select whether the proxy's name will also be associated with them. In this example, in region 2223, Joe is presented with selections of "Joe Olsen" at 2242 or "Zach Dunn, proxy for Joe Olsen" at 2244. Once the proxy set-up is completed, it can be submitted using a "submit" button 2260. In various implementations, the proxy may be implemented once submitted or sent to the proxy for approval. The user can then add another proxy (e.g., for a different entity, a different duration, etc.) via button 2270.

In some implementations, one or more invisibility levels may be determined for the proxy user in a similar fashion to determining an invisibility level for a ghost user as described above. For example, in some implementations, the identity of the proxy user may be visible to all users within the second user's organization, but concealed from users outside the organization.

Returning to FIG. 21, in some instances, data identifying proxies designated in block 2104 can be stored on a suitable storage medium such as tenant data storage 22 and/or system data storage 24 of FIGS. 1A and 1B or any of the various databases and/or memory devices disclosed herein. Proxy information can also be stored in one or more database tables that can retrieve relevant information to allow access to a page, update an event history table, display a feed, etc. FIG. 23 shows an example of a proxy table 2300 that may be used in tracking proxies. In various implementations, proxy table 2300 can have columns of entity ID 2301, user ID 2303, proxy user ID 2305, start date/time 2307, stop date/time 2309, and access rights 2311. Additional columns may include data indicating how proxy-submitted posts and other messages be labeled.

In FIG. 21, at block 2108, the one or more computing device performing method 2100 is configured to receive feed content from the proxy user to be published in one or more social network feeds associated with the one or more entities in the online social network. For example, a user designated as proxy for a group can access the group page and submit a post as though he were a member of the group. In some implementations, the second user may be given an opportunity to approve the feed content received in block 2108 prior to block 2112.

In FIG. 21, at block 2112, the feed content is associated with the second user. In some implementations, one or more database tables may be updated to keep track of the proxy user making the post, the content of the post and the user for whom the proxy is posting. FIG. 24 shows an example of an event history table 2410 that may be used in tracking proxy activity. Event history table 2410 can have columns of event ID 2411, entity ID 2412, created by ID 2413 (indicating the original user), and proxy ID 2415. The event history table 2410 can be an example of an event history table in FIG. 9A, with an additional column for storing proxy information. The event history table 2410 can be cross-referenced with a comment table, post table, field changed table, etc. as described with reference to FIG. 9A, to track proxy activity.

In FIG. 21, at block 2116, the one or more computing devices performing method 2100 are configured to generate data indicating the association of the feed content with the second user and at block 2120, the one or more computing devices are configured to display a presentation of the one or more social network feeds in a user interface. The presentation includes the feed content and an indication of the association.

In various implementations, such a presentation may or may not include an indication of the proxy user. As noted above, in some implementations, a post or other feed content may be labeled as if the second user had submitted it with no indication that it was submitted by a proxy (e.g., "Joe Olsen") or with an indication that it was submitted by a proxy (e.g., "Zach Dunn, proxy for Joe Olsen").

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects.

While the disclosed examples are often described herein with reference to an implementation in which an on-demand database service environment is implemented in a system having an application server providing a front end for an on-demand database service capable of supporting multiple tenants, the present implementations are not limited to multi-tenant databases nor deployment on application servers.

Implementations may be practiced using other database architectures, i.e., ORACLE®, DB2® by IBM and the like without departing from the scope of the implementations claimed.

It should be understood that some of the disclosed implementations can be embodied in the form of control logic using hardware and/or using computer software in a modular or integrated manner. Other ways and/or methods are possible using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions or commands on a computer-readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer-readable medium may be any combination of such storage or transmission devices. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A database system implemented using a server system comprising at least one hardware processor, the at least one hardware processor executing instructions to perform:

designating a first user as a proxy user of a second user in a social networking system with respect to with respect to an entity in the social networking system, the proxy user having an authorization to publish feed content attributed to the second user to feeds associated with the entity;

processing feed content received from a device associated with the proxy user, the feed content to be published in one or more feeds associated with the entity;

associating the feed content with the second user;

generating data indicating the association of the feed content with the second user;

providing the generated data to a display device configured to display a presentation of the one or more feeds in a user interface, the presentation including the feed content and an indication of the association of the feed content with the second user;

automatically determining, absent user input and after expiration of a time period specifiable by the second user, that a de-designation condition has been met, the de-designation condition being controllable by the second user; and automatically de-designating, responsive to determining that the de-designation condition has been met, the first user as the proxy user of the second user.

2. The database system of claim 1, wherein designating the first user as the proxy user comprises:

determining, based on a seniority level of the first user in an organizational hierarchy of people of an organization, that the first user is authorized to be the proxy user.

3. The database system of claim 1, wherein the time period specifiable by the second user is a proxy duration defining an amount of time that the first user is permitted to have the authorization to publish feed content attributed to the second user to feeds associated with the entity.

4. The database system of claim 3, the at least one hardware processor further executing instructions to perform:

processing input from a device of the second user; and defining, based on the input, the proxy duration.

5. The database system of claim 1, wherein the entity includes one or more of: a user, a group of users, a record, an account, an opportunity, a case, a lead, or a contact.

6. The database system of claim 1, the at least one hardware processor further executing instructions to perform:

determining access rights of the proxy user, the access rights defining a further authorization of the proxy user to perform one or more of: reading feed content associated with the entity, modifying feed content associated with the entity, or deleting feed content associated with the entity.

7. The database system of claim 1, the at least one hardware processor further executing instructions to perform:

determining one or more invisibility levels of the proxy user; and wherein the presentation conceals the identity of the proxy user according to the determined invisibility levels.

8. The database system of claim 1, wherein the presentation conceals the identity of the proxy user.

9. The database system of claim 1, wherein the presentation includes the identity of the proxy user.

10. The database system of claim 1, the at least one hardware processor further executing instructions to perform:

storing the generated data in a database of the database system, the database maintaining identifications of proxy users and corresponding feed content.

11. A method for designating a proxy in social networking system implemented using a database system, the method comprising:

designating, using the database system, a first user as a proxy user of a second user in the social networking system with respect to with respect to an entity in the social networking system, the proxy user having an authorization to publish feed content attributed to the second user to feeds associated with the entity;

receiving feed content from a device associated with the proxy user, the feed content to be published in one or more feeds associated with the entity;

associating the feed content with the second user;

generating data indicating the association of the feed content with the second user;

providing the generated data to a display device configured to display a presentation of the one or more feeds in a user interface, the presentation including the feed content and an indication of the association of the feed content with the second user;

automatically determining, absent user input and after expiration of a time period specifiable by the second user, that a de-designation condition has been met, the de-designation condition being controllable by the second user; and automatically de-designating, responsive to determining that the de-designation condition has been met, the first user as the proxy user of the second user.

12. A computer program product comprising computer-readable program code stored on a non-transitory data storage medium for execution by one or more servers of a database system, the one or more servers executing the instructions to perform:

designating, using a database system, a first user as a proxy user of a second user in a social networking system with respect to with respect to an entity in the social networking system, the proxy user having an authorization to publish feed content attributed to the second user to feeds associated with the entity;

processing feed content received from a device associated with the proxy user, the feed content to be published in one or more feeds associated with the entity;

associating the feed content with the second user;

generating data indicating the association of the feed content with the second user;

providing the generated data to a display device configured to display a presentation of the one or more feeds in a user interface, the presentation including the feed content and an indication of the association of the feed content with the second user;

automatically determining, absent user input and after expiration of a time period specifiable by the second user, that a de-designation condition has been met, the de-designation condition being controllable by the second user; and automatically de-designating, responsive to determining that the de-designation condition has been met, the first user as the proxy user of the second user.

13. The computer program product of claim 12, wherein designating the first user as the proxy user comprises:

determining, based on a seniority level of the first user in an organizational hierarchy of people of an organization, that the first user is authorized to be the proxy user.

14. The computer program product of claim 12, the one or more servers further executing the instructions to perform:

wherein the time period specifiable by the second user is a proxy duration defining an amount of time that the first user is permitted to have the authorization to publish feed content attributed to the second user to feeds associated with the entity.

15. The computer program product of claim 14, the one or more servers further executing the instructions to perform:

processing input from a device of the second user; and defining, based on the input, the proxy duration.

16. The computer program product of claim 12, wherein the entity includes one or more of: a user, a group of users, a record, an account, an opportunity, a case, a lead, or a contact.

17. The computer program product of claim 12, the one or more servers further executing the instructions to perform:

determining access rights of the proxy user, the access rights defining a further authorization of the proxy user to perform one or more of: reading feed content associated with the entity, modifying feed content associated with the entity, or deleting feed content associated with the entity.

18. The computer program product of claim 12, the one or more servers further executing the instructions to perform:

determining one or more invisibility levels of the proxy user; and wherein the presentation conceals the identity of the proxy user according to the determined invisibility levels.

19. The computer program product of claim 12, wherein the presentation conceals the identity of the proxy user.

20. The computer program product of claim 12, wherein the presentation includes the identity of the proxy user.

* * * * *